United States Patent
Katakura

(10) Patent No.: US 7,646,547 B2
(45) Date of Patent: Jan. 12, 2010

(54) THREE-UNIT ZOOM LENS AND IMAGE PICKUP APPARATUS EQUIPPED WITH SAME

(75) Inventor: Masahiro Katakura, Hino (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 12/287,029

(22) Filed: Oct. 3, 2008

(65) Prior Publication Data

US 2009/0097132 A1 Apr. 16, 2009

(30) Foreign Application Priority Data

Oct. 12, 2007 (JP) .............................. 2007-266890
Aug. 22, 2008 (JP) .............................. 2008-214095

(51) Int. Cl.
*G02B 15/14* (2006.01)

(52) U.S. Cl. ....................... 359/684; 359/680; 359/682; 359/689; 359/716; 359/740; 359/784

(58) Field of Classification Search ......... 359/680–685, 359/689, 716, 740, 784
See application file for complete search history.

(56) References Cited

U.S. PATENT DOCUMENTS

| | | | |
|---|---|---|---|
| 6,982,834 B2 * | 1/2006 | Sato ............................ | 359/682 |
| 7,227,695 B2 * | 6/2007 | Enomoto .................... | 359/680 |
| 7,573,650 B2 * | 8/2009 | Minakata et al. ............ | 359/689 |
| 2005/0231818 A1 | 10/2005 | Matsusaka | |
| 2006/0056045 A1 * | 3/2006 | Yoshitsugu .................. | 359/680 |
| 2006/0215275 A1 * | 9/2006 | Ori ............................. | 359/680 |
| 2007/0121217 A1 * | 5/2007 | Hozumi et al. .............. | 359/680 |
| 2007/0146897 A1 * | 6/2007 | Hozumi et al. .............. | 359/680 |

FOREIGN PATENT DOCUMENTS

| | | |
|---|---|---|
| JP | 2005-308953 | 11/2005 |
| JP | 2008-058600 | 3/2008 |

* cited by examiner

*Primary Examiner*—Evelyn A. Lester
(74) *Attorney, Agent, or Firm*—Kenyon & Kenyon LLP

(57) ABSTRACT

A three-unit zoom lens includes, in order from the object side, a negative first lens unit G1, a positive second lens unit G2 and a third lens unit G3, wherein during zooming from the wide angle end to the telephoto end the distance between the first lens unit G1 and the second lens unit G2 decreases and the distance between the second lens unit G2 and the third lens unit G3 changes. The first lens unit G1 is composed of one negative lens component including, in order from the object side, a negative lens having a concave surface directed toward the image side and a positive lens having a convex surface directed toward the object side. The second lens unit G2 includes at least one negative lens and a plurality of positive lenses, wherein at least three lenses among these lenses are cemented to adjacent lenses, the total number of lens components included in the second lens unit G2 is two or less. The third lens unit is composed of one lens component composed of two or less lenses.

43 Claims, 36 Drawing Sheets

486.13 — · —
656.27 — — —
587.56 ———

486.13 —·—
656.27 - - - -
587.56 ———

486.13 —·—
656.27 -----
587.56 ——

486.13 —·—
656.27 -----
587.56 ———

486.13 —·—
656.27 ------
587.56 ———

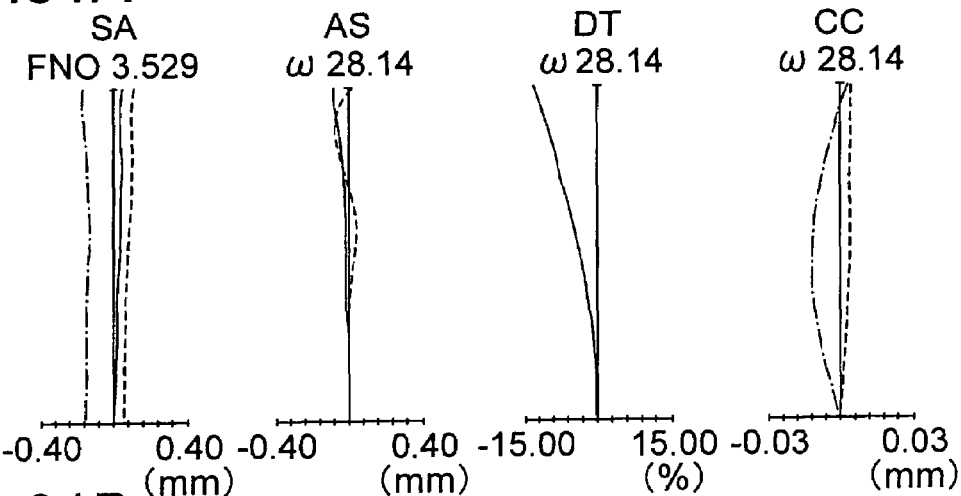
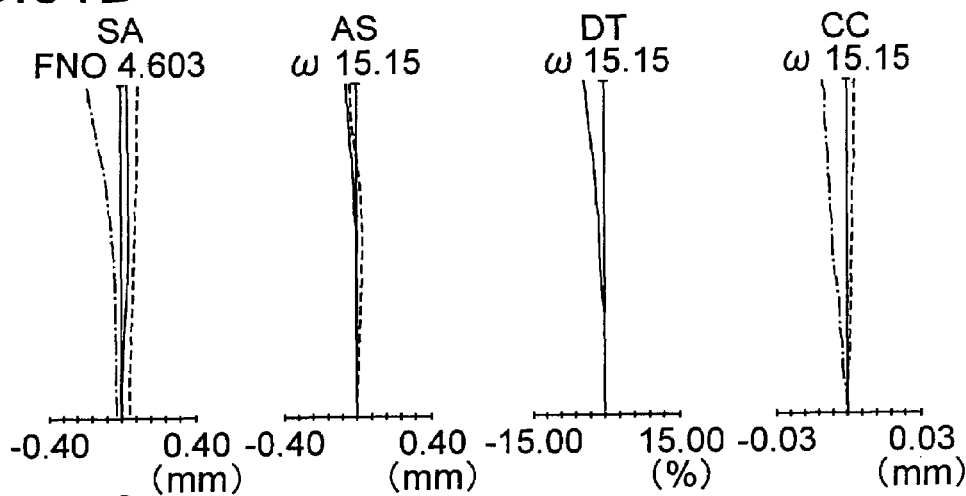
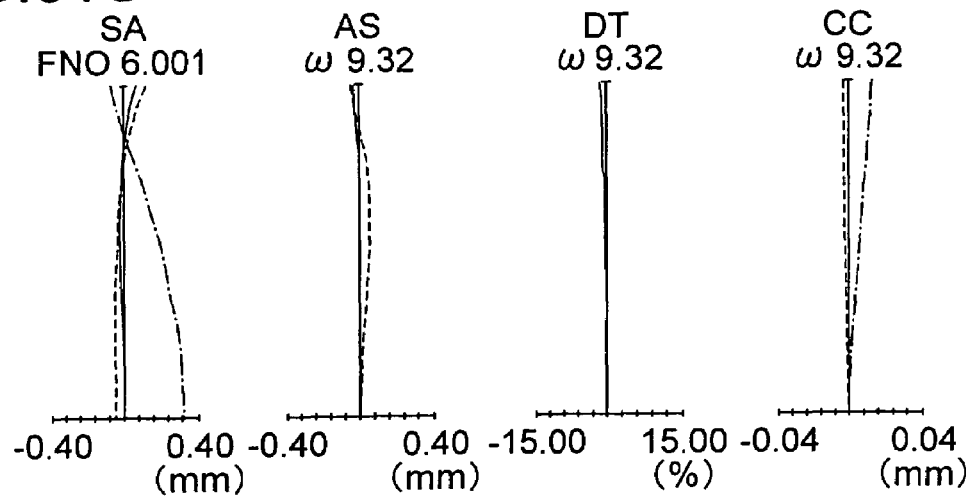

THREE-UNIT ZOOM LENS AND IMAGE PICKUP APPARATUS EQUIPPED WITH SAME

CROSS-REFERENCE TO RELATED APPLICATION

The present application is based upon and claims the benefit of priority from the prior Japanese Patent Application No. 2007-266890 filed on Oct. 12, 2007 and 2008-214095 filed on Aug. 22, 2008; the entire contents of which are incorporated herein by reference.

BACKGROUND OF THE INVENTION

1. Field of the Invention

The present invention relates a small-size zoom lens and an image pickup apparatus such as a compact digital camera equipped with such a zoom lens.

2. Description of the Related Art

Heretofore, in image pickup apparatuses such as a digital cameras and a video cameras, a high image quality, a high zooming ratio and thinning of a barrel frame have been sought.

For example, Japanese Patent Application Laid-Open No. 2005-308953 discloses a three-unit zoom lens composed of a first lens unit having a negative refracting power, a second lens unit having a positive refracting power and a third lens unit. In this three-unit zoom lens, the first lens unit is composed of a cemented lens component composed, in order from the object side, of a biconcave negative lens and a positive lens, and the second lens unit is composed of two lenses, and the third lens unit is composed of one lens. This configuration is advantageous in making the size of the zoom lens small.

SUMMARY OF THE INVENTION

According to one aspect of the present invention, there is provided a three-unit zoom lens comprising, in order from an object side thereof:

a first lens unit having a negative refracting power;

a second lens unit having a positive refracting power; and a third lens unit having a refracting power, wherein during zooming from a wide angle end to a telephoto end, a distance between the first lens unit and the second lens unit decreases, and a distance between the second lens unit and the third lens unit changes, the first lens unit comprises a negative lens component having a negative refracting power and including, in order from the object side, a negative lens having a concave surface directed toward the image side and a positive lens having a convex surface directed toward the object side, the total number of lens components included in the first lens unit is one, the second lens unit comprises at least one negative lens and a plurality of positive lenses, at least three lenses among the lenses in the second lens unit are cemented to adjacent lenses, the total number of lens components included in the second lens unit is two or less, the third lens unit comprises a lens component composed of two or fewer lenses, and the total number of lens components included in the third lens unit is one, where the term "lens component" refers to a lens member whose surfaces that are in contact with air on an optical axis include only two surfaces, one being an object side surface and the other being an image side surface.

According to another aspect of the present invention, there is provided a three-unit zoom lens comprising, in order from an object side thereof, a first lens unit having a negative refracting power;

a second lens unit having a positive refracting power;

a third lens unit having a positive refracting power, wherein during zooming from a wide angle end to a telephoto end, a distance between the first lens unit and the second lens unit decreases, and a distance between the second lens unit and the third lens unit changes, an iris stop that moves integrally with the second lens unit is further provided, the first lens unit consists of one negative lens component having a negative refracting power and including, in order from the object side, a negative lens having a concave surface directed toward the image side and a positive lens having a convex surface directed toward the object side, the total number of lens components included in the first lens unit is one, the second lens unit comprises at least one negative lens and a plurality of positive lenses, at least three lenses among the lenses in the second lens unit are cemented to adjacent lenses, the total number of lens components included in the second lens unit is two or less, the third lens unit consists of one positive lens component, and the positive lens component in the third lens unit includes a lens that satisfies the following conditional expression (9) and the positive lens component in the third lens unit satisfies the following conditional expression (10):

$$1.49 < nd_{3low} < 2.4 \qquad (9)$$

$$-1.0 < (r_{3a} + r_{3b})/(r_{3a} - r_{3b}) < 1.0 \qquad (10)$$

where, $nd_{3low}$ is a refractive index of the lens having the lowest refractive index for the d line in the positive lens component in the third lens component, $r_{3a}$ is a paraxial radius of curvature of an object side surface of the positive lens component in the third lens unit, and $r_{3b}$ is a paraxial radius of curvature of an image side surface of the positive lens component in the third lens unit, where the term "lens component" refers to a lens member whose surfaces that are in contact with air on the optical axis include only two surfaces, one being an object side surface and the other being an image side surface.

According to still another aspect of the present invention, there is provided an image pickup apparatus comprising:

the above-described three-unit zoom, and an image pickup element disposed on an image side of the three-unit zoom lens that converts an optical image formed by the three-unit zoom lens into an electrical signal.

BRIEF DESCRIPTION OF THE DRAWINGS

FIG. 1A shows the state at the wide angle end, FIG. 1B shows an intermediate state and FIG. 1C shows the state at the telephoto end;

FIG. 13A shows aberrations at the wide angle end, FIG. 13B shows aberrations in an intermediate state and FIG. 13C shows aberrations at the telephoto end;

FIG. 14A shows aberrations at the wide angle end, FIG. 14B shows aberrations in an intermediate state and FIG. 14C shows aberrations at the telephoto end.

FIGS. 31A, 31B and 31C are diagrams similar to FIGS. 13A, 13B and 13C showing aberrations in the twelfth embodiment in a state in which the zoom lens is focused on an object point at infinity;

DETAILED DESCRIPTION OF THE INVENTION

Figure 1A:
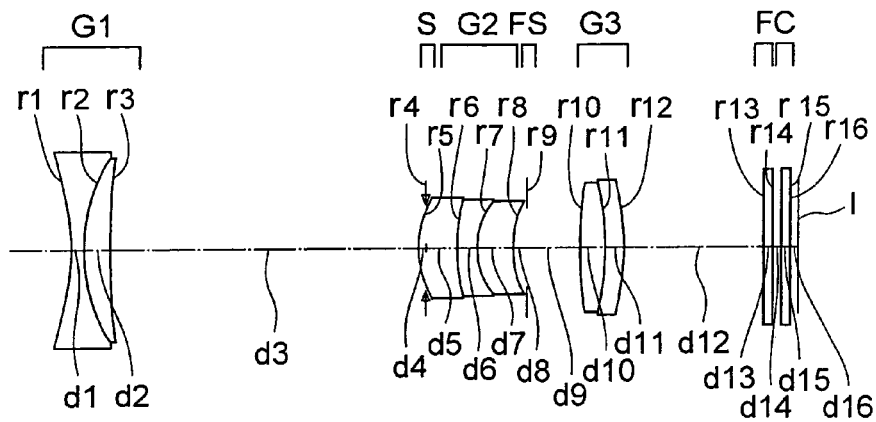
FIGS. 1A, 1B and 1C are cross sectional views taken along an optical axis showing the configuration of a first embodiment of the zoom lens according to the present invention in a state in which the zoom lens is focused on an object point at infinity, where
Figure 1B:
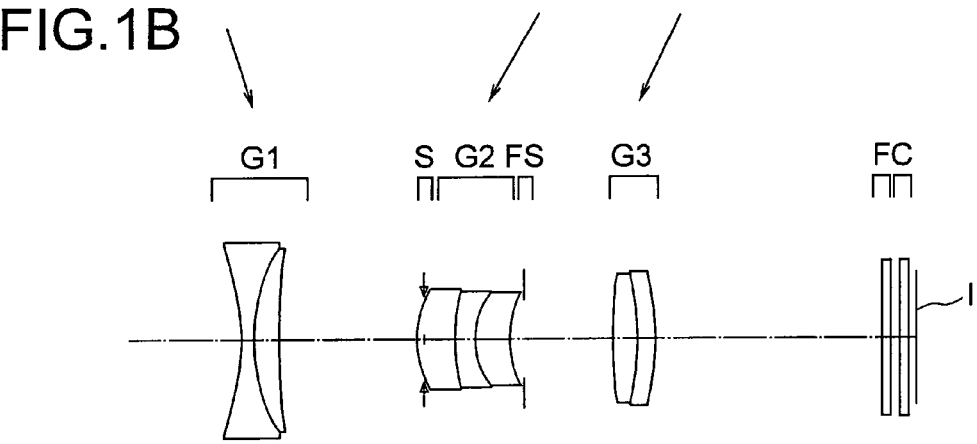
Figure 1C:
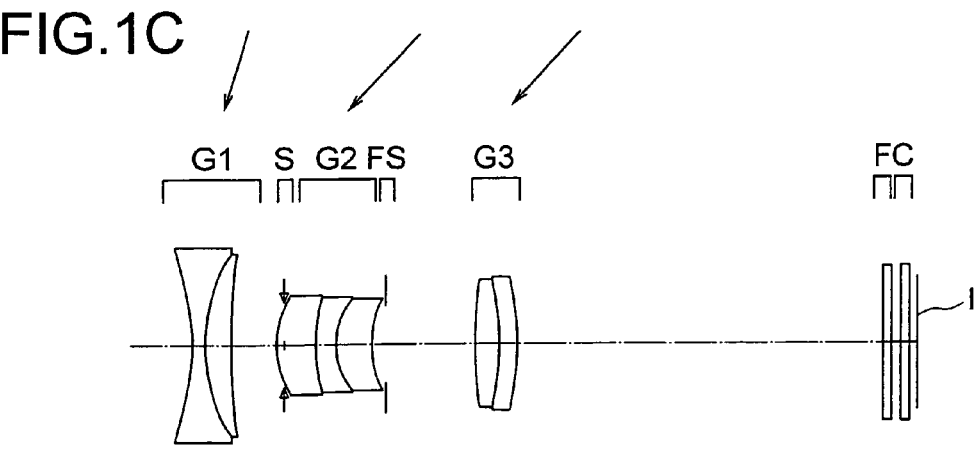

The basic configuration of the three-unit zoom lens according to the present invention is that the zoom lens includes, in order from the object side thereof, a first lens unit having a negative refracting power, a second lens unit having a positive refracting power and a third lens unit having a refracting power, wherein during zooming from the wide angle end to the telephoto end, the distance between the first lens unit and the second lens unit decreases, and the distance between the second lens unit and the third lens unit changes.

As per the above, a lens unit having a negative refracting power is used as the lens unit closest to the object side, which is advantageous in reducing the diameter of the lens and in achieving a sufficiently wide angle of field at the wide angle end.

In addition, zooming is performed by changing the distance between the first lens unit having a negative refracting power and the second lens unit having a positive refracting power. Use of the third lens unit having a refracting power is advantageous in controlling the position of the exit pupil etc.

By designing the respective lens units in the above described three-unit zoom lens in the manner described below, size reduction, good optical performance and reduction of influence on decentering can be achieved more easily.

It is to be understood that the term "lens component" refers, in the context of this specification, to a lens member whose surfaces that are in contact with air on its optical axis include only two surfaces, one being the object side surface and the other being the image side surface. The first lens unit is composed of one lens component having a negative refracting power including, in order from the object side, a negative lens having a concave surface directed toward the image side and a positive lens having a convex surface directed toward the object side. In other words, the total number of lens components included in the first lens unit is one.

By constituting the first lens unit by one negative lens component, the thickness of the first lens unit can easily be made small. The configuration of the negative lens component including a negative lens having a concave surface directed toward the image side and a positive lens is advantageous in reducing spherical aberration and chromatic aberration generated in the first lens unit. In addition, relative decentering of lenses from one another can be easily suppressed and influence of decentering on off-axis aberrations can be reduced.

The second lens unit includes at least one negative lens and a plurality of positive lenses, and at least three of these lenses are cemented to adjacent lenses. The total number of lens components included in the second lens unit is designed to be two or less.

With this configuration, the positive refracting power in the second lens unit is distributed to the plurality of positive lenses, and a negative lens is included in the second lens unit. This is advantageous in correcting spherical aberration and chromatic aberration.

In addition, by cementing at least three lenses to adjacent lenses to have two or fewer lens components in the second lens unit, it is made easier to provide a function of correcting chromatic aberration and to reduce influence of relative decentering of lenses from one another on aberrations.

The third lens unit is composed of one lens component, which, in turn, is composed of two or less lenses. In other words, the total number of lens components included in the third lens unit is one.

Since the second lens unit is designed to have a magnification changing function, it is preferred that the third lens unit have a simple configuration as described above that is advantageous in slimming the lens unit.

Constituting the zoom lens by four or fewer lens components in total is advantageous in reducing the thickness of the zoom lens at the time when the lens barrel is collapsed.

Furthermore, it is more preferred that any one or some of the following features be adopted.

It is preferred that the negative lens component in the first lens unit have an aspheric cemented surface. By designing the cemented surface in the first lens unit to be aspheric, it is made possible to excellently correct, primarily, chromatic aberration of magnification.

Alternatively, the negative lens component in the first lens unit may have a spherical cemented surface. By designing the cemented surface in the first lens unit to be spherical, it is possible to manufacture the lens unit at low cost.

It is also preferred that the first lens unit satisfy the following condition:

$$0.05 < D_{G1}/f_w < 0.8 \tag{1}$$

where $D_{G1}$ is the thickness of the first lens unit on the optical axis, and $f_w$ is the focal length of the three-unit zoom lens at the wide angle end.

Conditional expression (1) specifies preferred thicknesses of the first lens unit on the optical axis.

By designing the first lens unit in such a way that the lower limit of conditional expression (1) is not exceeded, it becomes easy to provide the positive lens with an adequate refracting power, which facilitates achievement of good optical performance.

Designing the first lens unit in such a way that the upper limit of conditional expression (1) is not exceeded is advantageous in reducing the thickness of the three-unit zoom lens at the time when the lens barrel is collapsed.

It is also preferred that the lens component located closest to the object side in the second lens unit be a cemented lens component that satisfies the following condition:

$$0.5 < f_{G2c1}/f_w < 5.0 \tag{2}$$

where $f_{G2c1}$ is the focal length of the lens component located closest to the object side in the second lens unit, and $f_w$ is the focal length of the three-unit zoom lens at the wide angle end.

Conditional expression (2) relates to the refracting power of the second lens unit.

Designing the second lens unit in such a way that the lower limit of conditional expression (2) is not exceeded is advantageous in reducing aberrations of the second lens unit.

By designing the second lens unit in such a way that the upper limit of conditional expression (2) is not exceeded, the second lens unit can be designed to have an adequate refracting power, which is advantageous for the second lens unit to have an adequate magnification changing function. This is also advantageous in reducing the entire length.

It is also preferred that the negative lens in the first lens unit satisfy the following condition:

$$nd_{G1L1} > 1.75 \tag{3}$$

where nd$_{G1L1}$ is the refractive index of the negative lens in the first lens unit.

If conditional expression (3) is satisfied, the lens located closest to the object side in the first lens unit can have a sufficient negative refracting power with a moderate curvature. This is advantageous in achieving size reduction and aberration correction.

It is also preferred that the negative lens in the first lens unit satisfy the following condition:

$$vd_{G1L1} > 60 \quad (4)$$

where vd$_{G1L1}$ is the Abbe number of the negative lens in the first lens unit.

Satisfying conditional expression (4) is preferred, because this is advantageous in correcting chromatic aberration of the first lens unit.

It is also preferred that the negative lens in the first lens unit have a biconcave shape that satisfies the following condition:

$$-0.95 < (r_{L11f} + r_{L11r})/(r_{L11f} - r_{L11r}) < 0.95 \quad (5)$$

where, $r_{L11f}$ is the paraxial radius of curvature of the object side surface of the negative lens in the first lens unit, and $r_{L11r}$ is the paraxial radius of curvature of the image side surface of the negative lens in the first lens unit.

Conditional expression (5) relates to the negative lens located closest to the object side in the first lens unit of the three-unit zoo lens.

By designing the negative lens in the first lens unit in such way that the lower limit of conditional expression (5) is not exceeded, concentration of the negative refracting power of the negative lens to its object side surface can be mitigated, and it becomes easy to suppress generation of off-axis aberrations.

By designing the negative lens in the first lens unit in such way that the upper limit of conditional expression (5) is not exceeded, the curvature of the image side surface of the negative lens can be made small, whereby the positive lens in contact with the negative lens is prevented from having a meniscus shape with an extremely large curvature and it becomes easy to manufacture the lens.

It is also preferred that the positive lens that is in contact with the lens in the first lens unit have a shape that satisfies the following condition:

$$-40.0 < (r_{L12f} + r_{L12r})/(r_{L12f} - r_{L12r}) < -0.95 \quad (6)$$

where, $r_{L12f}$ is the paraxial radius of curvature of the object side surface of the positive lens in the first lens unit, and $r_{L12r}$ is the paraxial radius of curvature of the image side surface of the positive lens in the first lens unit.

Conditional expression (6) relates to the positive lens that is in contact with the negative lens in the first lens unit.

By designing the positive lens in the first lens unit in such a way that the lower limit of conditional expression (6) is not exceeded, the curvature of its concave surface on the image side can be made moderately small, which makes it easy to suppress, primarily, generation of off-axis aberrations.

By designing the positive lens in the first lens unit in such a way that upper limit of conditional expression (6) is not exceeded, the curvature of the object side surface of the negative lens can easily be made small, which makes it easy to suppress, primarily, generation of on-axis aberrations.

Furthermore, it is preferred that the three-unit zoom lens satisfy the following condition:

$$6 \leq N \leq 7 \quad (7)$$

where N is the total number of lenses in the three-unit zoom lens.

This condition makes it easy to achieve good balance (or compromise) among aberration correction, size reduction, improvement in performance and cost.

By designing the three-unit zoom lens in such a way that the lower limit of conditional expression (7) is not exceeded, it becomes easy to achieve good balance between aberration correction and improvement in performance.

By designing the three-unit zoom lens in such a way that the upper limit of conditional expression (7) is not exceeded, it becomes easy to achieve cost reduction and size reduction.

It is also preferred that the surface located closest to the object side in the second lens unit be an aspheric surface.

Using an aspheric surface in the surface closest to the object side in the second lens unit is advantageous in favorably correcting spherical aberration at all the zoom positions from the wide angle end to the telephoto end.

It is also preferred that the second lens unit includes a lens component that includes, in order from the object side, a positive lens, a negative lens and a positive lens.

Such a symmetrical refracting power arrangement of this lens component is advantageous in correcting spherical aberration and off-axis aberrations. By cementing the positive lens, the negative lens and the positive lens in the mentioned order, decentering of the lenses from one another can be made small, and the second lens unit can easily be designed to have an adequate refracting power. In addition, this lens configuration is advantageous in achieving a high zooming ratio.

Furthermore, it is preferred that the second lens unit be composed of one lens component. This is advantageous in making the size of the second lens unit small.

The second lens unit may be composed of two lens components each having a cemented surface.

By designing the second lens unit to have two cemented lens components, chromatic aberration generated in each lens component can be made small. In addition, having four lens surfaces that are in contact with air in the second lens unit is advantageous in controlling the principal points of the second lens unit and in reducing aberrations.

Furthermore, it is preferred that each lens component in the second lens unit be a doublet. In this case, the total number of lenses included in the second unit is four, which is advantageous in reducing the cost.

It is also preferred that during zooming from the wide angle end to the telephoto end, the second lens unit move in such a way as to satisfy the following condition:

$$0.5 < \Delta G2/f_w < 3.0 \quad (8)$$

where $\Delta G2$ is the amount of displacement of the position of the second lens unit at the telephoto end from its position at the wide angle end, and displacements toward the object side are represented by positive values.

Conditional expression (8) specifies amounts of displacement of the second lens unit that provide good balance (or compromise) between the size and aberrations.

By designing the lens configuration in such a way that the lower limit of conditional expression (8) is not exceeded, zooming function can easily be achieved even without making the refracting power of the second lens unit high. In addition, such design is advantageous in reducing variations in aberrations.

By designing the lens configuration in such a way that the upper limit of conditional expression (8) is not exceeded, the displacement amount of the second lens unit can be made moderately small, which is advantageous in reducing the entire length of the three-unit zoom lens.

Furthermore, in cases where the third lens unit is composed of a lens component having a positive refracting power, it becomes easy to make light beams incident on the image pickup element more nearly perpendicular thereto, which makes it easy to reduce influence of shading etc.

On the other hand, there has been developed an image pickup element in which the more distant from the center the position is, the more the influence of oblique incidence of light beams is reduced, as disclosed in Japanese Patent Application Laid-Open No. 2006-351972.

For use with such an image pickup element, the third lens unit may be composed of a lens component having a negative refracting power. This enables to make the relative size of the third lens unit with respect to the effective image pickup area of the image pickup element smaller, which is advantageous in reducing the size.

Focusing may be performed by moving the third lens unit along the optical axis direction.

This makes it easy to lighten the load of driving in focusing, since the third lens unit can more easily be made small as compared to the first lens unit and the second lens unit.

The three-unit zoom lens may be configured in such a way that the position of the third lens unit at the telephoto end is displaced toward the object side with respect to its position at the wide angle end.

The three-unit zoom lens may be configured in such a way that during zooming from the wide angle end to the telephoto end, the third lens unit moves only toward the object side.

The three-unit zoom lens may be equipped with an iris stop disposed between the first lens unit and the second lens unit.

The three-unit zoom lens may further be equipped with a flare stop disposed between the second lens unit and the third lens unit.

The third lens unit may have a biconvex shape.

Furthermore, the third lens unit may be composed of a biconvex positive lens.

It is more preferred that some of the above described features be applied in combination, from the viewpoint of achieving size reduction and higher performance etc.

In the case where the three-unit zoom lens has a focusing function, the conditional expressions presented above should be interpreted as conditions in the state in which the zoom lens is focused on the farthest object point.

It is more preferred that limit values in the above-mentioned conditional expressions be changed as follows.

As to conditional expression (1), it is more preferred that the lower limit value be 0.1, more preferably 0.2. It is more preferred that the upper limit value be 0.6, more preferably 0.5.

As to conditional expression (2), it is more preferred that the lower limit value be 0.8, more preferably 1.0. It is more preferred that the upper limit value be 4.0, more preferably 3.0.

As to conditional expression (3), it is more preferred that the lower limit value be 1.80, more preferably 1.85. The upper limit value need not be set for the existing lens materials. However, it is preferred that the refractive index $nd_{G1L1}$ of the negative lens in the first lens unit do not exceed 20, since if the refractive index exceeds 20, severe surface accuracy control is required.

As to conditional expression (4), it is more preferred that the lower limit value be 65, more preferably 70. It is more preferred that an upper limit be additionally set to 95. This makes it easy to reduce influence of anomalous dispersion on secondary spectrum.

As to conditional expression (5), it is more preferred that the lower limit value be −0.5, more preferably −0.2. It is more preferred that the upper limit value be 0.5, more preferably 0.2.

As to conditional expression (6), it is more preferred that the lower limit value be −30.0, more preferably −20.0. It is more preferred that the upper limit value be −1.1, more preferably −1.2.

As to conditional expression (8), it is more preferred that the lower limit value be 1.0, more preferably 1.5. It is more preferred that the upper limit value be 2.5, more preferably 2.0.

A three-unit zoom lens according to another aspect of the present invention that is intended to achieve the above-described object comprises, in order from the object side thereof, a first lens unit having a negative refracting power,
a second lens unit having a positive refracting power, and
a third lens unit having a positive refracting power, wherein
during zooming from a wide angle end to a telephoto end, a distance between the first lens unit and the second lens unit decreases, and a distance between the second lens unit and the third lens unit changes, and the zoom lens is further provided with an iris stop that moves integrally with the second lens unit.

As per the above, a lens unit having a negative refracting power is used as the lens unit closest to the object side, which is advantageous in reducing the diameter of the lens and in achieving a sufficiently wide angle of field at the wide angle end.

In addition, zooming is performed by changing the distance between the first lens unit having a negative refracting power and the second lens unit having a positive refracting power.

In addition, by providing the third lens unit having a positive refracting power, the exit pupil position is shifted away from the image plane, and light beams incident on the light receiving surface are made more nearly perpendicular thereto, which is advantageous in reducing color shading.

The iris stop that moves integrally with the second lens unit is provided to regulate effective light beams. This is advantageous in reducing the diameter of the second lens unit and in providing an adequate refracting power.

The iris stop may be provided on the object side of the second lens unit, on the image side of the second lens unit or in the middle of the second lens unit. In particular, disposing the iris stop on the object side of the second lens unit is advantageous in reducing the diameter of the first lens unit and in controlling the position of the exit pupil.

By designing the respective lens units in the above described three-unit zoom lens in the manner described below, size reduction, good optical performance and reduction of influence on decentering can be achieved more easily.

It is to be understood that the term "lens component" refers, in the context of this specification, to a lens member whose surfaces that are in contact with air on its optical axis include only two surfaces, one being the object side surface and the other being the image side surface. The first lens unit is composed of one negative lens component having a negative refracting power including, in order from the object side, a negative lens having a concave surface directed toward the image side and a positive lens having a convex surface directed toward the object side.

By constituting the first lens unit by one negative lens component, it is made easy to make the thickness of the first lens unit small. The configuration of the negative lens component including a negative lens and a positive lens is advantageous in reducing spherical aberration and chromatic aberration generated in the first lens unit. In addition, relative decentering of lenses from one another can be easily suppressed and influence of decentering on off-axis aberrations can be reduced.

The second lens unit includes at least one negative lens and a plurality of positive lenses, and at least three of these lenses are cemented to adjacent lenses. The total number of lens components included in the second lens unit is two or less.

With this configuration, the positive refracting power in the second lens unit is distributed to the plurality of positive lenses, and a negative lens is included in the second lens unit. This is advantageous in correcting spherical aberration and chromatic aberration.

In addition, by cementing at least three lenses to adjacent lenses to have two or fewer lens components in the second lens unit, it is made easier to provide a function of correcting chromatic aberration and to reduce influence of relative decentering of lenses from one another on aberrations.

The third lens unit is composed of one positive lens component.

Since the second lens unit is designed to have a magnification changing function, it is preferred that the third lens unit has a simple configuration as described above that is advantageous in slimming the lens unit.

Constituting the zoom lens by four or fewer lens components in total is advantageous in reducing the thickness of the zoom lens at the time when the lens barrel is collapsed.

In the above described configuration, it is preferred that the positive lens component in the third lens unit include a lens that satisfies the following conditional expression (9) and the positive lens component satisfies the following conditional expression (10);

$$1.49 < nd_{3low} < 2.4 \quad (9)$$

$$-1.0 < (r_{3a}+r_{3b})/(r_{3a}-r_{3b}) < 1.0 \quad (10)$$

where, $nd_{3low}$ is the refractive index of the lens having the lowest refractive index for d-line in the positive lens component in the third lens unit, $r_{3a}$ is the paraxial radius of curvature of the object side surface of the positive lens component in the third lens unit, and $r_{3b}$ is the paraxial radius of curvature of the image side surface of the positive lens component in the third lens unit.

Conditional expression (9) specifies preferred refractive indices for the single lens that constitutes the third lens unit or the lens having the lowest refractive index among the lenses cemented together in the single cemented lens that constitutes the third lens unit.

By designing the lens aforementioned lens in the third lens unit in such a way as to satisfy conditional expression (9), a positive power can be provided without making the curvature of the lenses that constitutes the third lens unit unduly large. Thus, it becomes easy to suppress, primarily, generation of off-axis coma and curvature of field.

By designing the aforementioned lens in the third lens unit in such a way that lower limit of conditional expression (9) is not exceeded, the curvature of the lens surfaces can be made small, which is advantageous in reducing coma and curvature of field.

By designing the aforementioned lens in the third lens unit in such a way as that upper limit of conditional expression (9) is not exceeded, it can be made easy to reduce the material cost and the manufacturing cost.

Conditional expression (10) specifies preferred shape factors for the positive lens component in the third lens unit.

By designing the positive lens component in the third lens unit in such a way as to satisfy conditional expression (10), a positive power can be distributed to the object side surface and the image side surface. Thus, a required positive power can be provided without making the curvature of any one of these surfaces large. This is advantageous in reducing off-axis aberrations, in particular coma and curvature of field.

By designing the positive lens component in the third lens unit in such a way that neither the lower limit nor the upper limit of conditional expression (10) is exceeded, the curvature of both the object side surface and the image side surface can be made small. Thus, it becomes easy to reduce off-axis aberrations, in particular coma and curvature of field.

Furthermore, it is more preferred that any one or some of the following features be adopted.

It is preferred that the third lens unit satisfy the following conditional expression (11):

$$-0.40 < D_{g3}/r_{3b} < 0.0 \quad (11)$$

where $D_{g3}$ is the thickness of the third lens unit on the optical axis, and $r_{3b}$ is the paraxial radius of curvature of the image side surface of the positive lens component in the third lens unit.

Conditional expression (11) specifies preferred relationship between the thickness of the third lens unit and the paraxial radius of curvature of the image side surface thereof.

Satisfying conditional expression (11) is advantageous in both slimming the third lens unit and providing an adequate positive refracting power. Satisfying conditional expression (11) is also advantageous in reducing off-axis aberrations, in particular coma and curvature of field.

Designing the third lens unit in such a way that the lower limit of conditional expression (11) is not exceeded is advantageous in slimming the lens component. Such design is also advantageous in providing a space for movement of the third lens, in cases where the third lens unit serves as a focusing lens unit.

By designing the third lens unit in such a way that the upper limit of conditional expression (11) is not exceeded, the image side surface can have a positive refracting power, and the positive refracting power of the object side surface can be made lower. This facilitates reduction of off-axis aberrations.

It is preferred that the negative lens component in the first lens unit has a biconcave shape.

Thus, the negative refracting power is distributed to a plurality of lens surfaces, which is advantageous in reducing spherical aberration at telephoto positions in which on-axis marginal rays are distant from the optical axis. This feature is also advantageous in slimming the first lens unit. In addition, this feature allows to make the paraxial radius of curvature of the cemented surface large, and it becomes easy to reduce influence of manufacturing errors on aberrations.

It is also preferred that the negative lens included in the negative lens component in the first lens unit have a shape that satisfies the following conditional expression (15):

$$-1.0 < (r_{1na}+r_{1nb})/(r_{1na}-r_{1nb}) < 1.0 \quad (15)$$

where, $r_{1na}$ is the paraxial radius of curvature of the object side surface of the negative lens included in the negative lens component in the first lens unit, and $r_{1nb}$ is the paraxial radius of curvature of the image side surface of the negative lens included in the negative lens component in the first lens unit.

Conditional expression (15) specifies preferred shapes of the negative lens in the first lens unit.

By designing the negative lens in the first lens unit in such a way that the lower limit of conditional expression (15) is not exceeded, it becomes easy to suppress generation of off-axis aberrations in the object side surface of the negative lens.

It is preferred to design the negative lens in the first lens unit in such a way that the upper limit of conditional expression (15) is not exceeded thereby providing the object side surface thereof with an adequate negative refracting power to facilitate reduction of spherical aberration at telephoto positions. In addition, if the upper limit of conditional expression (15) is not exceeded, the positive lens in contact with the negative lens is prevented from having a meniscus shape with an extremely large curvature and it becomes easy to manufacture the lens.

It is also preferred that focusing operation from a long distance to a short distance at the wide angle end be performed by moving the third lens unit toward the object side, and the first lens unit, the second lens unit and the third lens unit satisfy the following conditional expression (13) in the state in which the zoom lens is focused on the longest distance at the wide angle end:

$$2.0 < D_{12}/D_{23} < 8.0 \quad (13)$$

where $D_{12}$ is the distance, on the optical axis, between the first lens unit and the second lens unit at the wide angle end, and D23 is the distance, on the optical axis, between the second lens unit and the third lens unit at the wide angle end.

Conditional expression (13) specifies preferred ratios of the distance between the first and second lens units and the distance between the second and third lens units at the wide angle end.

If conditional expression (13) is satisfied, a sufficient space for movement of the second lens unit for zooming can be provided. Even if the second lens unit does not have an excessively large positive power, on-axis and off-axis aberrations can be easily reduced. In addition, a space required for movement of the third lens unit for focusing can be provided, which facilitates focusing on objects at short distances.

By arranging the first, second and third lens units in such a way that the lower limit of conditional expression (13) is not exceeded, a space for movement of the second lens unit for zooming can be provided, the positive refracting power of the second lens unit can be made smaller, and on-axis and off-axis aberrations can be easily reduced.

By arranging the first, second and third lens units in such a way that the upper limit of conditional expression (13) is not exceeded, the overall length of the zoom lens is prevented from becoming unduly large. In addition, such an arrangement is advantageous in providing a space required for movement of the third lens unit for focusing.

It is also preferred that the negative lens component in the first lens unit have an aspheric cemented surface. By designing the cemented surface in the first lens unit to be aspheric, it is made possible to excellently correct, primarily, chromatic aberration of magnification.

Alternatively, the negative lens component in the first lens unit may have a spherical cemented surface. By designing the cemented surface in the first lens unit to be spherical, it is possible to manufacture the lens unit at low cost.

It is preferred that the first lens unit satisfy the following conditional expression (14):

$$-0.70 < D_{g1}/f_1 < -0.075 \quad (14)$$

where $D_{g1}$ is the thickness of the first lens unit on the optical axis, and $f_1$ is the focal length of the first lens unit.

Conditional expression (14) specifies preferred thicknesses of the first lens unit on the optical axis.

Satisfying conditional expression (14) is advantageous in achieving both good optical performance and slimming of the zoom lens at the time when the lens barrel is collapsed.

By designing the first lens unit in such a way that the lower limit of conditional expression (14) is not exceeded, the thickness of the first lens unit on the optical axis can be made moderately small, which is advantageous in slimming the zoom lens at the time when the lens barrel is collapsed. On the other hand, the negative refracting power of the first lens unit can be made small, which is advantageous in reducing off-axis aberrations generated by the first lens unit at the wide angle end.

By designing the first lens unit in such a way that the upper limit of conditional expression (14) is not exceeded, the first lens unit can be provided with an adequate negative power, which is advantageous in achieving a wide angle of field. In addition, movement amount required for the first lens unit to function as a compensator can be reduced. On the other hand, the first lens unit can have an adequate thickness on the optical axis, and a sufficiently high degree of freedom in the shape of the cemented surface is ensured. This is advantageous in reducing aberrations generated by the first lens unit.

The second lens unit may be composed of one cemented lens unit. This is advantageous in making the size of the second lens unit small.

Furthermore, it is preferred that the sole lens component in the second lens unit be a lens component including, in order from the object side, a positive lens, a negative lens and a positive lens.

Such a symmetrical refracting power arrangement of this lens component is advantageous in correcting spherical aberration and off-axis aberrations. By cementing the positive lens, the negative lens and the positive lens in the mentioned order, decentering of the lenses from one another can be made small, and the second lens unit can easily be designed to have an adequate refracting power. In addition, this lens configuration is advantageous in achieving a high zooming ratio.

The second lens unit may be composed of two cemented lens components each having a cemented surface.

By designing the second lens unit to have two cemented lens components, chromatic aberration generated in each lens component can be made small. In addition, having four lens surfaces that are in contact with air in the second lens unit is advantageous in controlling the principal points of the second lens unit and in reducing aberrations.

Furthermore, it is preferred that each lens component in the second lens unit be a doublet. If this is the case, the total number of lenses included in the second unit is four, which is advantageous in reducing the size and cost.

The positive lens component in the third lens unit may be composed of a single lens.

This leads to a decrease in the thickness of the zoom lens at the time when the lens barrel is collapsed and a decrease in the cost. In addition, in the case where the third lens unit serves as a focusing lens unit, load on the focusing mechanism can be lightened.

The positive lens component in the third lens unit may be composed of a cemented lens component.

This is advantageous in reducing chromatic aberration generated in the third lens unit. Thus, good optical performance can be achieved even with a small number of lens components in total.

It is preferred that the total number of aspheric surfaces in the third lens unit be at most one.

The present invention is advantageous in reducing, particularly, generation of coma etc. in the third lens unit. Thus, the number of aspheric surfaces in the third lens unit can be made small, whereby the manufacturing cost can be reduced.

An image pickup apparatus according to the present invention comprises a three-unit zoom lens and an image pickup element disposed on the image side of the three-unit zoom lens to convert an optical image formed by the three-unit zoom lens into an electrical signal, wherein said three-unit zoom lens is any one of the three-unit zoom lenses described in the foregoing.

Thus, an image pickup apparatus equipped with a three-unit zoom lens that is small in size and has good optical performance can be provided.

Furthermore, it is preferred that the third lens unit move while satisfying the following conditional expression (12):

$$-0.80 < \Delta D_{g3}/Ih < 8.00 \quad (12)$$

where $\Delta D_{g3}$ is displacement of the position of the third lens unit at the telephoto end from its position at the wide angle end, displacements toward the object side being represented by positive values, and Ih is the maximum image height.

Conditional expression (12) specifies preferred amounts of movement of the third lens unit.

Designing the third lens unit to move in such a way that conditional expression (12) is satisfied is advantageous in reducing variations in aberrations during zooming and in reducing load on a mechanism for moving the lens unit(s).

By designing the third lens unit to move in such a way that the lower limit of conditional expression (12) is not exceeded, the third lens unit is prevented from being displaced excessively toward the image side, which is advantageous in reducing variations in off-axis aberrations such as coma between the wide angle end and the telephoto end. This is also advantageous in providing a space for movement of the second lens unit.

By designing the third lens unit to move in such a way that the upper limit of conditional expression (12) is not exceeded, the third lens unit is prevented from being displaced excessively toward the object side, which is advantageous in making the entire length of the zoom lens small.

The image height may be changed, for example, when electrical distortion correction that will be described later or pseudo-zooming by cropping is performed. In this connection, it should be understood that the maximum image height Ih in conditional expression (12) refers to the maximum value in the range of values that the image height can assume.

Furthermore, it is preferred that the image pickup apparatus have an image transformation section that transforms, by image processing, an electrical signal containing a distortion due to the three-unit zoom lens into an image signal in which the distortion is corrected.

By correcting a distortion electrically, requirements of aberration correction placed on the three-unit zoom lens can be mitigated. Thus, it becomes easy to configure the first lens unit in such a way to have an adequate negative refracting power, which is advantageous in reducing the size of the three-unit zoom lens and in achieving a high zoom ratio.

In connection with this, distortion correction amounts may be varied among signals for different colors to correct chromatic aberration also by image processing.

It is more preferred that some of the above described features be applied in combination, from the viewpoint of achieving size reduction and higher performance etc.

In the case where the three-unit zoom lens has a focusing function, the conditional expressions presented above should be interpreted as conditions in the state in which the zoom lens is focused on the farthest object point.

It is more preferred that limit values in the above-mentioned conditional expressions be changed as follows.

As to conditional expression (9), it is more preferred that the lower limit value be 1.493, more preferably 1.495. It is more preferred that the upper limit value be 2.2, more preferably 1.8.

As to conditional expression (10), it is more preferred that the lower limit value be −0.7, more preferably −0.5. It is more preferred that the upper limit value be 0.7, more preferably 0.5.

As to conditional expression (11), it is more preferred that the lower limit value be −0.30, more preferably −0.20. It is more preferred that the upper limit value be −0.03, more preferably −0.06.

As to conditional expression (12), it is more preferred that the lower limit value be −0.4, more preferably −0.2. It is more preferred that the upper limit value be 5.0, more preferably 3.5.

As to conditional expression (13), it is more preferred that the lower limit value be 2.5, more preferably 3.0. It is more preferred that the upper limit value be 6.5, more preferably 5.0.

As to conditional expression (14), it is more preferred that the lower limit value be −0.40, more preferably −0.25. It is more preferred that the upper limit value be −0.08, more preferably −0.09.

As to conditional expression (15), it is more preferred that the lower limit value be −0.5, more preferably −0.1. It is more preferred that the upper limit value be 0.5, more preferably 0.2.

In the above-described modes of the invention, it is more preferred that some of the conditional expressions be satisfied simultaneously. In the numerical range limitations by each of the conditional expressions presented above, limitation by only the upper limit value or the lower limit value may be applied. Furthermore, the various features described above may be adopted in any possible combination.

In the following, embodiments of the zoom lens and the image pickup apparatus according to the present invention will be described in detail with reference to the accompanying drawings. It should be understood, however, that the embodiments described below are not intended to limit the present invention.

The zoom lenses according to the embodiments described below are three-unit zoom lenses of a negative-positive-positive type (first to seventh, twelfth to nineteenth and twenty-fourth embodiments) or a negative-positive-negative type (eighth to eleventh and twentieth to twenty-third embodiments) having a zoom ratio of 3 or so, having a sufficiently large half angle of field at the wide angle end and achieving good optical performance.

In the zoom lenses according to the first to twelfth embodiments, the effective image pickup area has a rectangular shape constantly at all the zoom positions.

Values associated with conditional expressions presented below for each embodiment are for the state in which the zoom lens is focused on an object point at infinity.

The total length refers to the sum of the distance between the incident surface and the exit surface of the lens on the optical axis and the back focus. The back focus is represented by an equivalent air distance.

As will be described later in connection with each embodiment, during zooming from the wide angle end to the telephoto end, the first lens unit first moves toward the image side and then toward the object side, and the second lens unit moves only toward the object side. The movement of the third lens unit during zooming varies depending on the embodiments, as described below.

In the first to fifth embodiments, the third lens unit moves only toward the object side.

In the sixth and seventh embodiments, the third lens unit moves only toward the image side.

In the eighth end ninth embodiments, the third lens unit moves only toward the object side.

In the tenth and eleventh embodiments, the third lens unit moves only toward the image side.

In the twelfth embodiments, the third lens unit moves only toward the object side.

Focusing is performed by moving the third lens unit along the optical axis direction. Specifically, in the first to seventh and twelfth embodiments in which the third lens unit has a positive refracting power, focusing operation from an object point at a long distance to an object point at a short distance is performed by moving the third lens unit toward the object side.

In the eighth to eleventh embodiments in which the third lens unit has a negative refracting power, focusing operation from an object point at a long distance to an object point at a short distance is performed by moving the third lens unit toward the image side.

The plane parallel plates include a low pass filter having IR cut coating applied thereon and a CCD cover glass, as will be described later.

In the following, first to twelfth embodiments of the zoom lens according to the present invention will be described. FIGS. 1A to 1C, 2A to 2C, 3A to 3C, 4A to 4C, 5A to 5C, 6A to 6C, 7A to 7C, 8A to 8C, 9A to 9C, 10A to 10C, 11A to 11C and 12A to 12C are cross sectional views showing the configuration of the zoom lenses according to the first to twelfth embodiments respectively at the wide angle end (FIGS. 1A, 2A, 3A, 4A, 5A, 6A, 7A, 8A, 9A, 10A, 11A and 12A), in an intermediate focal length state (FIGS. 1B, 2B, 3B, 4B, 5B, 6B, 7B, 8B, 9B, 10B, 11B and 12B) and at the telephoto end (FIGS. 1C, 2C, 3C, 4C, 5C, 6C, 7C, 8C, 9C, 10C, 11C and 12C) in the state in which the zoom lens is focused on an object-point at infinity. In FIGS. 1A through 12C, the first lens unit is denoted by G1, an iris stop is denoted by S, the second lens unit is denoted by G2, a flare stop is denoted by FS, the third lens unit is denoted by G3, a plane parallel plate having wavelength range restriction coating applied thereon that blocks or reduces infrared light to constitute a low pass filter is denoted by F, a plane parallel plate constituting a cover glass for an electronic image pickup element is denoted by C, and the image plane is denoted by I. The cover glass C may have multi-layer coating for wavelength range restriction applied on its surface. The cover glass C may be designed to have a function of a low pass filter.

All the numerical data presented below are for the state in which the zoom lens is focused on an object at infinity. In the numerical data, dimensions are in mm and angles are in degrees. The zoom data are presented for the wide angle end (WE), intermediate focal length state (ST) and telephoto end (TE).

As shown in FIG. 1, the zoom lens according to the first embodiment has a first lens unit G1 having a negative refracting power, an iris stop S, a second lens unit G2 having a positive refracting power, a flare stop FS and a third lens unit G3 having a positive refracting power, which are arranged in the mentioned order from the object side.

During zooming from the wide angle end to the telephoto end, the first lens unit G1 moves first toward the image side and then toward the object side, the second lens unit G2 moves only toward the object side, and the third lens unit G3 moves only toward the object side.

The first lens unit G1 includes a cemented lens composed, in order from the object side, of a biconcave negative lens and a positive meniscus lens having a convex surface directed toward the object side. The second lens unit G2 includes a cemented lens composed, in order from the object side, of a positive meniscus lens having a convex surface directed toward the object side, a negative meniscus lens having a convex surface directed toward the object side and a positive meniscus lens having a convex surface directed toward the object side. The third lens unit G3 includes a cemented lens composed, in order from the object side, of a biconvex positive lens and a negative meniscus lens having a convex surface directed toward the image side.

Aspheric surfaces are used in both the side surfaces of the biconcave negative lens in the first lens unit G1, the image side surface of the positive meniscus lens having a convex surface directed toward the object side in the first lens unit G1, the object side surface of the positive meniscus lens having a convex surface directed toward the object side located closest to the object side in the second lens unit G2, the image side surface of the positive meniscus lens having a convex surface directed toward the object side located closest to the image side in the second lens unit G2 and the object side surface of the biconvex positive lens in the third lens unit G3, namely there are six aspheric surfaces in total.

Figure 2A:
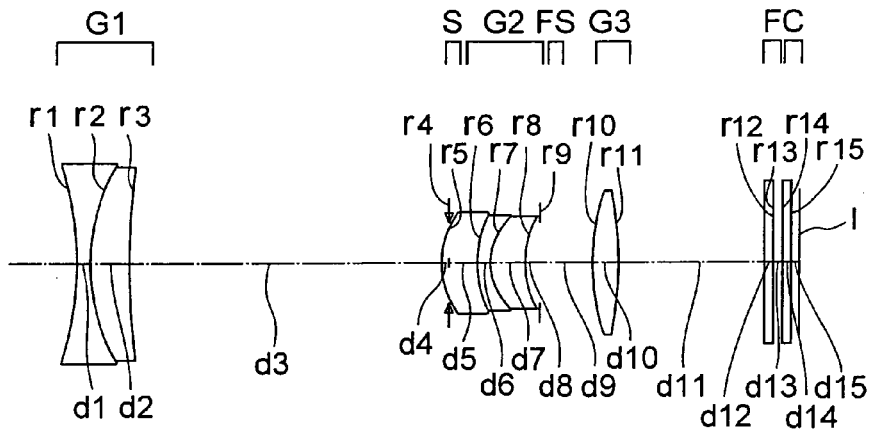
FIGS. 2A, 2B and 2C are cross sectional views similar to FIGS. 1A, 1B and 1C respectively, showing the configuration of a second embodiment of the zoom lens according to the present invention.
Figure 2B:
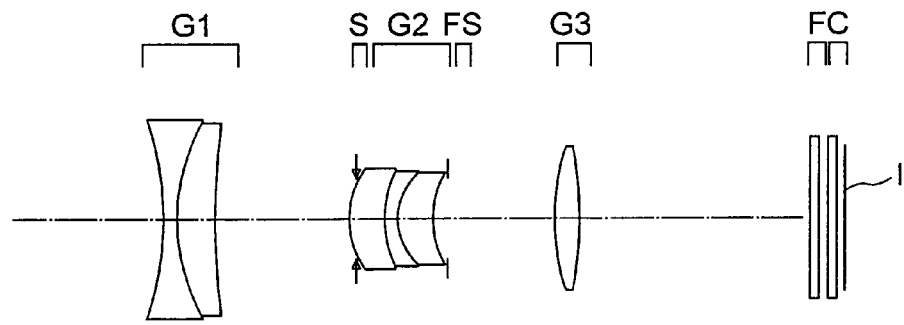
Figure 2C:
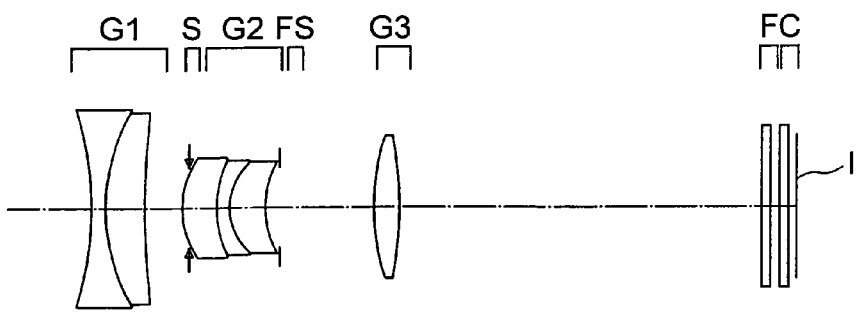

As shown in FIGS. 2A, 2B and 2C, the zoom lens according to the second embodiment has a first lens unit G1 having a negative refracting power, an iris stop S, a second lens unit G2 having a positive refracting power, a flare stop FS and a third lens unit G3 having a positive refracting power, which are arranged in the mentioned order from the object side.

During zooming from the wide angle end to the telephoto end, the first lens unit G1 moves first toward the image side and then toward the object side, the second lens unit G2 moves only toward the object side, and the third lens unit G3 moves only toward the object side.

The first lens unit G1 includes a cemented lens composed, in order from the object side, of a biconcave negative lens and a positive meniscus lens having a convex surface directed toward the object side. The second lens unit G2 includes a cemented lens composed, in order from the object side, of a positive meniscus lens having a convex surface directed toward the object side, a negative meniscus lens having a convex surface directed toward the object side and a positive meniscus lens having a convex surface directed toward the object side. The third lens unit G3 includes a biconvex positive lens.

Aspheric surfaces are used in the object side surface of the biconcave negative lens in the first lens unit G1, the image side surface of the positive meniscus lens having a convex surface directed toward the object side in the first lens unit G1, the object side surface of the positive meniscus lens having a convex surface directed toward the object side located closest to the object side in the second lens unit G2, the image side surface of the positive meniscus lens having a convex surface directed toward the object side located closest to the image side in the second lens unit G2 and the object side surface of the biconvex positive lens in the third lens unit G3, namely there are five aspheric surfaces in total.

Figure 3A:
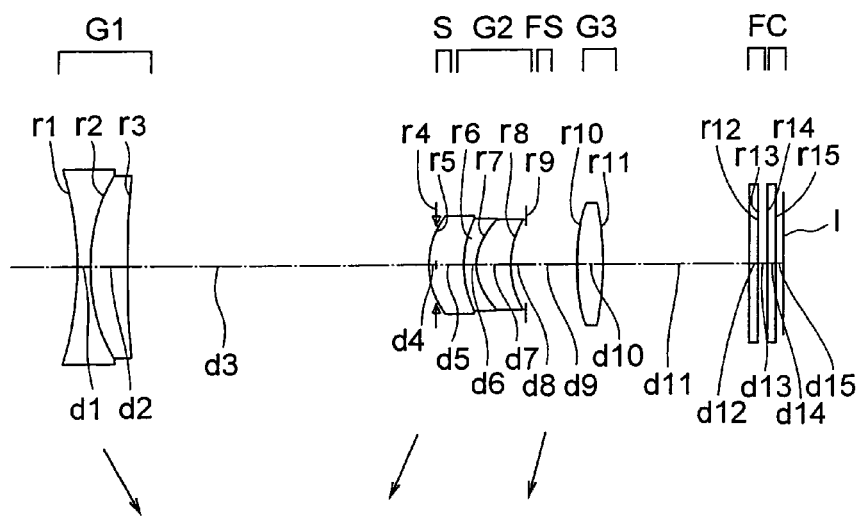
FIGS. 3A, 3B and 3C are cross sectional views similar to FIGS. 1A, 1B and 1C respectively, showing the configuration of a third embodiment of the zoom lens according to the present invention.
Figure 3B:
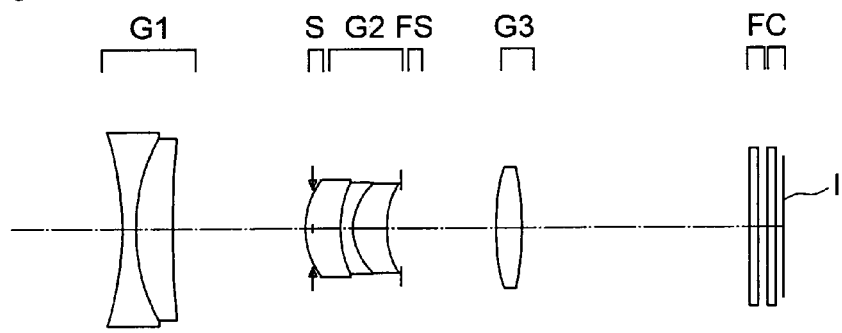
Figure 3C:
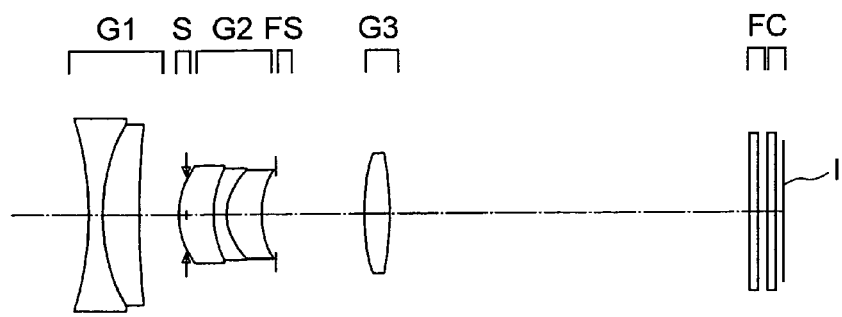

As shown in FIGS. 3A, 3B and 3C, the zoom lens according to the third embodiment has a first lens unit G1 having a negative refracting power, an iris stop S, a second lens unit G2 having a positive refracting power, a flare stop FS and a third lens unit G3 having a positive refracting power, which are arranged in the mentioned order from the object side.

During zooming from the wide angle end to the telephoto end, the first lens unit G1 moves first toward the image side and then toward the object side, the second lens unit G2 moves only toward the object side, and the third lens unit G3 moves only toward the object side.

The first lens unit G1 includes a cemented lens composed, in order from the object side, of a biconcave negative lens and a positive meniscus lens having a convex surface directed toward the object side. The second lens unit G2 includes a cemented lens composed, in order from the object side, of a positive meniscus lens having a convex surface directed toward the object side, a negative meniscus lens having a convex surface directed toward the object side and a positive meniscus lens having a convex surface directed toward the object side. The third lens unit G3 includes a biconvex positive lens.

Aspheric surfaces are used in both the side surfaces of the biconcave negative lens in the first lens unit G1, the image side surface of the positive meniscus lens having a convex surface directed toward the object side in the first lens unit G1, the object side surface of the positive meniscus lens having a convex surface directed toward the object side located closest to the object side in the second lens unit G2, the image side surface of the positive meniscus lens having a convex surface directed toward the object side located closest to the image side in the second lens unit G2 and the object side surface of the biconvex positive lens in the third lens unit G3, namely there are six aspheric surfaces in total.

Figure 4A:
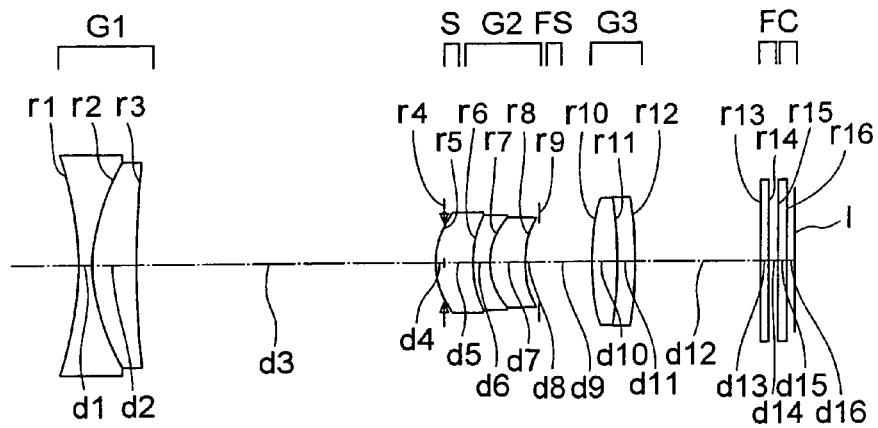
FIGS. 4A, 4B and 4C are cross sectional views similar to FIGS. 1A, 1B and 1C respectively, showing the configuration of a fourth embodiment of the zoom lens according to the present invention.
Figure 4B:
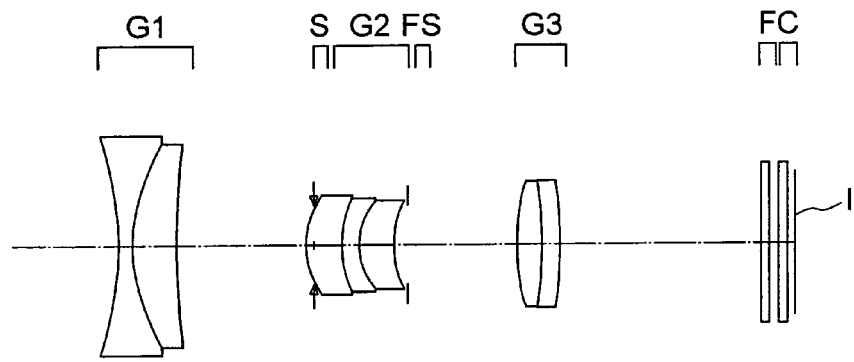
Figure 4C:
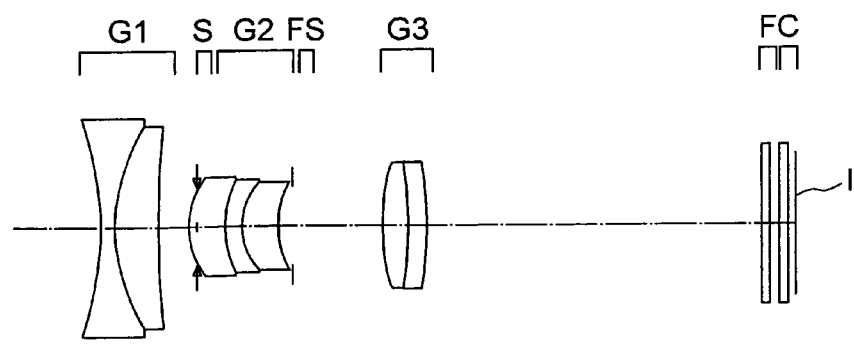

As shown in FIGS. 4A, 4B and 4C, the zoom lens according to the fourth embodiment has a first lens unit G1 having a negative refracting power, an iris stop S, a second lens unit G2 having a positive refracting power, a flare stop FS and a third lens unit G3 having a positive refracting power, which are arranged in the mentioned order from the object side.

During zooming from the wide angle end to the telephoto end, the first lens unit G1 moves first toward the image side and then toward the object side, the second lens unit G2 moves only toward the object side, and the third lens unit G3 moves only toward the object side.

The first lens unit G1 includes a cemented lens composed, in order from the object side, of a biconcave negative lens and a positive meniscus lens having a convex surface directed toward the object side. The second lens unit G2 includes a cemented lens composed, in order from the object side, of a positive meniscus lens having a convex surface directed toward the object side, a negative meniscus lens having a convex surface directed toward the object side and a positive meniscus lens having a convex surface directed toward the object side. The third lens unit G3 includes a cemented lens composed, in order from the object side, of a biconvex positive lens and a positive meniscus lens having a convex surface directed toward the image side.

Aspheric surfaces are used in the object side surface of the biconcave negative lens in the first lens unit G1, the image side surface of the positive meniscus lens having a convex surface directed toward the object side in the first lens unit G1, the object side surface of the positive meniscus lens having a convex surface directed toward the object side located closest to the object side in the second lens unit G2, the image side surface of the positive meniscus lens having a convex surface directed toward the object side located closest to the image side in the second lens unit G2 and the object side surface of the biconvex positive lens in the third lens unit G3, namely there are five aspheric surfaces in total.

Figure 5A:
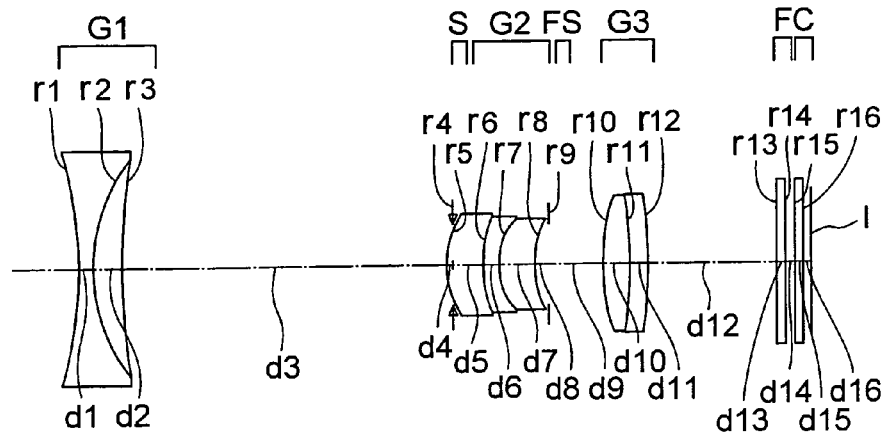
FIGS. 5A, 5B and 5C are cross sectional views similar to FIGS. 1A, 1B and 1C respectively, showing the configuration of a fifth embodiment of the zoom lens according to the present invention.
Figure 5B:
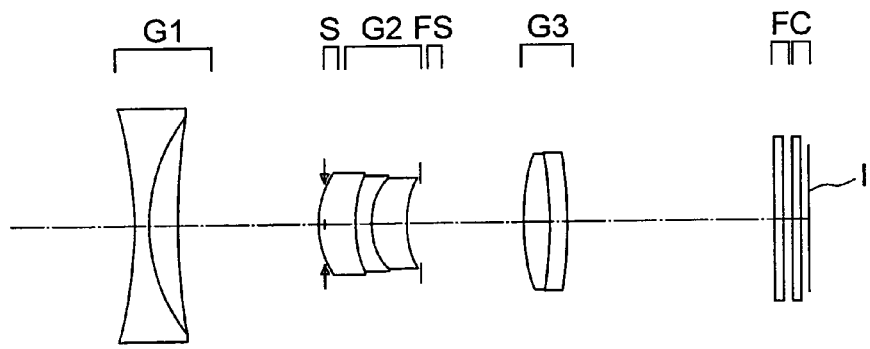
Figure 5C:
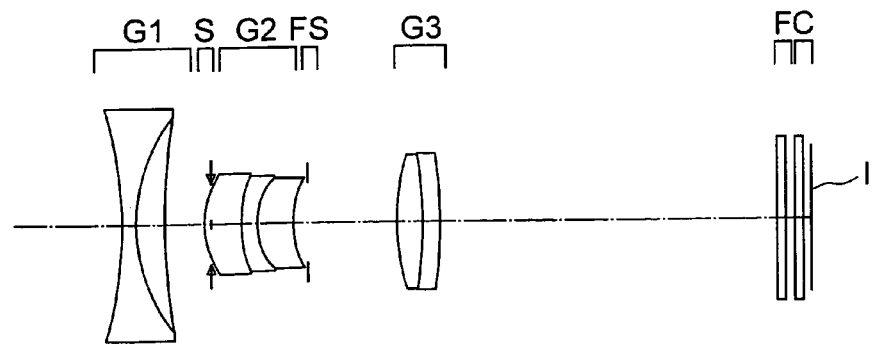

As shown in FIGS. 5A, 5B and 5C, the zoom lens according to the fifth embodiment has a first lens unit G1 having a negative refracting power, an iris stop S, a second lens unit G2 having a positive refracting power, a flare stop FS and a third lens unit G3 having a positive refracting power, which are arranged in the mentioned order from the object side.

During zooming from the wide angle end to the telephoto end, the first lens unit G1 moves first toward the image side and then toward the object side, the second lens unit G2 moves only toward the object side, and the third lens unit G3 moves only toward the object side.

The first lens unit G1 includes a cemented lens composed, in order from the object side, of a biconcave negative lens and a positive meniscus lens having a convex surface directed toward the object side. The second lens unit G2 includes a cemented lens composed, in order from the object side, of a positive meniscus lens having a convex surface directed toward the object side, a negative meniscus lens having a convex surface directed toward the object side and a positive meniscus lens having a convex surface directed toward the object side. The third lens unit G3 includes a cemented lens composed, in order from the object side, of a biconvex positive lens and a positive meniscus lens having a convex surface directed toward the image side.

Aspheric surfaces are used in both the side surfaces of the biconcave negative lens in the first lens unit G1, the image side surface of the positive meniscus lens having a convex surface directed toward the object side in the first lens unit G1, the object side surface of the positive meniscus lens having a convex surface directed toward the object side located closest to the object side in the second lens unit G2, the image side surface of the positive meniscus lens having a convex surface directed toward the object side located closest to the image side in the second lens unit G2 and the object side surface of the biconvex positive lens in the third lens unit G3, namely there are six aspheric surfaces in total.

Figure 6A:
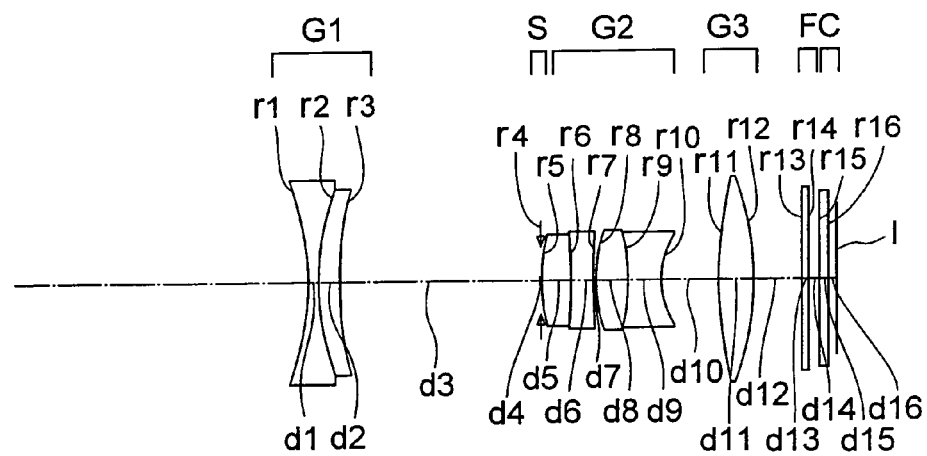
FIGS. 6A, 6B and 6C are cross sectional views similar to FIGS. 1A, 1B and 1C respectively, showing the configuration of a sixth embodiment of the zoom lens according to the present invention.
Figure 6B:
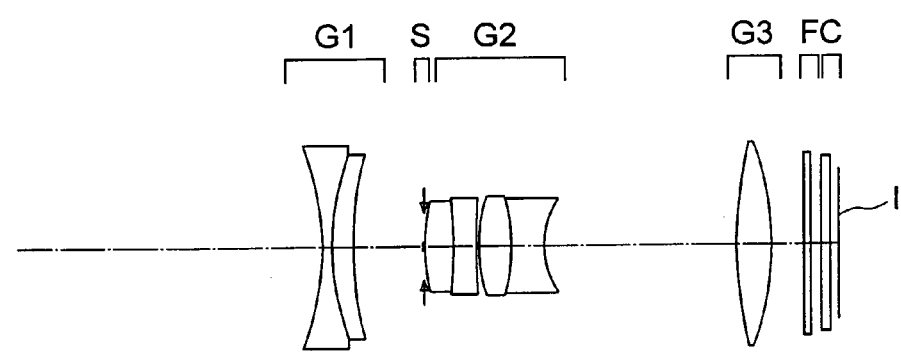
Figure 6C:
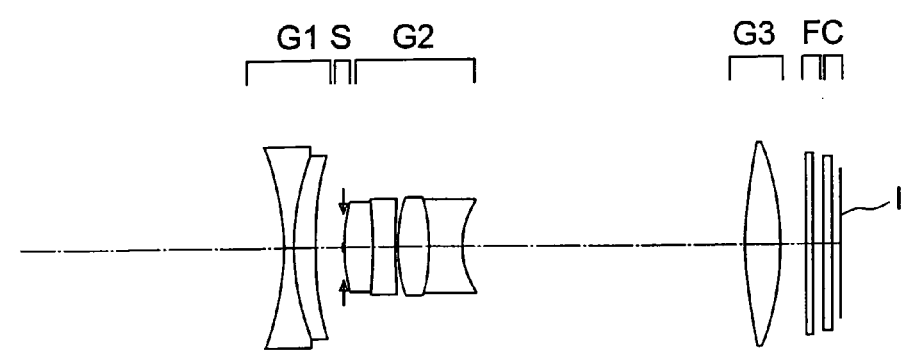

As shown in FIGS. 6A, 6B and 6C, the zoom lens according to the sixth embodiment has a first lens unit G1 having a negative refracting power, an iris stop S, a second lens unit G2 having a positive refracting power and a third lens unit G3 having a positive refracting power, which are arranged in the mentioned order from the object side.

During zooming from the wide angle end to the telephoto end, the first lens unit G1 moves first toward the image side and then toward the object side, the second lens unit G2 moves only toward the object side, and the third lens unit G3 moves only toward the image side.

The first lens unit G1 includes a cemented lens composed, in order from the object side, of a biconcave negative lens and a positive meniscus lens having a convex surface directed toward the object side. The second lens unit G2 includes a cemented lens composed, in order from the object side, of a biconvex positive lens and a biconcave negative lens and a cemented lens composed, in order from the object side, of a biconvex positive lens and a biconcave negative lens. The third lens unit G3 includes a biconvex positive lens.

Aspheric surfaces are used in the object side surface of the biconcave negative lens in the first lens unit G1, the image side surface of the positive meniscus lens having a convex surface directed toward the object side in the first lens unit G1, the object side surface of the biconvex positive lens located closest to the object side in the second lens unit G2, the image side surface of the biconcave negative lens located closest to the object side in the second lens unit G2 and the image side surface of the biconvex positive lens in the third lens unit G3, namely there are five aspheric surfaces in total.

Figure 7A:
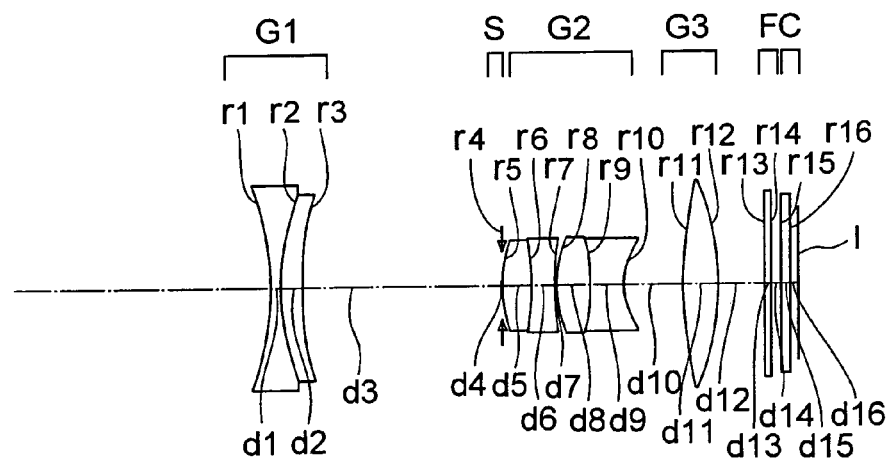
FIGS. 7A, 7B and 7C are cross sectional views similar to FIGS. 1A, 1B and 1C respectively, showing the configuration of a seventh embodiment of the zoom lens according to the present invention.
Figure 7B:
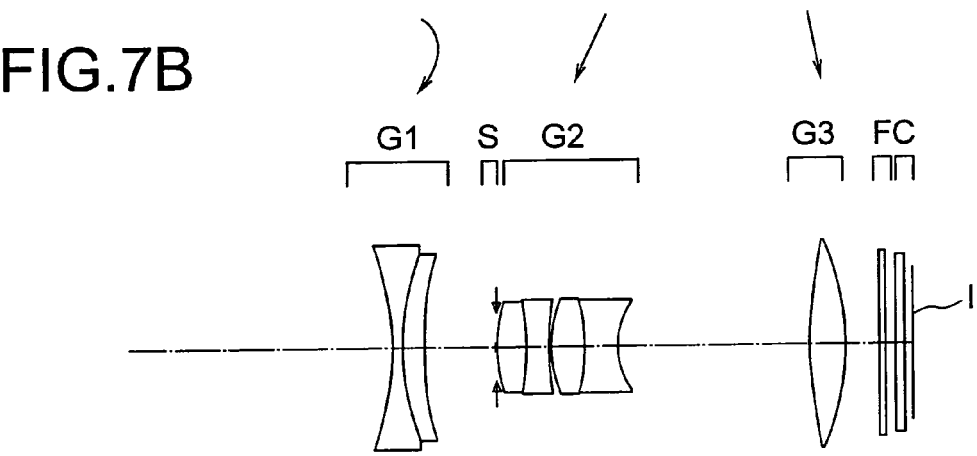
Figure 7C:
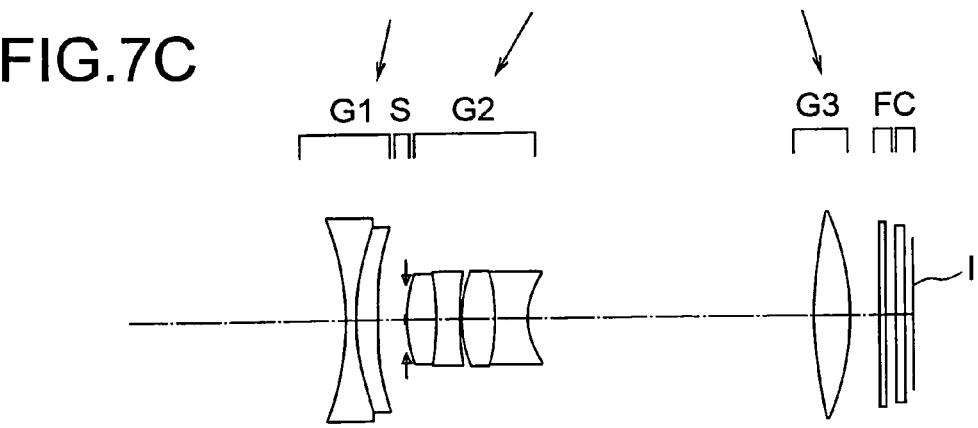

As shown in FIGS. 7A, 7B and 7C, the zoom lens according to the seventh embodiment has a first lens unit G1 having a negative refracting power, an iris stop S, a second lens unit G2 having a positive refracting power and a third lens unit G3 having a positive refracting power, which are arranged in the mentioned order from the object side.

During zooming from the wide angle end to the telephoto end, the first lens unit G1 moves first toward the image side and then toward the object side, the second lens unit G2 moves only toward the object side, and the third lens unit G3 moves only toward the image side.

The first lens unit G1 includes a cemented lens composed, in order from the object side, of a biconcave negative lens and a positive meniscus lens having a convex surface directed toward the object side. The second lens unit G2 includes a cemented lens composed, in order from the object side, of a biconvex positive lens and a biconcave negative lens and a cemented lens composed, in order from the object side, of a biconvex positive lens and biconcave negative lens. The third lens unit G3 includes a biconvex positive lens.

Aspheric surfaces are used in both the side surfaces of the biconcave negative lens in the first lens unit G1, the image side surface of the positive meniscus lens having a convex surface directed toward the object side in the first lens unit G1, the object side surface of the biconvex positive lens located closest to the object side in the second lens unit G2, the image side surface of the biconcave negative lens located closest to the object side in the second lens unit G2 and the image side surface of the biconvex positive lens in the third lens unit G3, namely there are six aspheric surfaces in total.

Figure 8A:
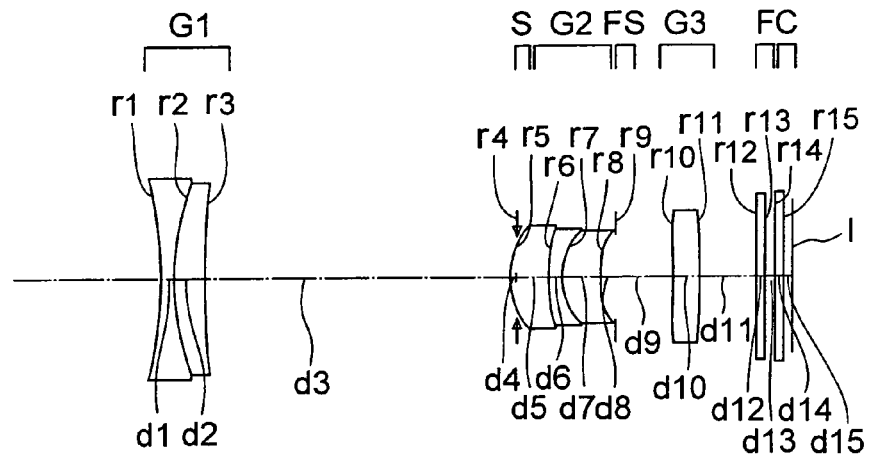
FIGS. 8A, 8B and 8C are cross sectional views similar to FIGS. 1A, 1B and 1C respectively, showing the configuration of a eighth embodiment of the zoom lens according to the present invention.
Figure 8B:
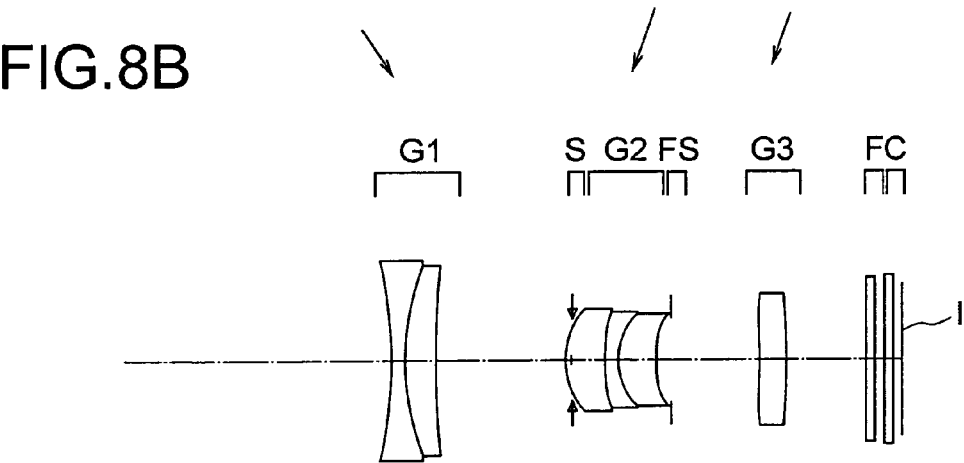
Figure 8C:
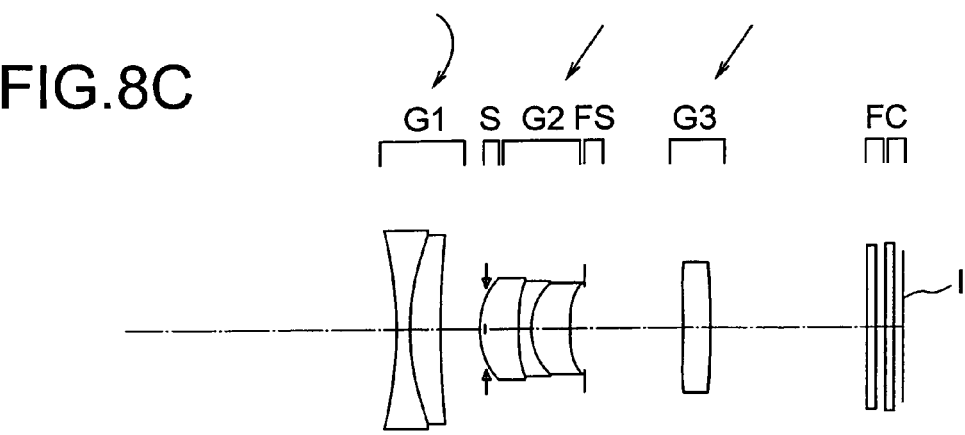

As shown in FIGS. 8A, 8B and 8C, the zoom lens according to the eighth embodiment has a first lens unit G1 having a negative refracting power, an iris stop S, a second lens unit G2 having a positive refracting power, a flare stop FS and a third lens unit G3 having a negative refracting power, which are arranged in the mentioned order from the object side.

During zooming from the wide angle end to the telephoto end, the first lens unit G1 moves first toward the image side and then toward the object side, the second lens unit G2 moves only toward the object side, and the third lens unit G3 moves only toward the object side.

The first lens unit G1 includes a cemented lens composed, in order from the object side, of a biconcave negative lens and a positive meniscus lens having a convex surface directed toward the object side. The second lens unit G2 includes a cemented lens composed, in order from the object side, of a positive meniscus lens having a convex surface directed toward the object side, a negative meniscus lens having a convex surface directed toward the object side and a positive meniscus lens having a convex surface directed toward the object side. The third lens unit G3 includes a negative meniscus lens having a convex surface directed toward the image side.

Aspheric surfaces are used in the object side surface of the biconcave negative lens in the first lens unit G1, the image side surface of the positive meniscus lens having a convex surface directed toward the object side in the first lens unit G1, the object side surface of the positive meniscus lens having a convex surface directed toward the object side located closest to the object side in the second lens unit G2, the image side surface of the positive meniscus lens having a convex surface directed toward the object side located closest to the image side in the second lens unit G2 and the object side surface of the negative meniscus lens having a convex surface directed toward the image side in the third lens unit G3, namely there are five aspheric surfaces in total.

Figure 9A:
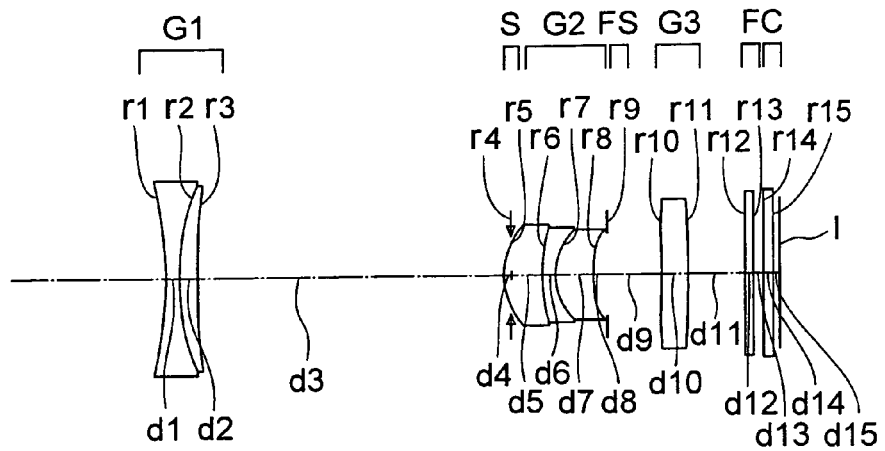
FIGS. 9A, 9B and 9C are cross sectional views similar to FIGS. 1A, 1B and 1C respectively, showing the configuration of a ninth embodiment of the zoom lens according to the present invention.
Figure 9B:
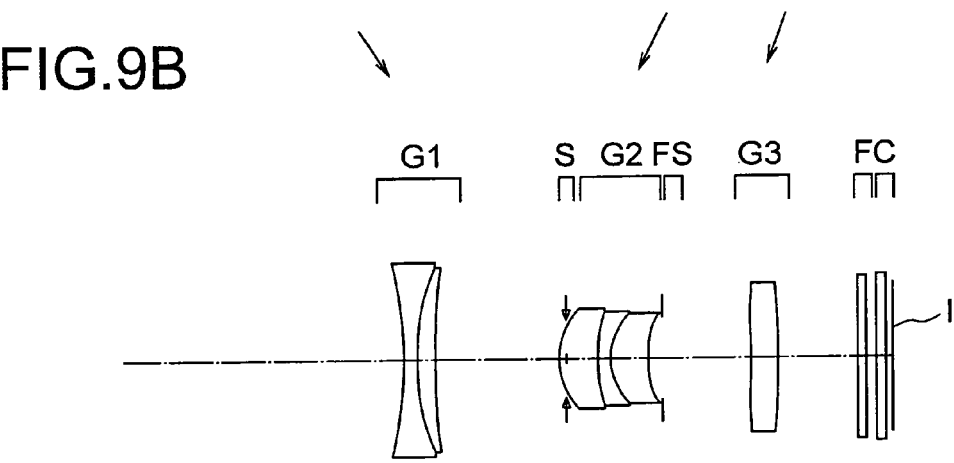
Figure 9C:
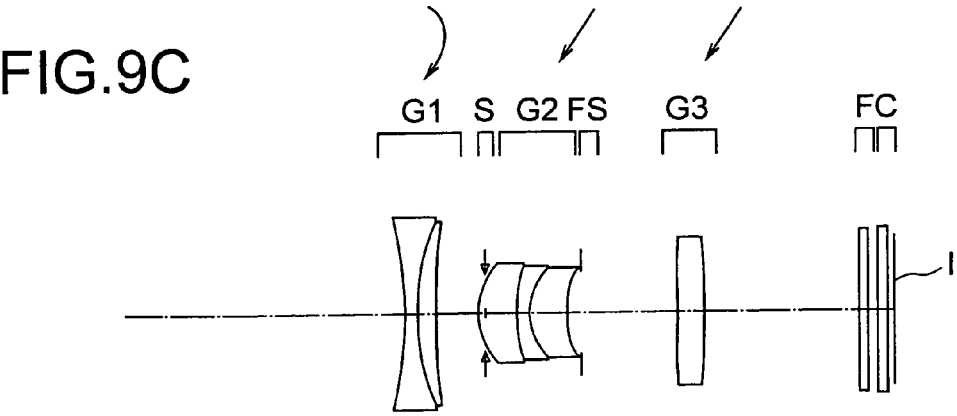

As shown in FIGS. 9A, 9B and 9C, the zoom lens according to the ninth embodiment has a first lens unit G1 having a negative refracting power, an iris stop S, a second lens unit G2 having a positive refracting power, a flare stop FS and a third lens unit G3 having a negative refracting power, which are arranged in the mentioned order from the object side.

During zooming from the wide angle end to the telephoto end, the first lens unit G1 moves first toward the image side and then toward the object side, the second lens unit G2 moves only toward the object side, and the third lens unit G3 moves only toward the object side.

The first lens unit G1 includes a cemented lens composed, in order from the object side, of a biconcave negative lens and a positive meniscus lens having a convex surface directed toward the object side. The second lens unit G2 includes a cemented lens composed, in order from the object side, of a positive meniscus lens having a convex surface directed toward the object side, a negative meniscus lens having a convex surface directed toward the object side and a positive meniscus lens having a convex surface directed toward the object side. The third lens unit G3 includes a negative meniscus lens having a convex surface directed toward the image side.

Aspheric surfaces are used in both the side surfaces of the biconcave negative lens in the first lens unit G1, the image side surface of the positive meniscus lens having a convex surface directed toward the object side in the first lens unit G1, the object side surface of the positive meniscus lens having a convex surface directed toward the object side located closest to the object side in the second lens unit G2, the image side surface of the positive meniscus lens having a convex surface directed toward the object side located closest to the image side in the second lens unit G2 and the object side surface of the negative meniscus lens having a convex surface directed toward the image side in the third lens unit G3, namely there are six aspheric surfaces in total.

Figure 10A:
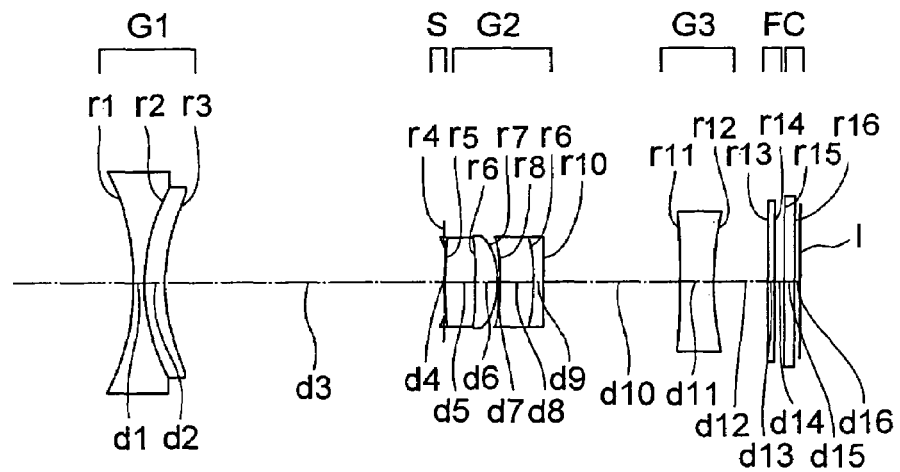
FIGS. 10A, 10B and 10C are cross sectional views similar to FIGS. 1A, 1B and 1C respectively, showing the configuration of a tenth embodiment of the zoom lens according to the present invention.
Figure 10B:
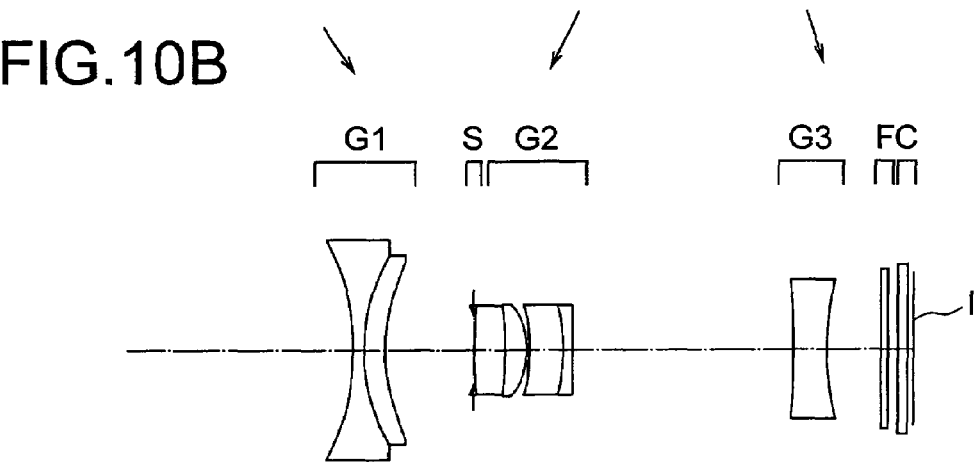
Figure 10C:
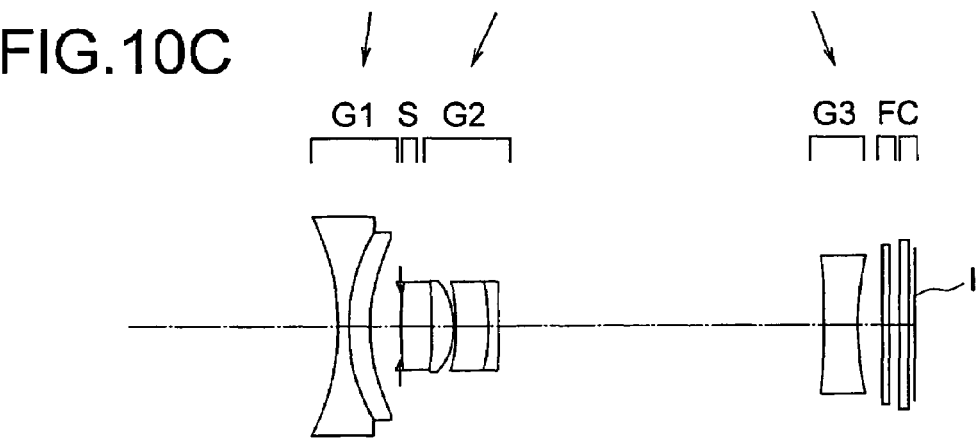

As shown in FIGS. 10A, 10B and 10C, the zoom lens according to the tenth embodiment has a first lens unit G1 having a negative refracting power, an iris stop S, a second lens unit G2 having a positive refracting power and a third lens unit G3 having a negative refracting power, which are arranged in the mentioned order from the object side.

During zooming from the wide angle end to the telephoto end, the first lens unit G1 moves first toward the image side and then toward the object side, the second lens unit G2 moves only toward the object side, and the third lens unit G3 moves only toward the image side.

The first lens unit G1 includes a cemented lens composed, in order from the object side, of a biconcave negative lens and a positive meniscus lens having a convex surface directed toward the object side. The second lens unit G2 includes a cemented lens composed, in order from the object side, of a biconvex positive lens and a positive meniscus lens having a convex surface directed toward the image side and a cemented lens composed, in order from the object side, of a negative meniscus lens having a convex surface directed toward the image side and a negative meniscus lens having a convex surface directed toward the image side. The third lens unit G3 includes a biconcave negative lens.

Aspheric surfaces are used in the object side surface of the biconcave negative lens in the first lens unit G1, the image side surface of the positive meniscus lens having a convex surface directed toward the object side in the first lens unit G1, the object side surface of the biconvex positive lens located closest to the object side in the second lens unit G2, the image side surface of the positive meniscus lens having a convex surface directed toward the image side in the second lens unit G2 and the image side surface of the biconcave negative lens in the third lens unit G3, namely there are five aspheric surfaces in total.

Figure 11A:
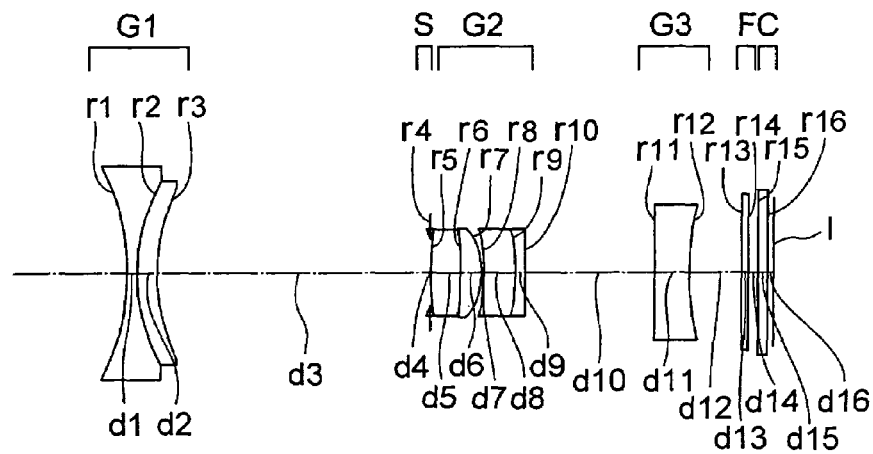
FIGS. 11A, 11B and 11C are cross sectional views similar to FIGS. 1A, 1B and 1C respectively, showing the configuration of a eleventh embodiment of the zoom lens according to the present invention.
Figure 11B:
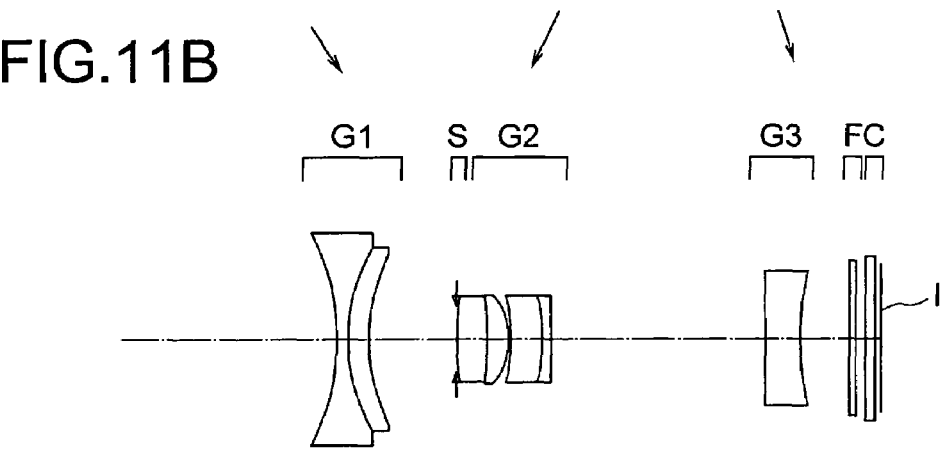
Figure 11C:
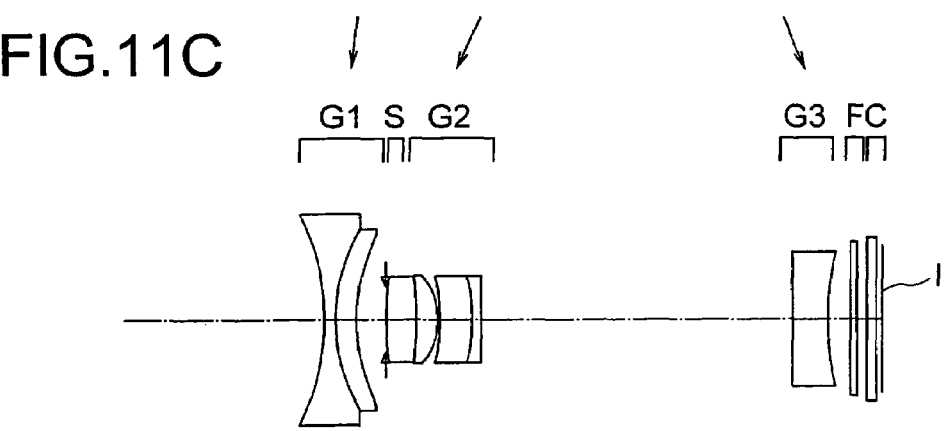

As shown in FIGS. 11A, 11B and 11C, the zoom lens according to the tenth embodiment has a first lens unit G1 having a negative refracting power, an iris stop S, a second lens unit G2 having a positive refracting power and a third lens unit G3 having a negative refracting power, which are arranged in the mentioned order from the object side.

During zooming from the wide angle end to the telephoto end, the first lens unit G1 moves first toward the image side and then toward the object side, the second lens unit G2 moves only toward the object side, and the third lens unit G3 moves only toward the image side.

The first lens unit G1 includes a cemented lens composed, in order from the object side, of a biconcave negative lens and a positive meniscus lens having a convex surface directed toward the object side. The second lens unit G2 includes a cemented lens composed, in order from the object side, of a biconvex positive lens and a positive meniscus lens having a convex surface directed toward the image side and a cemented lens composed, in order from the object side, of a negative meniscus lens having a convex surface directed toward the image side and a negative meniscus lens having a convex surface directed toward the image side. The third lens unit G3 includes a biconcave negative lens.

Aspheric surfaces are used in both the side surfaces of the biconcave negative lens in the first lens unit G1, the image side surface of the positive meniscus lens having a convex surface directed toward the object side in the first lens unit G1, the object side surface of the biconvex positive lens located closest to the object side in the second lens unit G2, the image side surface of the positive meniscus lens having a convex surface directed toward the image side in the second lens unit G2 and the image side surface of the biconcave negative lens in the third lens unit G3, namely there are six aspheric surfaces in total.

Figure 12A:
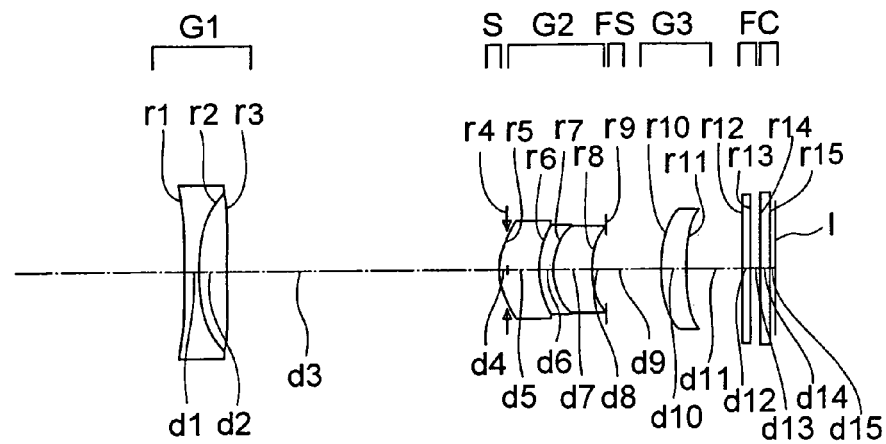
FIGS. 12A, 12B and 12C are cross sectional views similar to FIGS. 1A, 1B and 1C respectively, showing the configuration of a twelfth embodiment of the zoom lens according to the present invention.
Figure 12B:
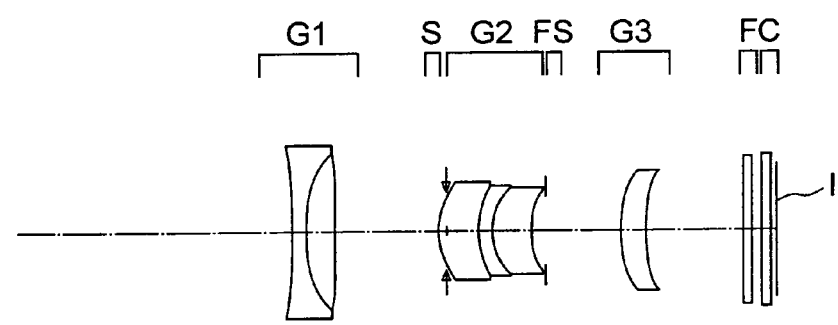
Figure 12C:
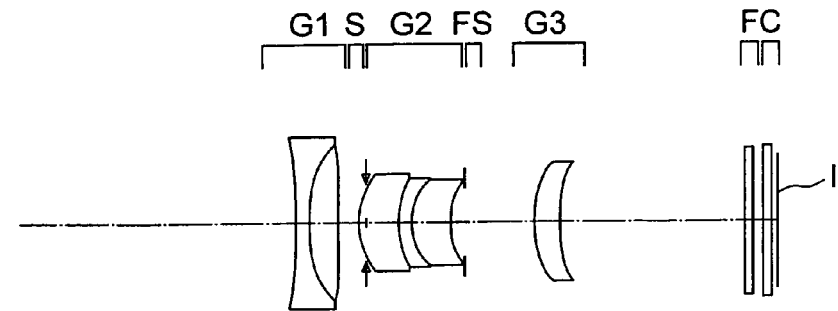
Figure 13A:
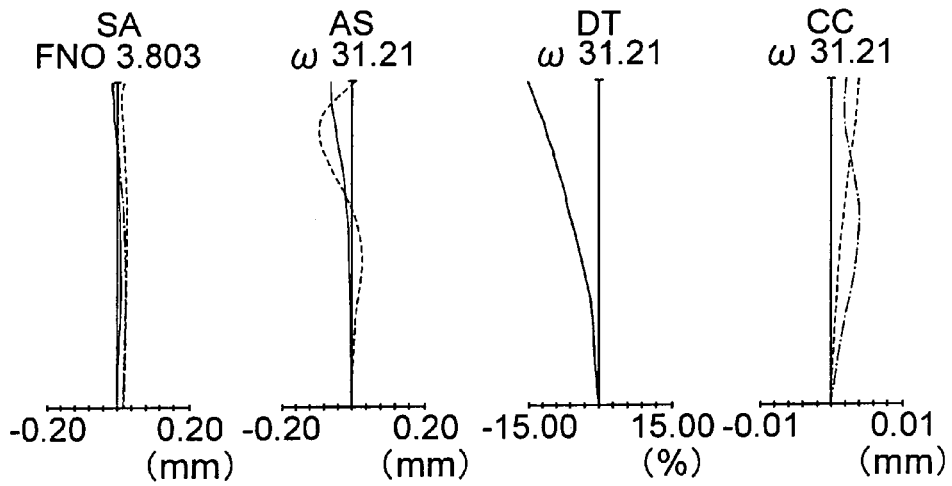
FIGS. 13A, 13B and 13C are diagrams showing spherical aberration, astigmatism, distortion and chromatic aberration of magnification in the first embodiment of the zoom lens according to the present invention in a state in which the zoom lens is focused on an object point at infinity, where
Figure 13B:
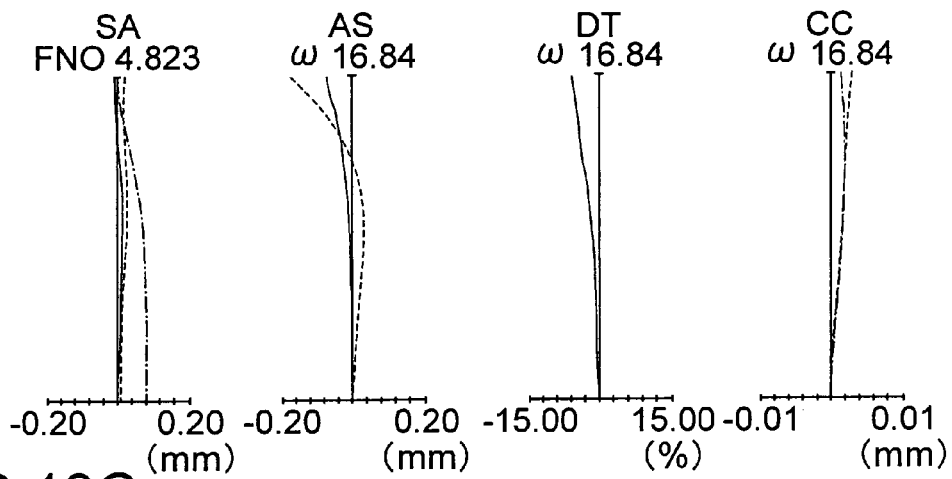
Figure 13C:
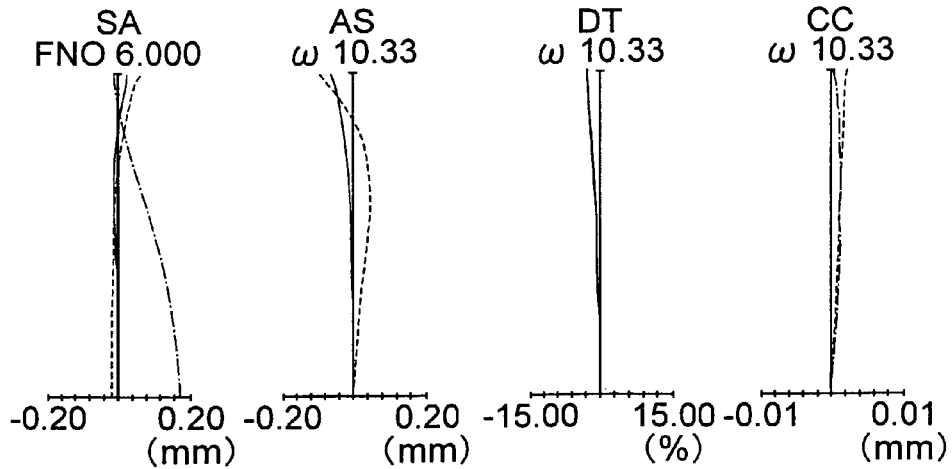
Figure 14A:
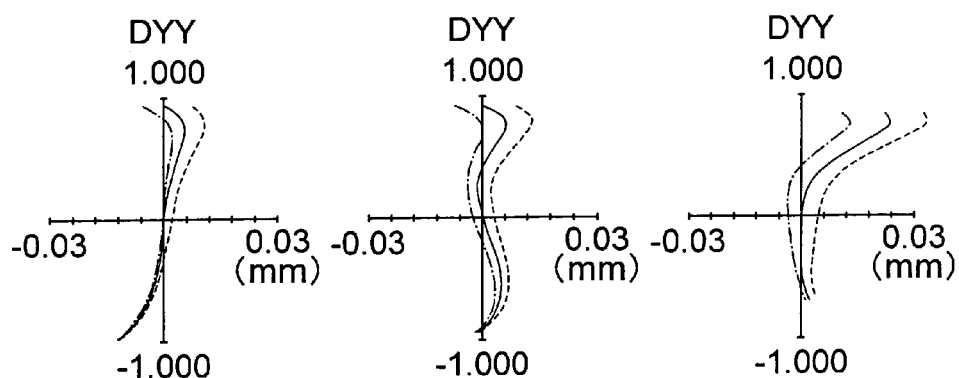
FIGS. 14A, 14B and 14C are diagrams showing transverse aberrations (at positions of 0.6 times the maximum image height, 0.8 times the maximum image height and 1.0 times the maximum image height) in the zoom lens of the first embodiment in a state in which the zoom lens is focused on an object point at infinity, where
Figure 14B:
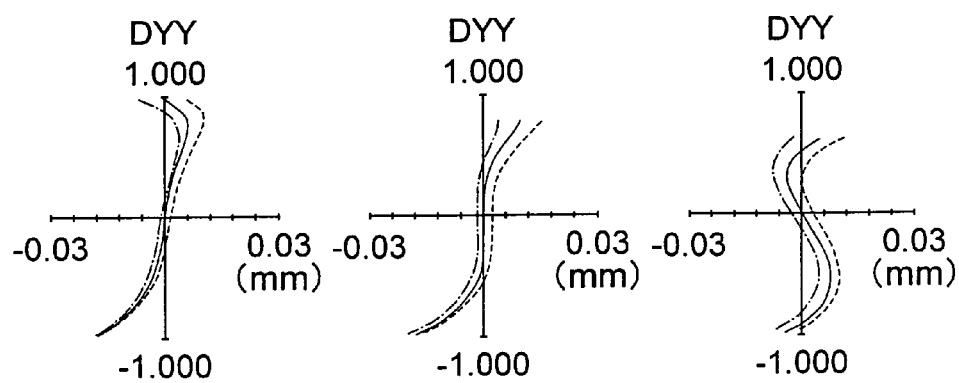
Figure 14C:
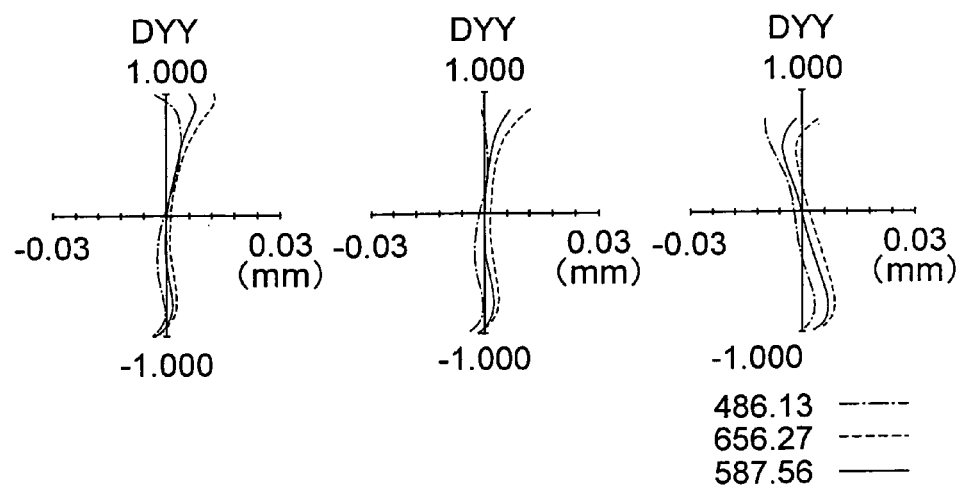
Figure 15A:
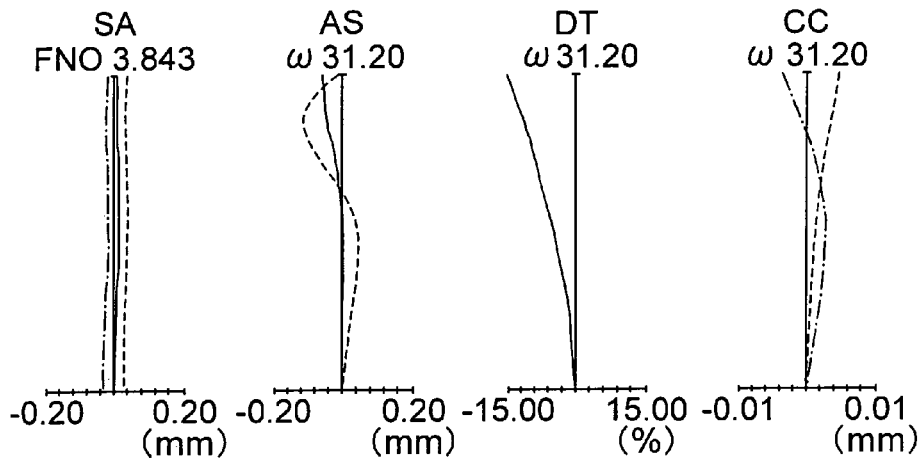
FIGS. 15A, 15B and 15C are diagrams similar to FIGS. 13A, 13B and 13C showing aberrations in the second embodiment in a state in which the zoom lens is focused on an object point at infinity.
Figure 15B:
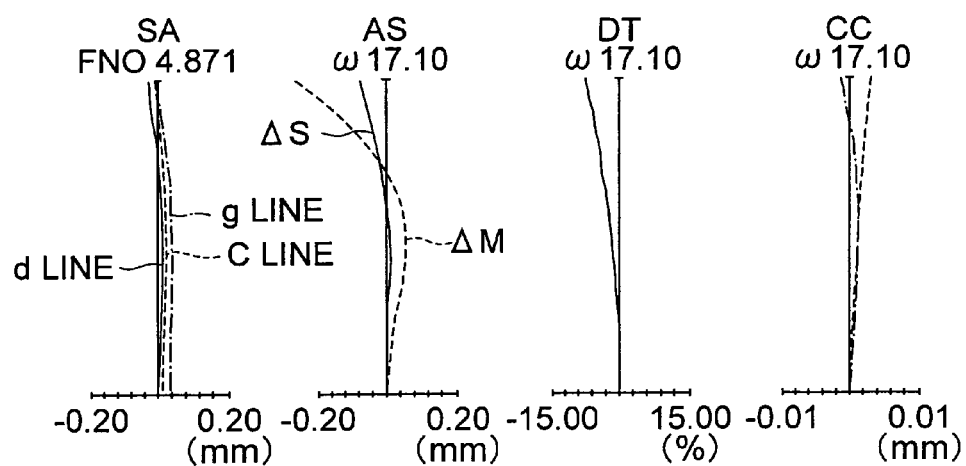
Figure 15C:
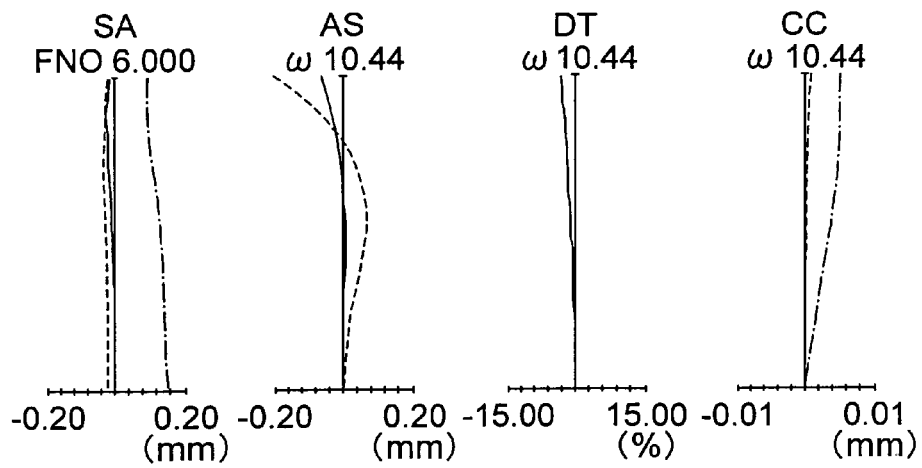
Figure 16A:
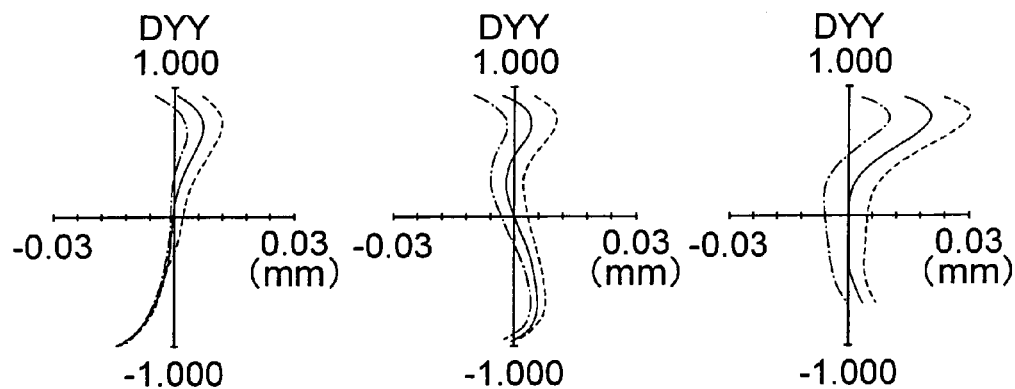
FIGS. 16A, 16B and 16C are diagrams similar to FIGS. 14A, 14B and 14C showing aberrations in the second embodiment in a state in which the zoom lens is focused on an object point at infinity.
Figure 16B:
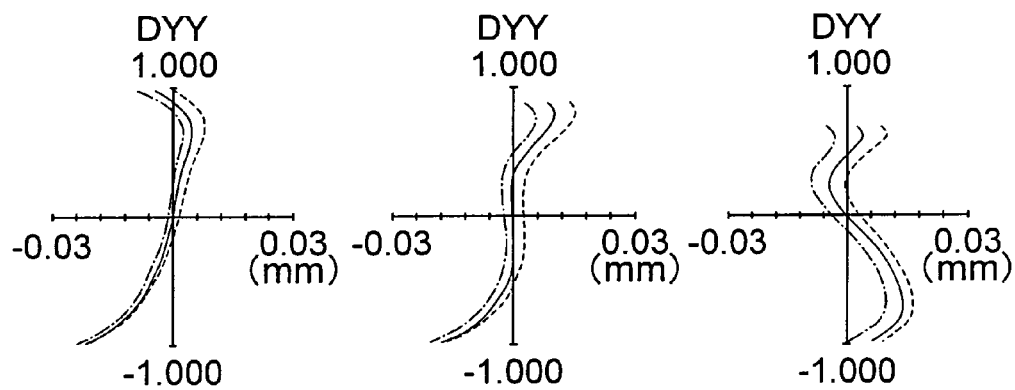
Figure 16C:
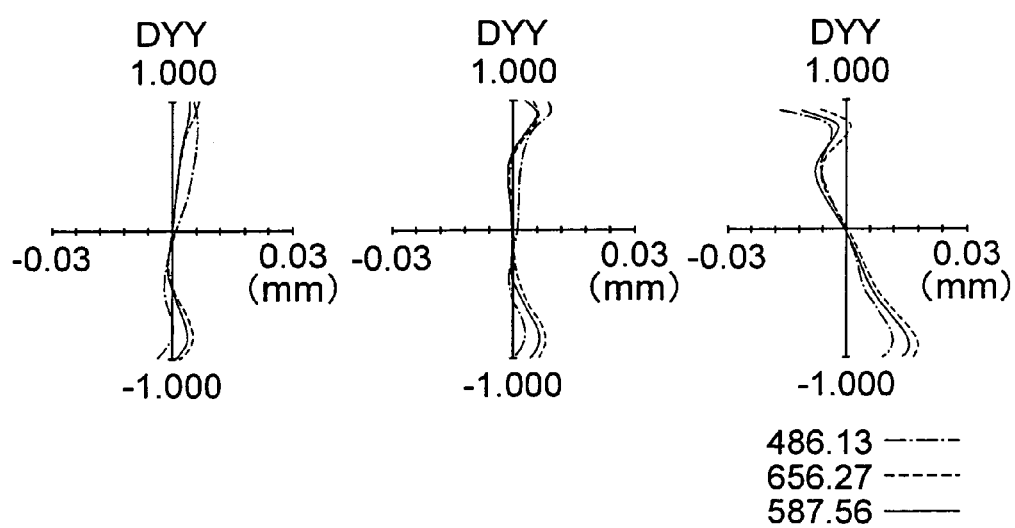
Figure 17A:
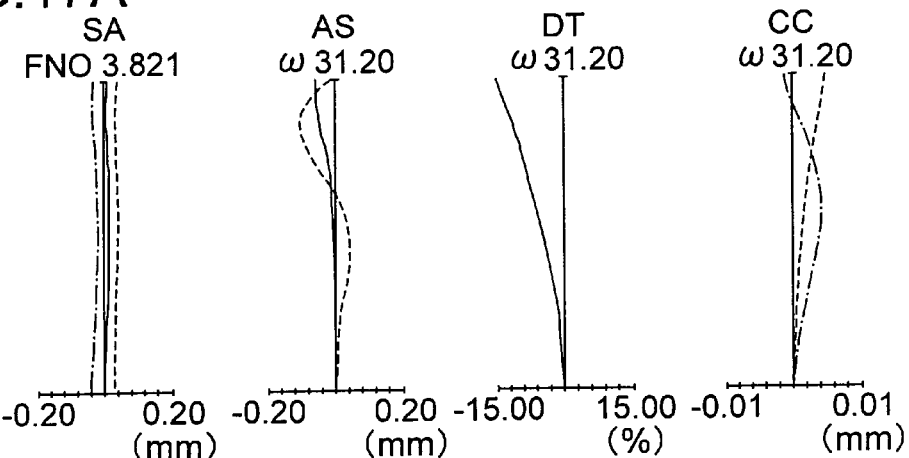
FIGS. 17A, 17B and 17C are diagrams similar to FIGS. 13A, 13B and 13C showing aberrations in the third embodiment in a state in which the zoom lens is focused on an object point at infinity.
Figure 17B:
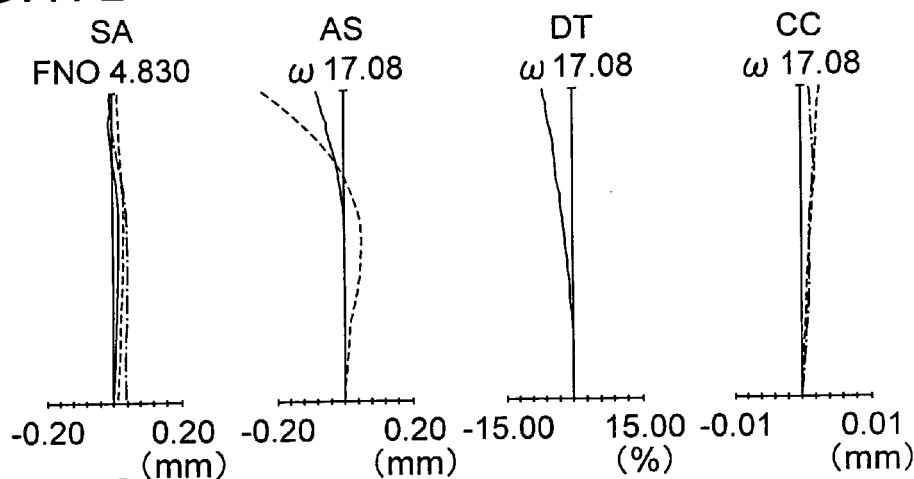
Figure 17C:
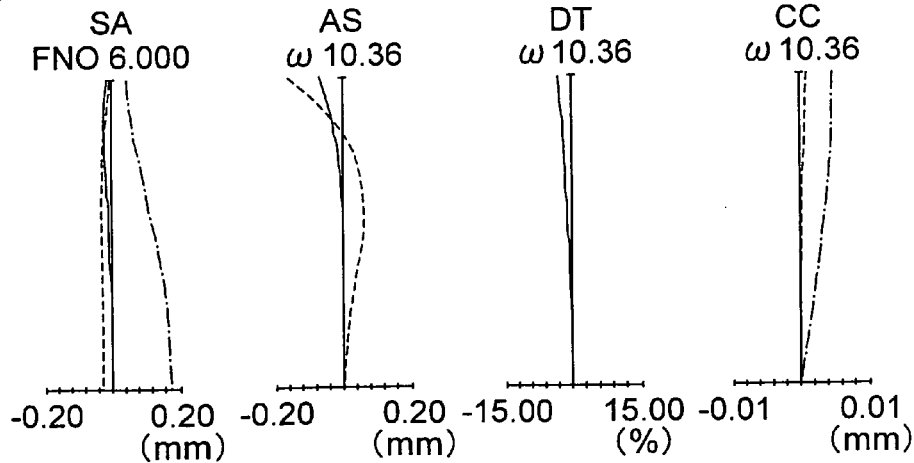
Figure 18A:
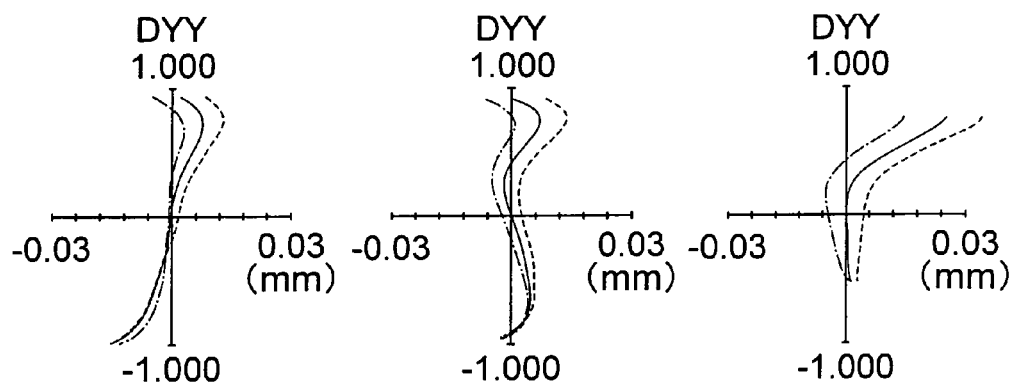
FIGS. 18A, 18B and 18C are diagrams similar to FIGS. 14A, 14B and 14C showing aberrations in the third embodiment in a state in which the zoom lens is focused on an object point at infinity.
Figure 18B:
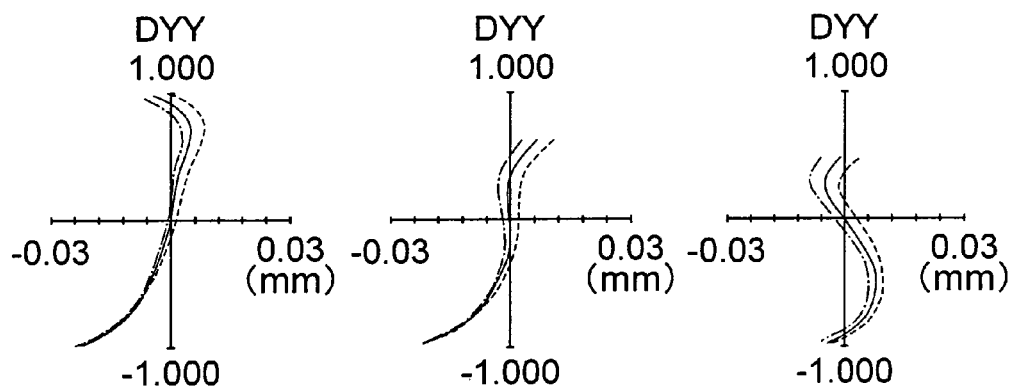
Figure 18C:
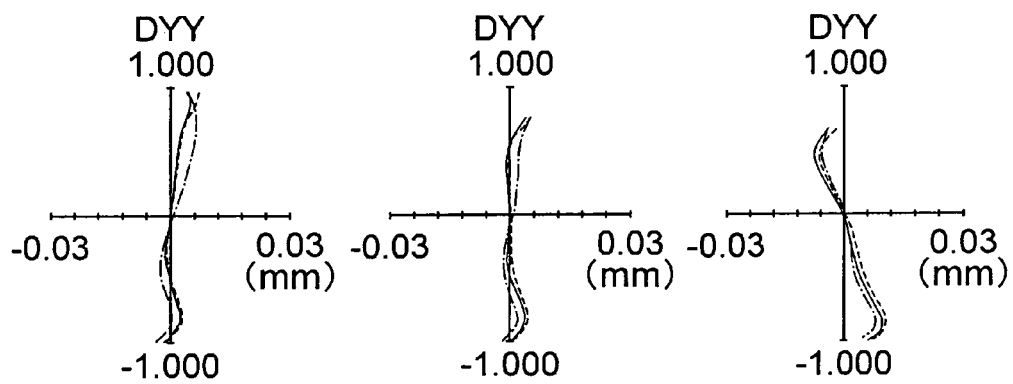
Figure 19A:
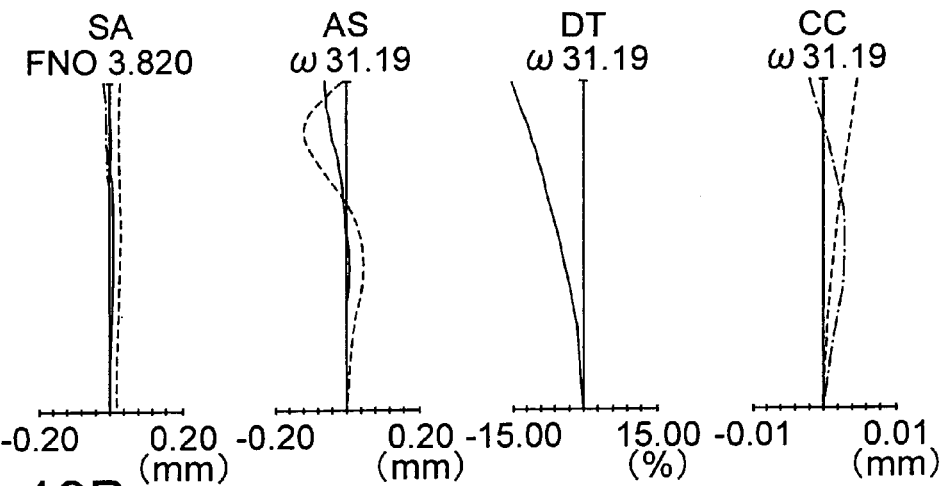
FIGS. 19A, 19B and 19C are diagrams similar to FIGS. 13A, 13B and 13C showing aberrations in the fourth embodiment in a state in which the zoom lens is focused on an object point at infinity.
Figure 19B:
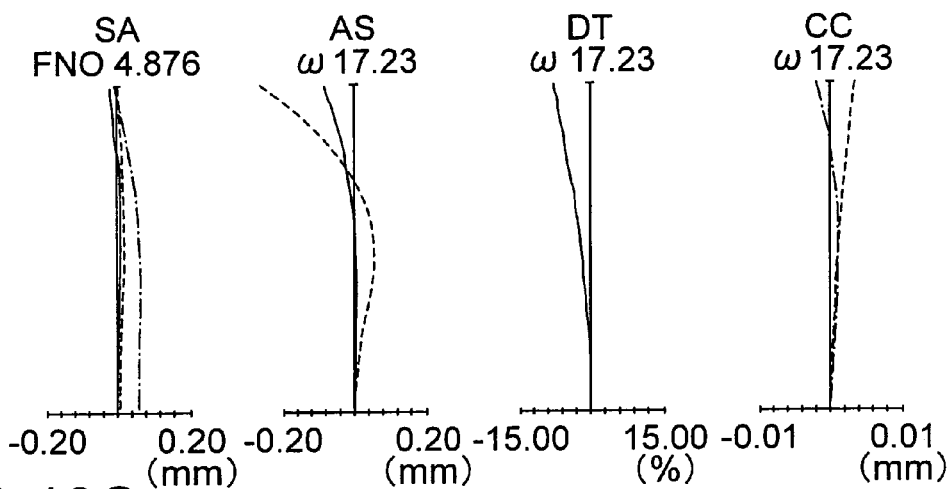
Figure 19C:
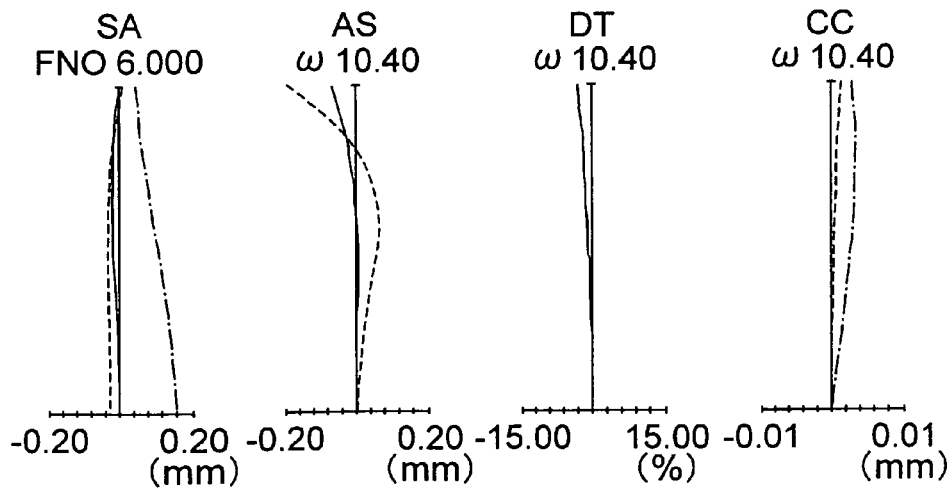
Figure 20A:
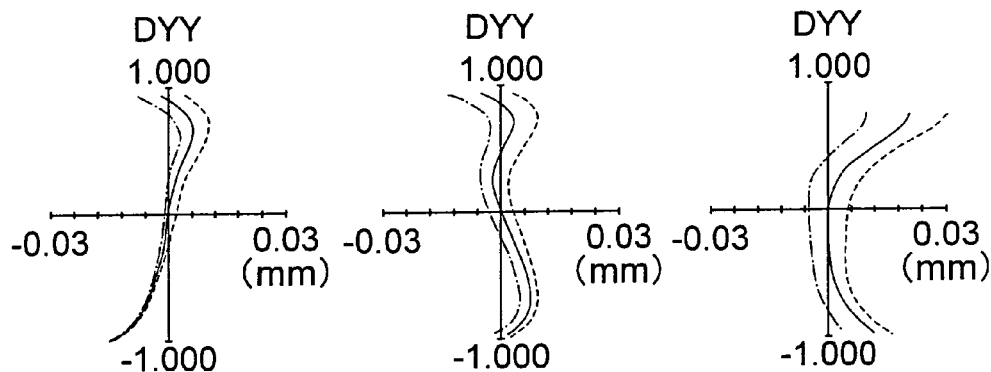
FIGS. 20A, 20B and 20C are diagrams similar to FIGS. 14A, 14B and 14C showing aberrations in the fourth embodiment in a state in which the zoom lens is focused on an object point at infinity.
Figure 20B:
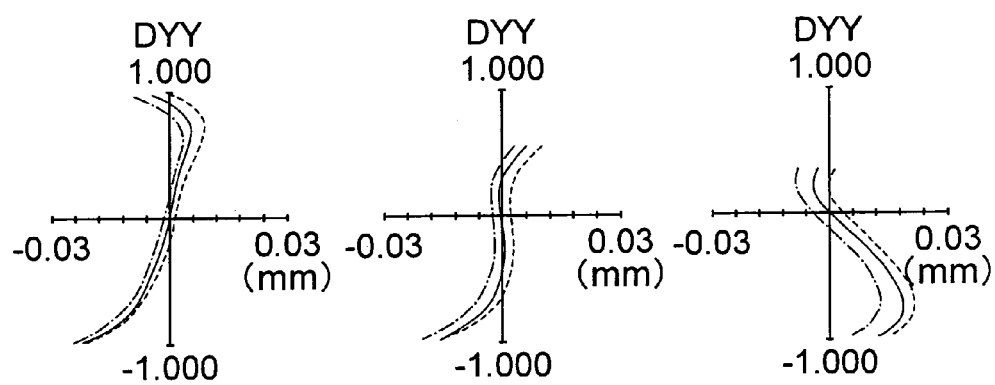
Figure 20C:
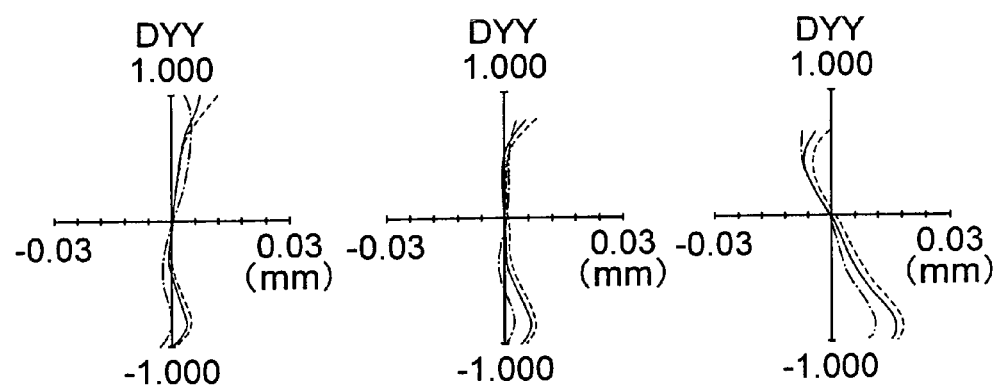
Figure 21A:
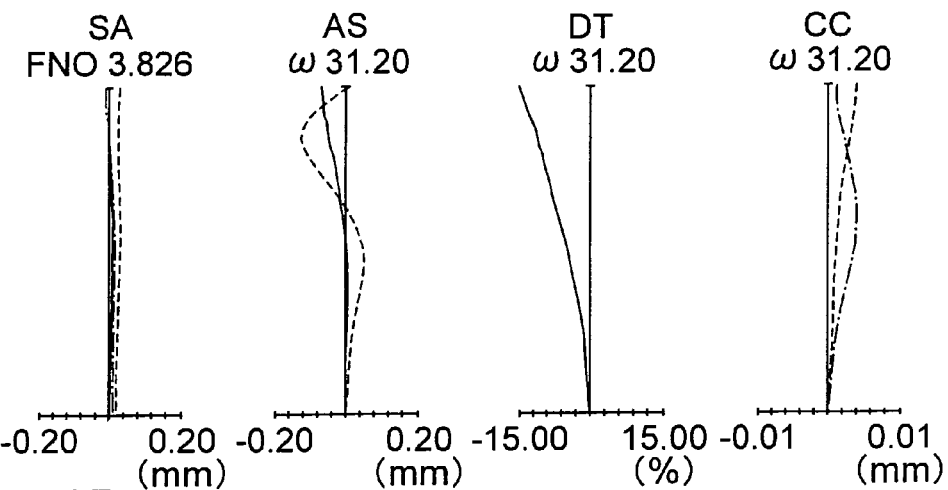
FIGS. 21A, 21B and 21C are diagrams similar to FIGS. 13A, 13B and 13C showing aberrations in the fifth embodiment in a state in which the zoom lens is focused on an object point at infinity.
Figure 21B:
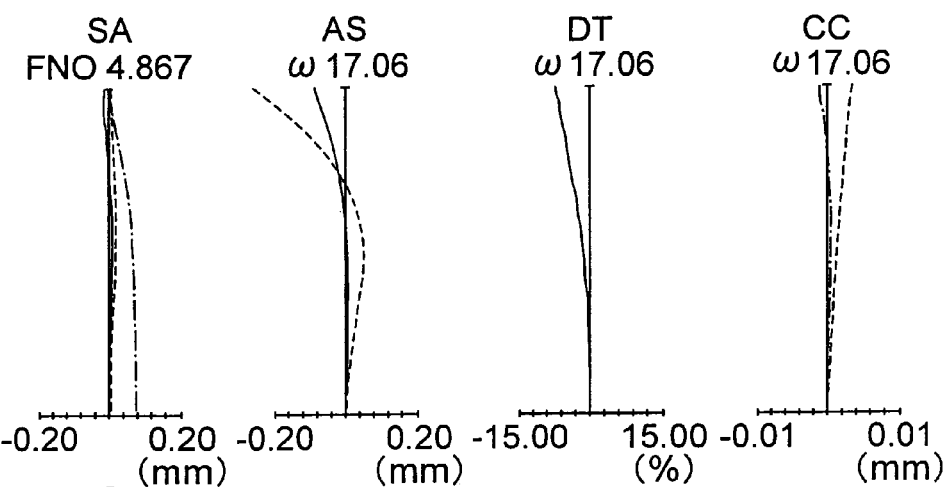
Figure 21C:
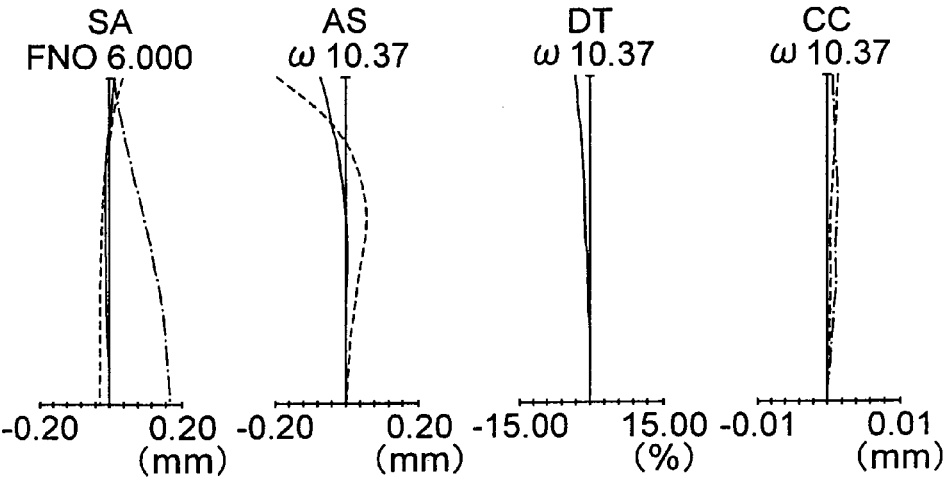
Figure 22A:
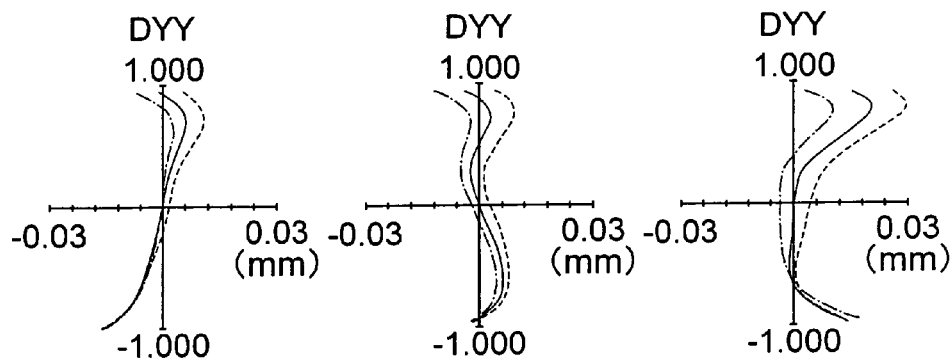
FIGS. 22A, 22B and 22C are diagrams similar to FIGS. 14A, 14B and 14C showing aberrations in the fifth embodiment in a state in which the zoom lens is focused on an object point at infinity.
Figure 22B:
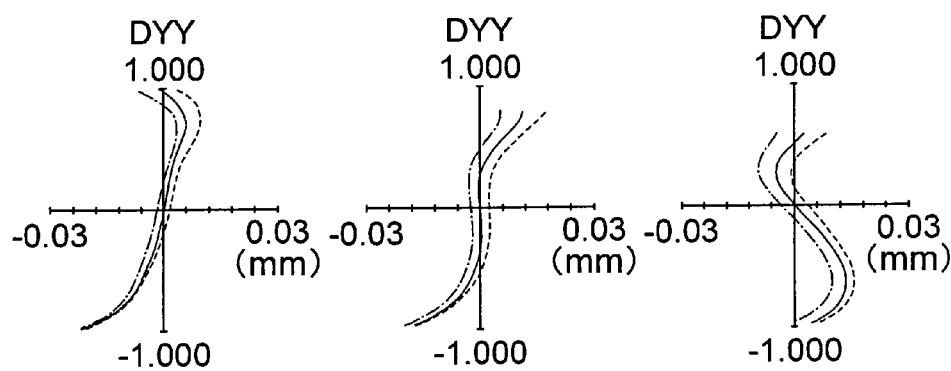
Figure 22C:
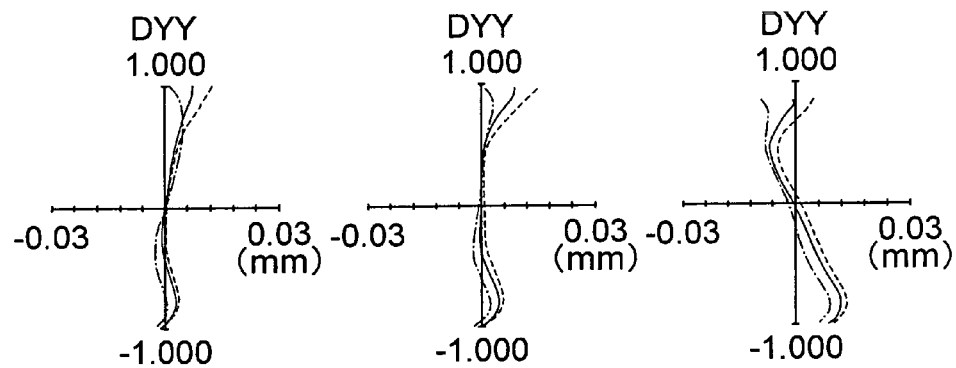
Figure 23A:
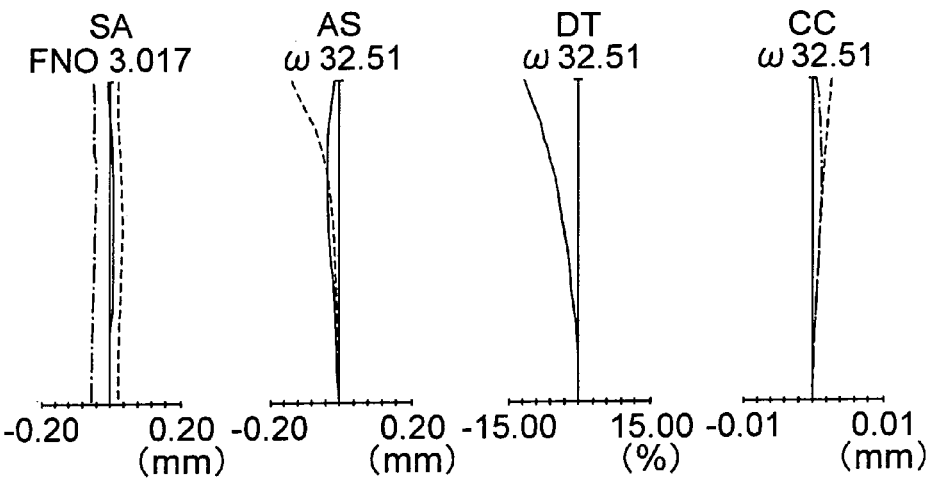
FIGS. 23A, 23B and 23C are diagrams similar to FIGS. 13A, 13B and 13C showing aberrations in the sixth embodiment in a state in which the zoom lens is focused on an object point at infinity.
Figure 23B:
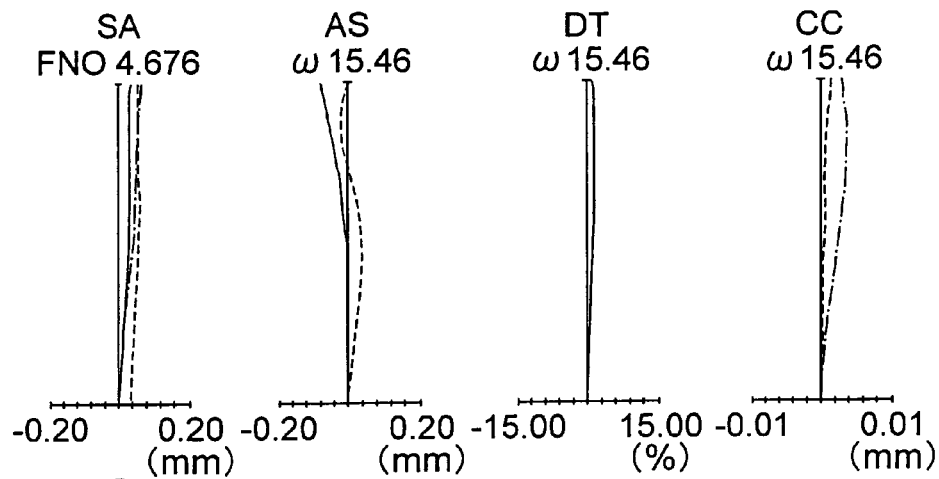
Figure 23C:
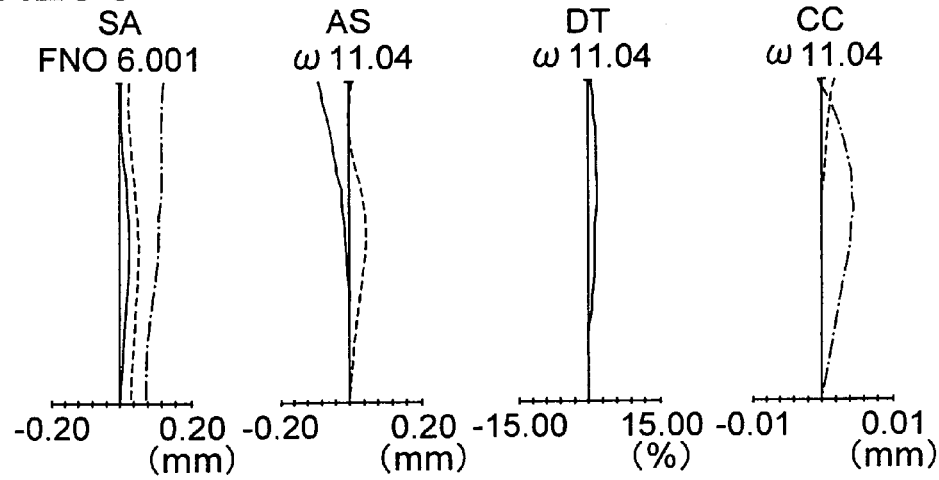
Figure 24A:
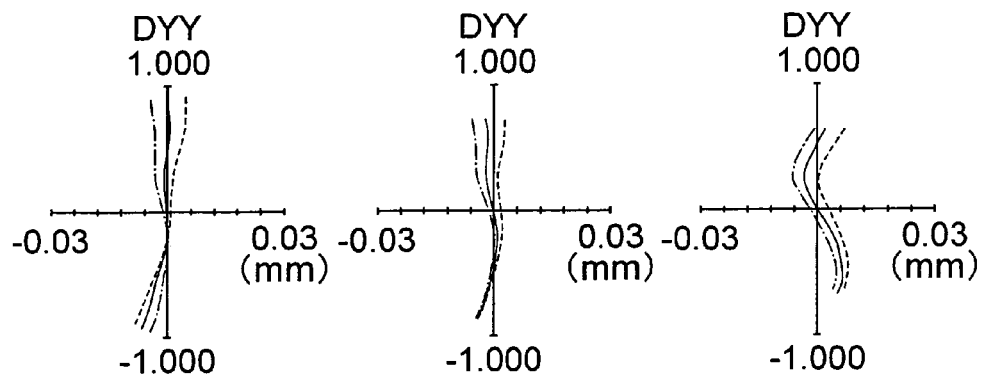
FIGS. 24A, 24B and 24C are diagrams similar to FIGS. 14A, 14B and 14C showing aberrations in the sixth embodiment in a state in which the zoom lens is focused on an object point at infinity.
Figure 24B:
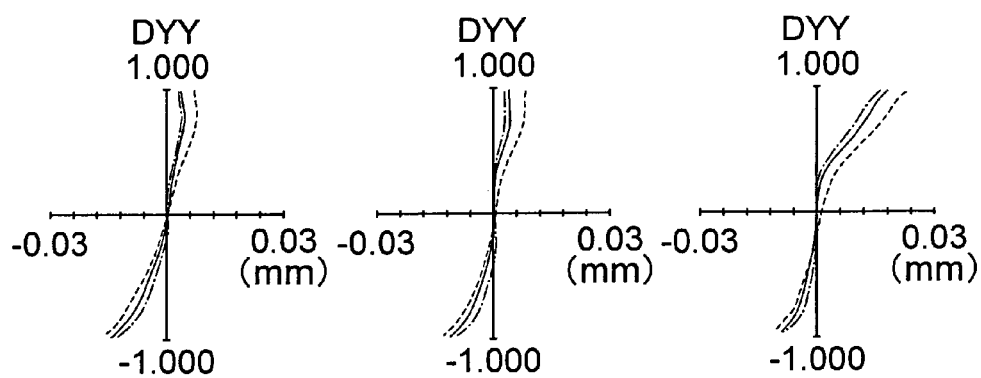
Figure 24C:
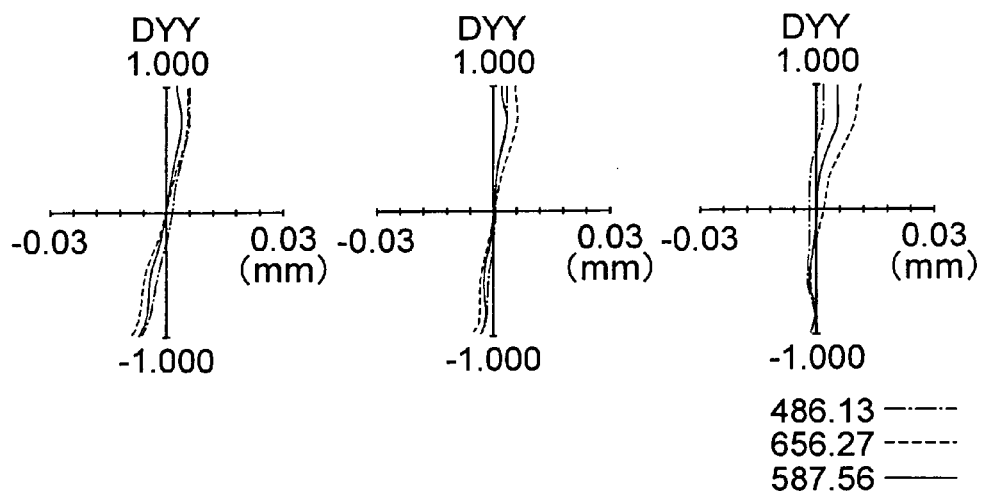
Figure 25A:
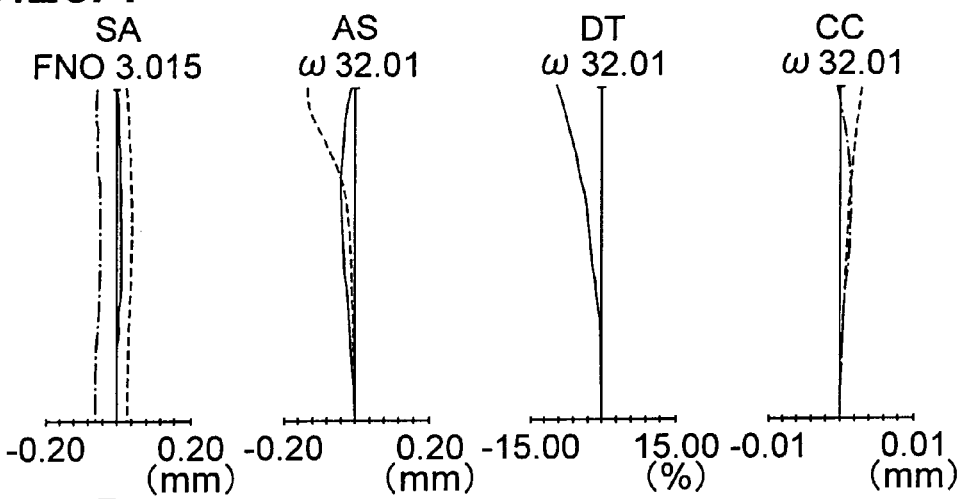
FIGS. 25A, 25B and 25C are diagrams similar to FIGS. 13A, 13B and 13C showing aberrations in the seventh embodiment in a state in which the zoom lens is focused on an object point at infinity.
Figure 25B:
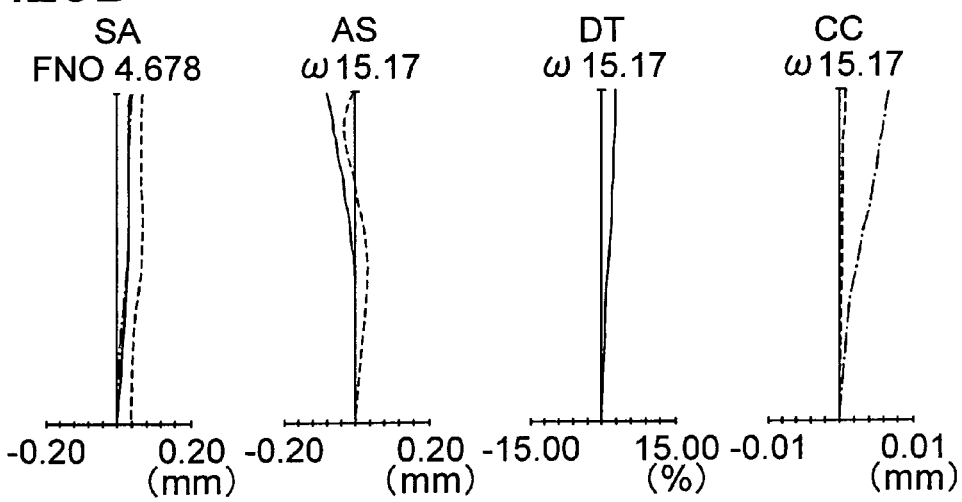
Figure 25C:
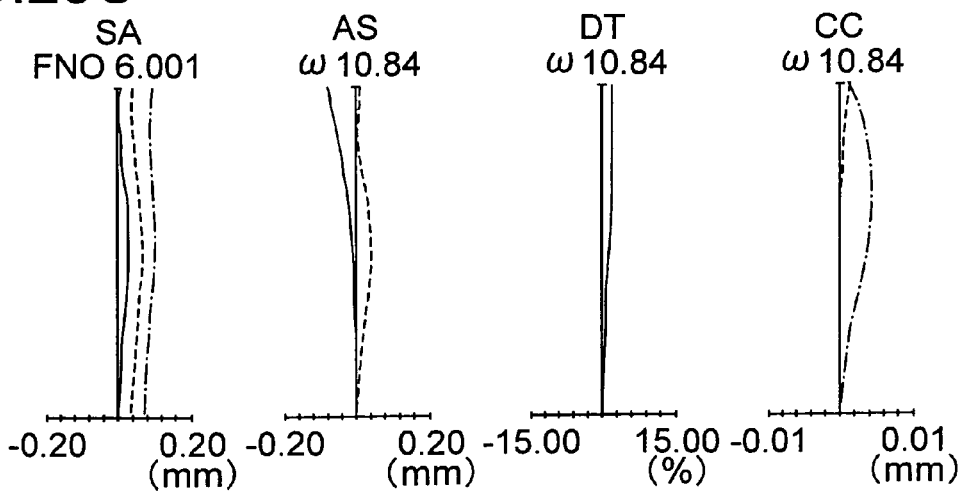
Figure 26A:
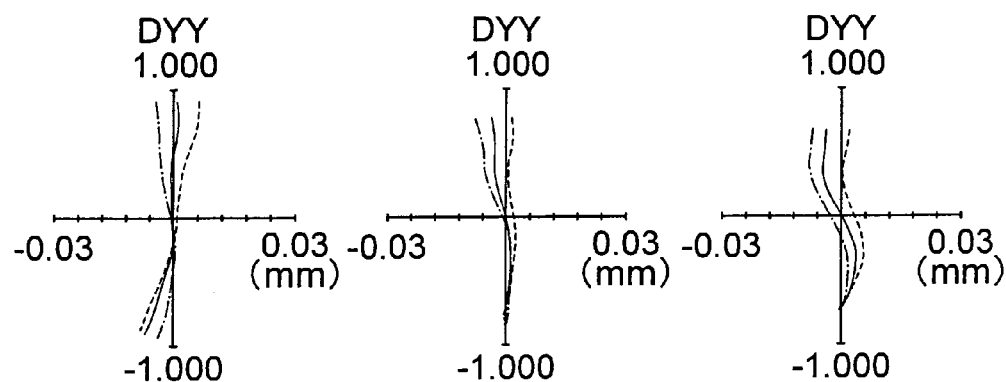
FIGS. 26A, 26B and 26C are diagrams similar to FIGS. 14A, 14B and 14C showing aberrations in the seventh embodiment in a state in which the zoom lens is focused on an object point at infinity.
Figure 26B:
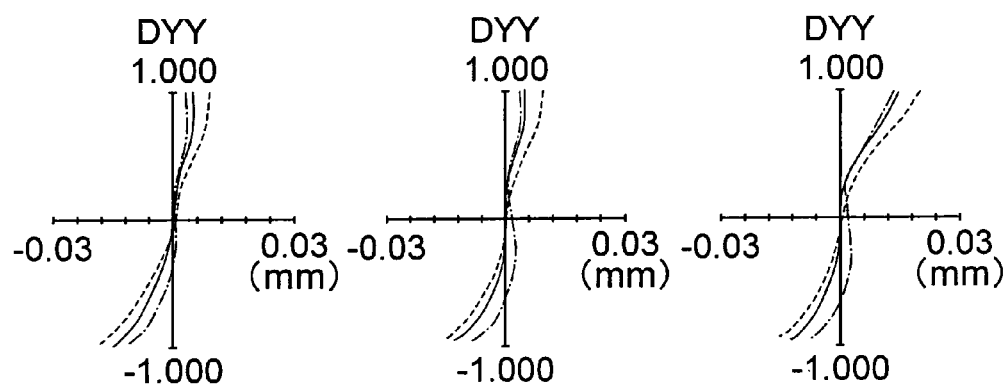
Figure 26C:
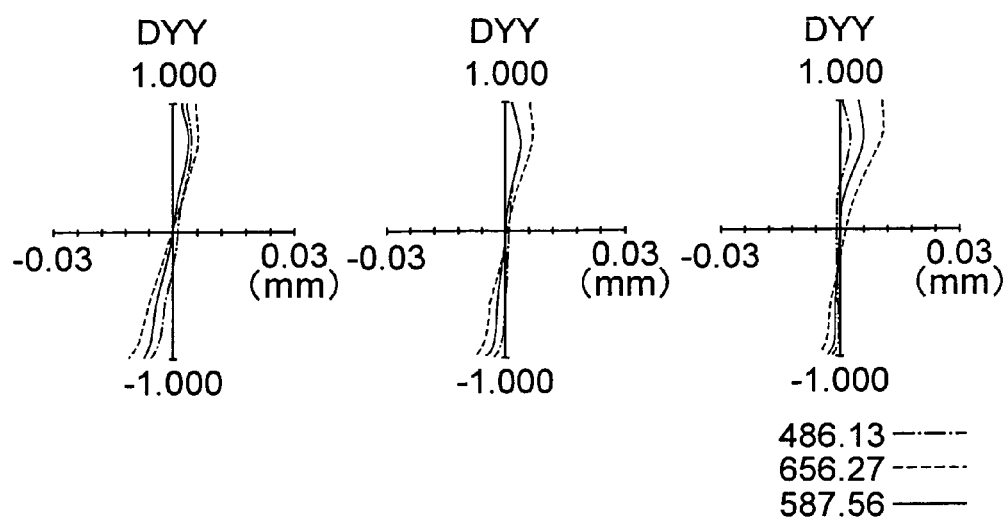
Figure 27A:
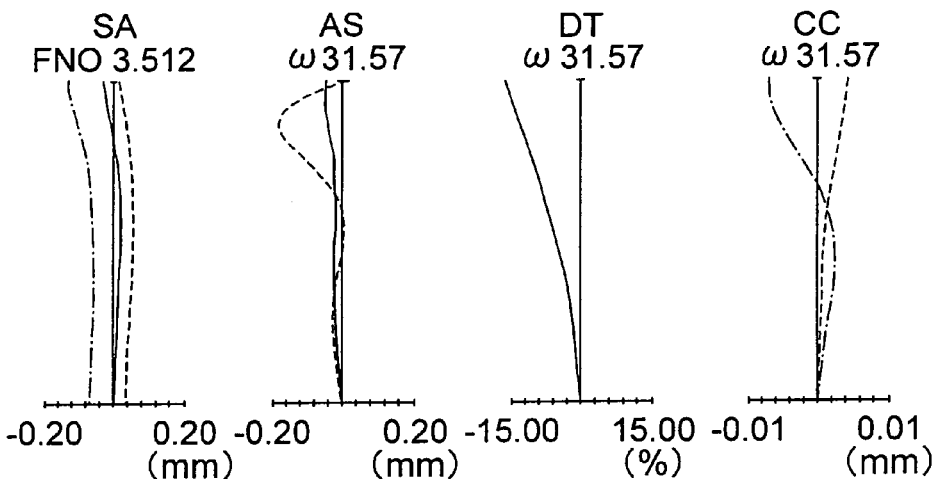
FIGS. 27A, 27B and 27C are diagrams similar to FIGS. 13A, 13B and 13C showing aberrations in the eighth embodiment in a state in which the zoom lens is focused on an object point at infinity.
Figure 27B:
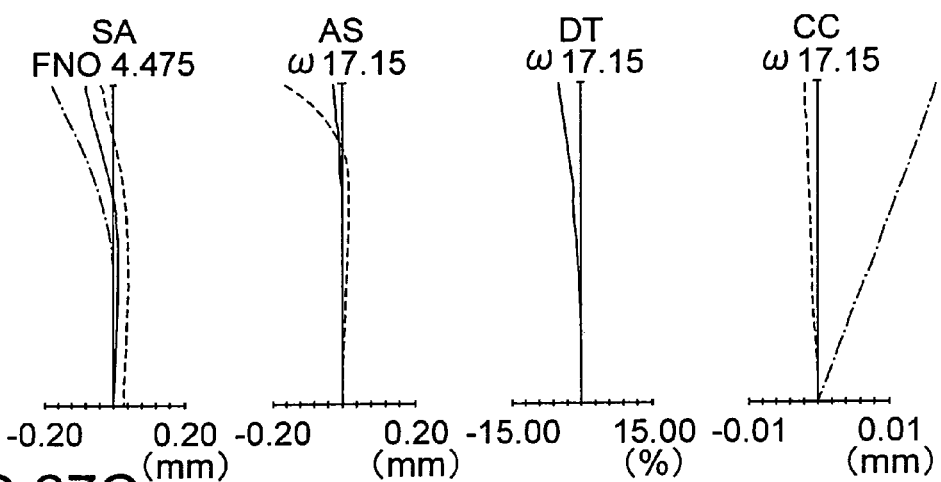
Figure 27C:
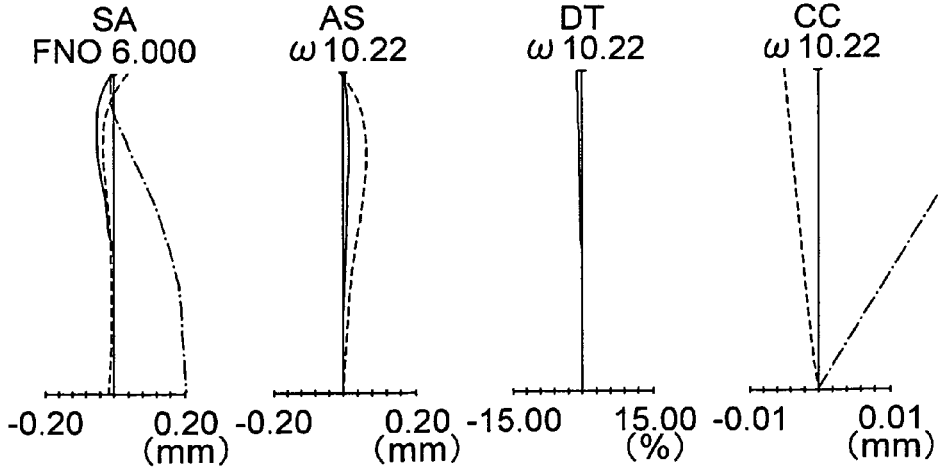
Figure 28A:
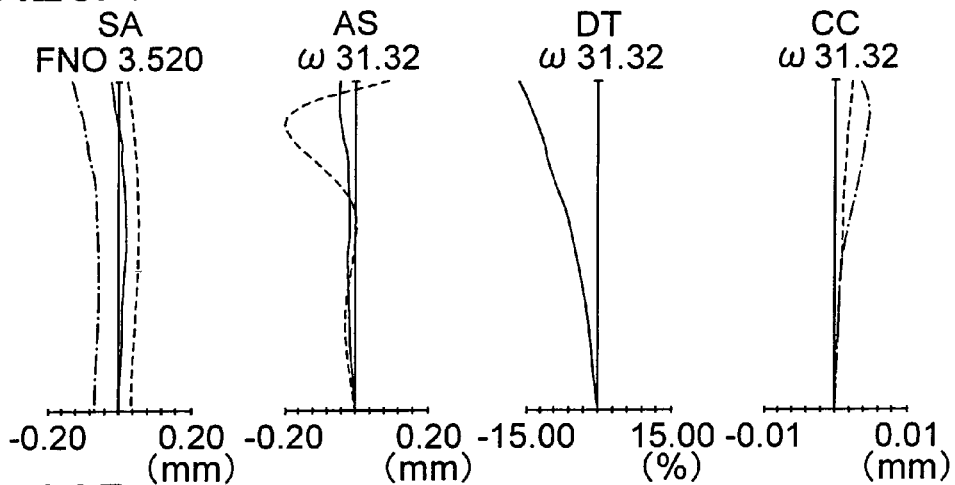
FIGS. 28A, 28B and 28C are diagrams similar to FIGS. 13A, 13B and 13C showing aberrations in the ninth embodiment in a state in which the zoom lens is focused on an object point at infinity.
Figure 28B:
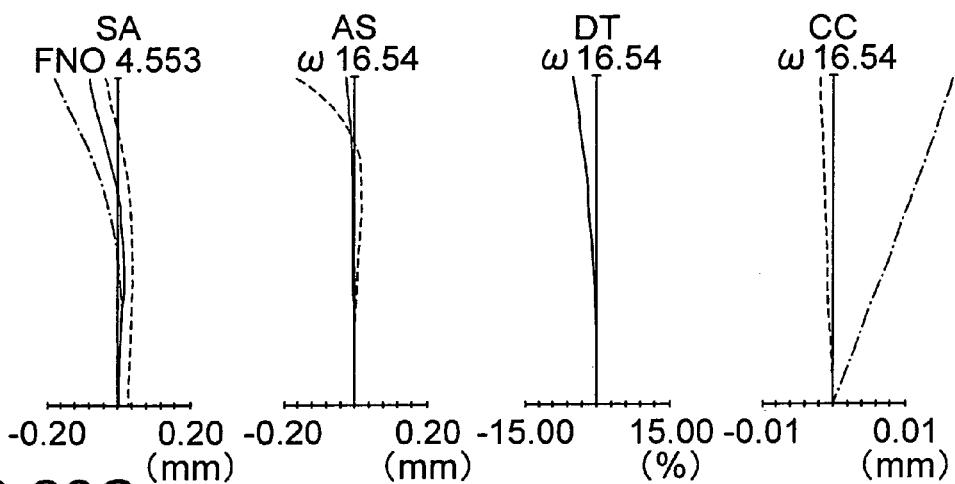
Figure 28C:
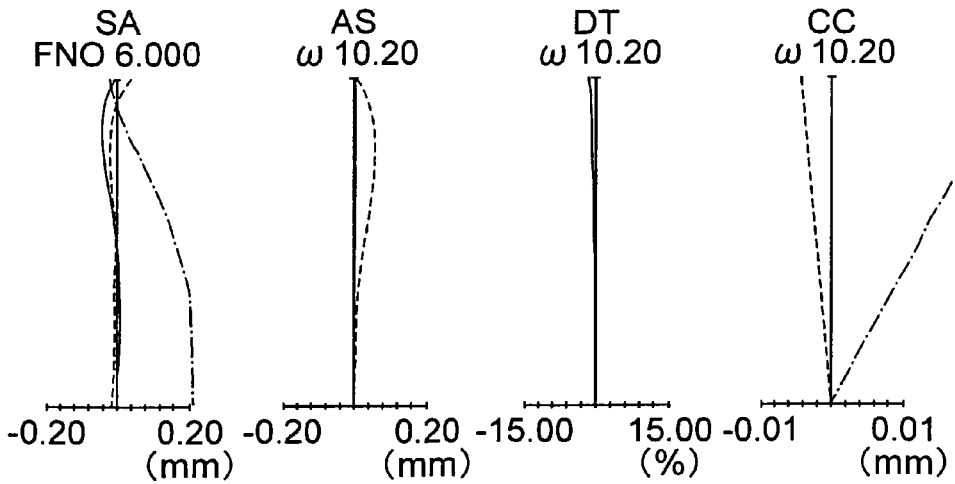
Figure 29A:
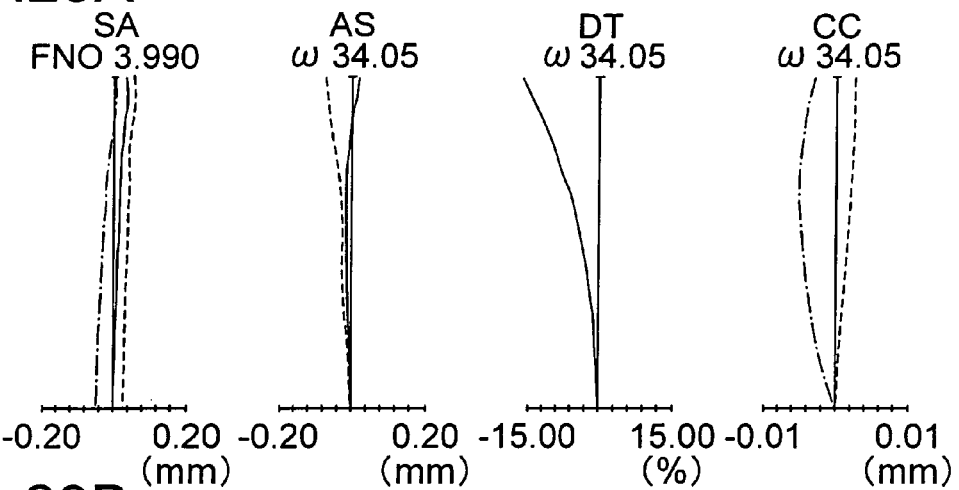
FIGS. 29A, 29B and 29C are diagrams similar to FIGS. 13A, 13B and 13C showing aberrations in the tenth embodiment in a state in which the zoom lens is focused on an object point at infinity.
Figure 29B:
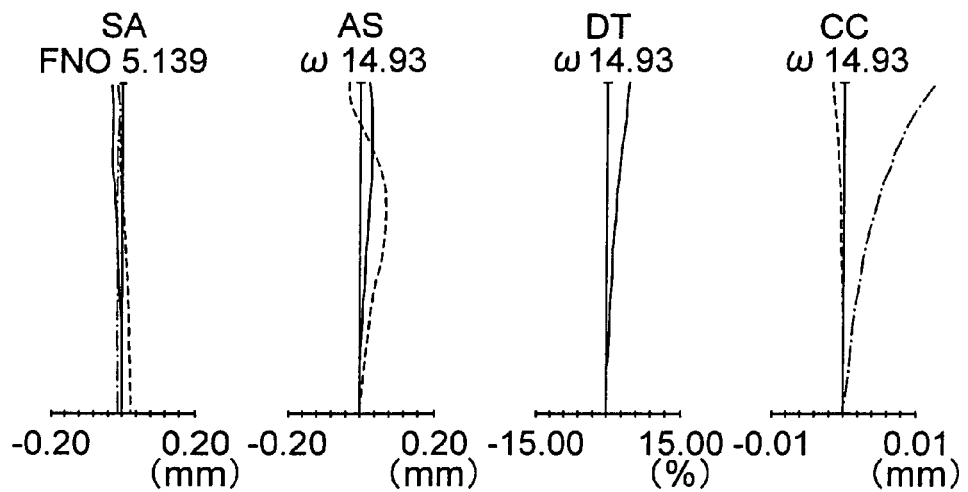
Figure 29C:
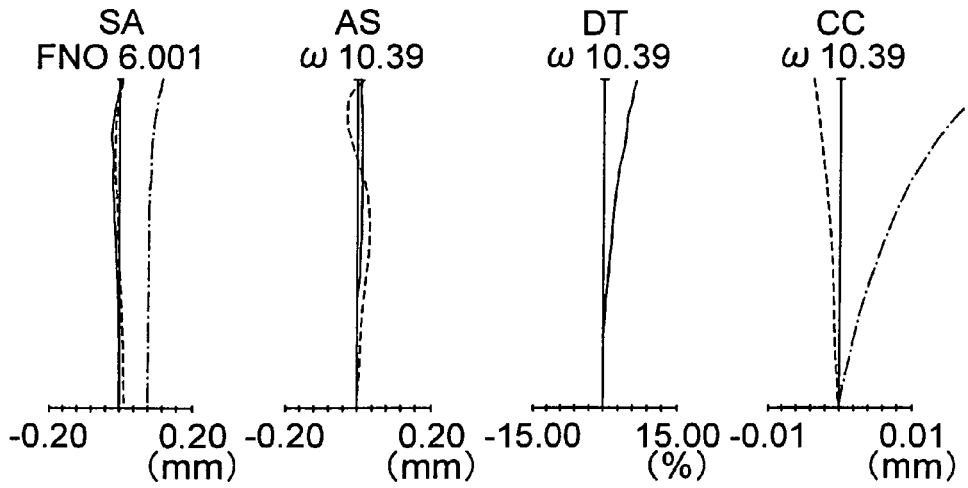
Figure 30A:
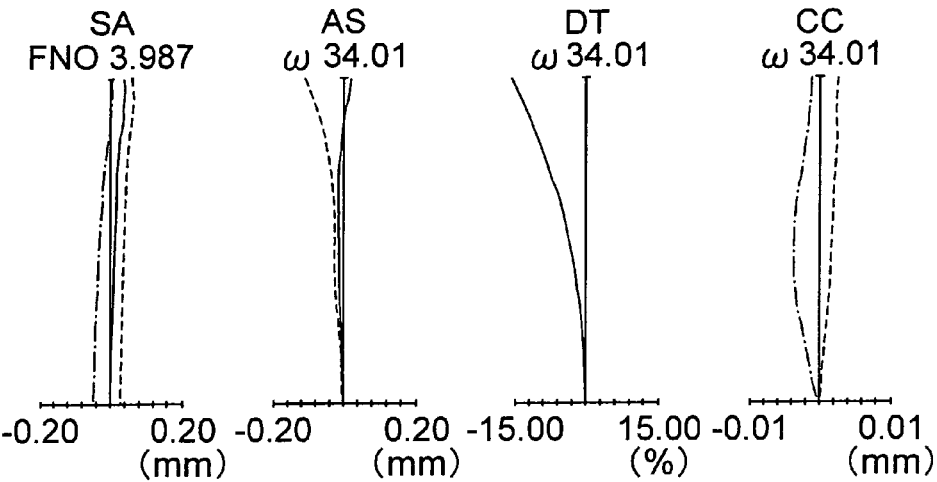
FIGS. 30A, 30B and 30C are diagrams similar to FIGS. 13A, 13B and 13C showing aberrations in the eleventh embodiment in a state in which the zoom lens is focused on an object point at infinity.
Figure 30B:
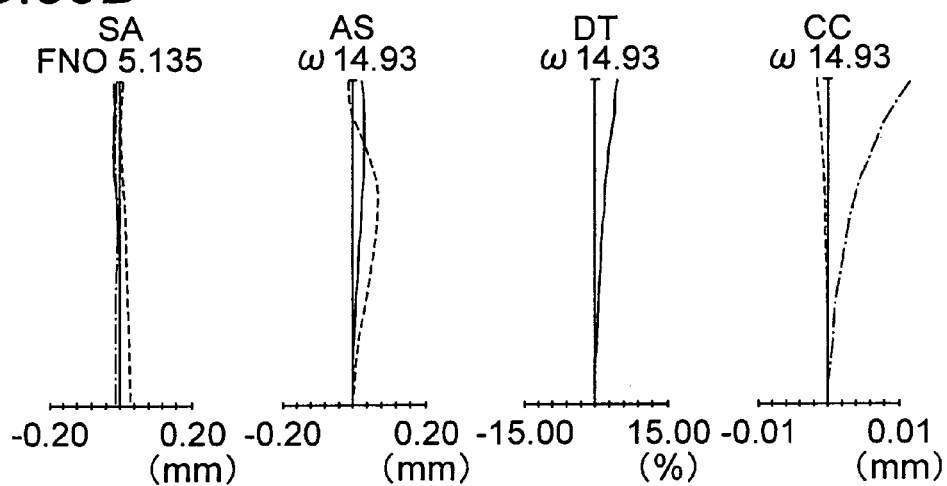
Figure 30C:
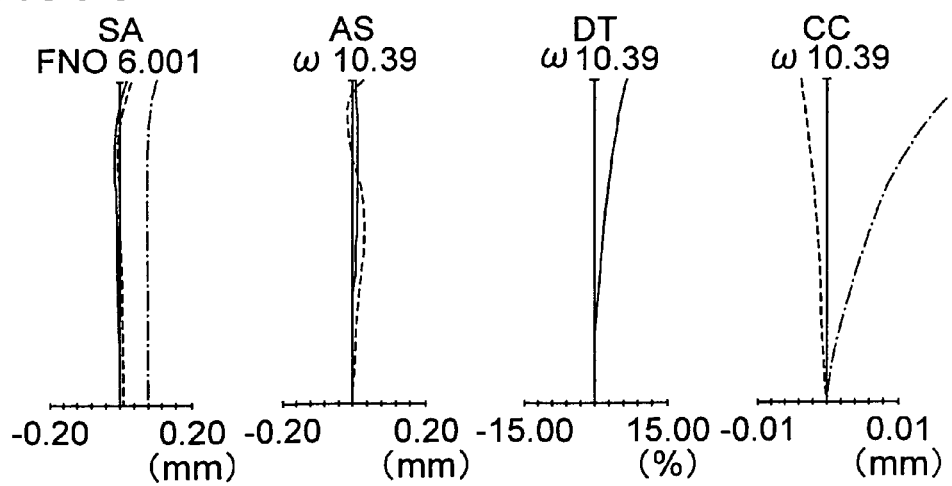

As shown in FIGS. 12A, 12B and 12C, the zoom lens according to the twelfth embodiment has a first lens unit G1 having a negative refracting power, an iris stop S, a second lens unit G2 having a positive refracting power, a flare stop FS and a third lens unit G3 having a positive refracting power, which are arranged in the mentioned order from the object side.

During zooming from the wide angle end to the telephoto end, the first lens unit G1 moves first toward the image side and then toward the object side, the second lens unit G2 moves only toward the object side, and the third lens unit G3 moves only toward the object side.

The first lens unit G1 includes a cemented lens composed, in order from the object side, of a biconcave negative lens and a positive meniscus lens having a convex surface directed toward the object side. The second lens unit G2 includes a cemented lens composed, in order from the object side, of a positive meniscus lens having a convex surface directed toward the object side, a negative meniscus lens having a convex surface directed toward the object side and a positive meniscus lens having a convex surface directed toward the object side. The third lens unit G3 includes a positive meniscus lens having a convex surface directed toward the object side.

Aspheric surfaces are used in both the side surfaces of the biconcave negative lens in the first lens unit G1, the image side surface of the positive meniscus lens having a convex surface directed toward the object side in the first lens unit G1, the object side surface of the positive meniscus lens having a convex surface directed toward the object side located closest to the object side in the second lens unit G2, the image side surface of the positive meniscus lens having a convex surface directed toward the object side located closest to the image side in the second lens unit G2 and both the side surfaces of the positive meniscus lens having a convex surface directed toward the object side in the third lens unit G3, namely there are six aspheric surfaces in total.

Numerical data of each embodiment described above is shown below. Apart from symbols described above, f denotes a focal length of the entire zoom lens system, $F_{NO}$ denotes an F number, ω denotes a half image angle, WE denotes a wide angle end, ST denotes an intermediate state, TE denotes a telephoto end, each of r1, r2, . . . denotes radius of curvature of each lens surface, each of d1, d2, . . . denotes a distance between two lenses, each of nd1, nd2, . . . denotes a refractive index of each lens for a d-line, and each of vd1, vd2, . . . denotes an Abbe's number for each lens.

The overall length of the lens system which will be described later is a length which is obtained by adding the back focus to a distance from the first lens surface up to the last lens surface. BF (back focus) is a unit which is expressed upon air conversion of a distance from the last lens surface up to a paraxial image plane.

When x is let to be an optical axis with a direction of traveling of light as a positive (direction), and y is let to be in a direction orthogonal to the optical axis, a shape of the aspheric surface is described by the following expression.

$$x=(y^2/r)/[1+\{1-(K+1)(y/r)^2\}^{1/2}]+A_4 y^4+A_6 y^6+A_8 y^8+A_{10} y^{10}+A_{12} y^{12}$$

where, r denotes a paraxial radius of curvature, K denotes a conical coefficient, A4, A6, A8, A10, and $A_{12}$ denote aspherical surface coefficients of a fourth order, a sixth order, an eight order, a tenth order, and a twelfth order respectively. Moreover, in the aspherical surface coefficients, 'e–n' (where, n is an integral number) indicates '$10^{-n}$'.

Further "A" means that the surface is an aspheric surface, and "S" means that the surface is an aperture stop, "FS" means that the surface is a flare stop.

EXAMPLE 1 unit mm

Surface data

| Surface No | r | d | nd | vd |
|---|---|---|---|---|
| Object plane | ∞ | ∞ | | |
| 1* | −13.266 | 0.70 | 1.90366 | 31.32 |
| 2* | 10.640 | 1.43 | 1.94595 | 17.98 |
| 3* | 120.518 | Variable | | |
| 4(S) | ∞ | −0.40 | | |
| 5* | 5.323 | 2.15 | 1.80610 | 40.73 |
| 6 | 11.829 | 1.09 | 1.84666 | 23.78 |
| 7 | 4.228 | 2.00 | 1.58313 | 59.38 |
| 8* | 8.800 | 0.74 | | |
| 9(FS) | ∞ | Variable | | |
| 10* | 31.396 | 1.40 | 1.61800 | 63.33 |
| 11 | −16.128 | 1.00 | 1.94595 | 17.98 |
| 12 | −17.230 | Variable | | |
| 13 | ∞ | 0.50 | 1.51633 | 64.14 |
| 14 | ∞ | 0.50 | | |
| 15 | ∞ | 0.50 | 1.51633 | 64.14 |
| 16 | ∞ | 0.42 | | |
| Image plane (Light receiving surface) | | | | |

Aspherical coefficients

1st surface

K = 0.000, A4 = 2.25854e−04, A6 = 1.86696e−05,
A8 = −7.96203e−07, A10 = 1.00881e−08

-continued unit mm

2nd surface

K = 0.896, A4 = 5.34315e−04, A6 = −6.01400e−05,
A8 = 3.06150e−06, A10 = −5.43479e−08
3rd surface K = 0.000, A4 = 1.40815e−04, A6 = 1.94199e−05,
A8 = −8.79011e−07, A10 = 1.17235e−08
5th surface K = −1.905, A4 = 1.50790e−03, A6 = 3.42444e−06,
A8 = 4.39108e−07, A10 = −1.94935e−08
8th surface K = 1.307, A4 = 2.56621e−03, A6 = 8.98679e−05,
A8 = 1.50168e−05, A10 = −9.32075e−07
10th surface K = 0.000, A4 = 2.34287e−04, A6 = 4.67565e−06,
A8 = −1.46515e−07, A10 = −2.23974e−09

Zooming ratio 2.880
Group focal length

| f1 = −13.80 | f2 = 14.34 | f3 = 18.63 |

Zoom data

|  | WE | ST | TE |
| --- | --- | --- | --- |
| IH | 3.84 | 3.84 | 3.84 |
| focal length | 7.51 | 13.50 | 21.62 |
| Fno. | 3.80 | 4.82 | 6.00 |
| 2ω(°) | 62.42 | 33.69 | 20.65 |
| BF | 9.27 | 14.09 | 21.84 |
| Total length | 39.66 | 37.01 | 39.66 |
| d3 | 17.30 | 7.83 | 2.77 |
| d9 | 2.97 | 4.98 | 4.93 |
| d12 | 7.69 | 12.51 | 20.26 |

EXAMPLE 2 unit mm

Surface data

| Surface No | r | d | nd | vd |
| --- | --- | --- | --- | --- |
| 1* | −14.278 | 0.70 | 1.90366 | 31.32 |
| 2 | 11.423 | 2.19 | 1.94595 | 17.98 |
| 3* | 101.992 | Variable | | |
| 4(S) | ∞ | −0.40 | | |
| 5* | 4.853 | 2.00 | 1.80610 | 40.73 |
| 6 | 6.262 | 0.70 | 1.84666 | 23.78 |
| 7 | 3.448 | 2.00 | 1.58313 | 59.38 |
| 8* | 7.042 | 0.74 | | |
| 9(FS) | ∞ | Variable | | |
| 10* | 14.000 | 1.40 | 1.49700 | 81.54 |
| 11 | −20.483 | Variable | | |
| 12 | ∞ | 0.50 | 1.51633 | 64.14 |
| 13 | ∞ | 0.50 | | |
| 14 | ∞ | 0.50 | 1.51633 | 64.14 |
| 15 | ∞ | 0.42 | | |
| Image plane (Light receiving surface) | | | | |

Aspherical coefficients

1st surface k = 0.000, A4 = 7.74415e−05, A6 = 1.92625e−05,
A8 = −6.74734e−07, A10 = 7.65589e−09

-continued unit mm

3rd surface k = 0.000, A4 = 2.19531e−06, A6 = 2.08307e−05,
A8 = −8.42305e−07, A10 = 1.11273e−08
5th surface k = −1.653, A4 = 1.64937e−03, A6 = 1.77730e−05,
A8 = −5.69688e−07, A10 = 4.77908e−08
8th surface k = 0.709, A4 = 2.24931e−03, A6 = 1.47533e−04,
A8 = −2.26007e−06, A10 = 8.19389e−07
10th surface k = 0.000, A4 = 9.99841e−05, A6 = 1.25435e−05,
A8 = −1.26758e−06, A10 = 4.12786e−08

Zooming ratio 2.865
Group focal length

| f1 = −14.36 | f2 = 15.70 | f3 = 16.96 |

Zoom data

|  | WE | ST | TE |
| --- | --- | --- | --- |
| IH | 3.84 | 3.84 | 3.84 |
| focal length | 7.51 | 13.50 | 21.51 |
| Fno. | 3.84 | 4.87 | 6.00 |
| 2ω(°) | 62.40 | 34.20 | 20.88 |
| BF | 9.77 | 14.47 | 21.92 |
| Total length | 39.66 | 37.53 | 38.96 |
| d3 | 17.59 | 7.75 | 2.43 |
| d9 | 2.97 | 5.98 | 5.27 |
| d11 | 8.18 | 12.89 | 20.32 |

EXAMPLE 3 unit mm

Surface data

| Surface No | r | d | nd | vd |
| --- | --- | --- | --- | --- |
| 1* | −14.202 | 0.70 | 1.90366 | 31.32 |
| 2* | 11.602 | 2.06 | 1.94595 | 17.98 |
| 3* | 100.000 | Variable | | |
| 4(S) | ∞ | −0.40 | | |
| 5* | 4.895 | 2.00 | 1.80610 | 40.73 |
| 6 | 6.312 | 0.70 | 1.84666 | 23.78 |
| 7 | 3.493 | 2.00 | 1.58313 | 59.38 |
| 8* | 7.286 | 0.74 | | |
| 9(FS) | ∞ | Variable | | |
| 10* | 16.641 | 1.44 | 1.49700 | 81.54 |
| 11 | −17.351 | Variable | | |
| 12 | ∞ | 0.50 | 1.51633 | 64.14 |
| 13 | ∞ | 0.50 | | |
| 14 | ∞ | 0.50 | 1.51633 | 64.14 |
| 15 | ∞ | 0.42 | | |
| Image plane (Light receiving surface) | | | | |

Aspherical coefficients

1st surface k = 0.000, A4 = 9.96784e−05, A6 = 1.88177e−05,
A8 = −6.94583e−07, A10 = 8.21071e−09
2nd surface k = 1.014, A4 = 3.62106e−04, A6 = −3.16045e−05,
A8 = 8.37338e−07, A10 = −5.03458e−09

-continued unit mm

3rd surface k = 0.000, A4 = 3.52517e−05, A6 = 1.98363e−05,
A8 = −8.69684e−07, A10 = 1.24506e−08

5th surface k = −1.669, A4 = 1.63669e−03, A6 = 1.85525e−05,
A8 = −5.86746e−07, A10 = 4.17552e−08

8th surface k = 0.817, A4 = 2.29412e−03, A6 = 1.47421e−04,
A8 = 1.37442e−06, A10 = 2.88869e−07

10th surface k = 0.000, A4 = 1.55155e−04, A6 = 1.10296e−05,
A8 = −1.02387e−06, A10 = 3.11979e−08

Zooming ratio 2.880
Group focal length

| f1 = −14.25 | f2 = 15.56 | f3 = 17.34 |
|---|---|---|

Zoom data

| | WE | ST | TE |
|---|---|---|---|
| IH | 3.84 | 3.84 | 3.84 |
| focal length | 7.51 | 13.42 | 21.62 |
| Fno. | 3.82 | 4.83 | 6.00 |
| 2ω(°) | 62.40 | 34.15 | 20.72 |
| BF | 9.84 | 14.53 | 22.17 |
| Total length | 39.66 | 37.19 | 39.13 |
| d3 | 17.61 | 7.90 | 2.54 |
| d9 | 2.97 | 5.53 | 5.19 |
| d11 | 8.27 | 12.95 | 20.59 |

EXAMPLE 4 unit mm

Surface data

| Surface No | r | d | nd | vd |
|---|---|---|---|---|
| 1* | −14.017 | 0.70 | 1.90366 | 31.32 |
| 2 | 11.214 | 2.45 | 1.94595 | 17.98 |
| 3* | 120.518 | Variable | | |
| 4(S) | ∞ | −0.40 | | |
| 5* | 4.995 | 2.09 | 1.80610 | 40.73 |
| 6 | 9.180 | 0.91 | 1.84666 | 23.78 |
| 7 | 3.878 | 2.00 | 1.58313 | 59.38 |
| 8* | 7.393 | 0.74 | | |
| 9(FS) | ∞ | Variable | | |
| 10* | 14.000 | 1.40 | 1.49700 | 81.54 |
| 11 | −24.036 | 1.00 | 1.94595 | 17.98 |
| 12 | −23.330 | Variable | | |
| 13 | ∞ | 0.50 | 1.51633 | 64.14 |
| 14 | ∞ | 0.50 | | |
| 15 | ∞ | 0.50 | 1.51633 | 64.14 |
| 16 | ∞ | 0.42 | | |
| Image plane (Light receiving surface) | | | | |

Aspherical coefficients

1st surface k = 0.000, A4 = 6.93898e−05, A6 = 2.02050e−05,
A8 = −7.16655e−07, A10 = 8.24537e−09

-continued unit mm

3rd surface k = 0.000, A4 = −5.40678e−06, A6 = 2.18912e−05,
A8 = −9.29715e−07, A10 = 1.29057e−08

5th surface k = −1.753, A4 = 1.61802e−03, A6 = 1.30324e−05,
A8 = −5.37442e−07, A10 = 4.61596e−08

8th surface k = 1.235, A4 = 2.46506e−03, A6 = 1.74410e−04,
A8 = −6.80292e−06, A10 = 1.62237e−06

10th surface k = 0.000, A4 = 1.52134e−04, A6 = 1.19379e−05,
A8 = −1.21368e−06, A10 = 4.06969e−08

Zooming ratio 2.880
Group focal length

| f1 = −14.44 | f2 = 14.49 | f3 = 17.77 |
|---|---|---|

Zoom data

| | WE | ST | TE |
|---|---|---|---|
| IH | 3.84 | 3.84 | 3.84 |
| focal length | 7.51 | 13.44 | 21.62 |
| Fno. | 3.82 | 4.88 | 6.00 |
| 2ω(°) | 62.39 | 34.47 | 20.79 |
| BF | 8.69 | 12.93 | 20.60 |
| Total length | 39.66 | 37.63 | 38.83 |
| d3 | 17.12 | 7.62 | 2.09 |
| d9 | 2.97 | 6.19 | 5.25 |
| d12 | 7.11 | 11.35 | 19.02 |

EXAMPLE 5 unit mm

Surface data

| Surface No | r | d | nd | vd |
|---|---|---|---|---|
| 1* | −14.496 | 0.70 | 1.90366 | 31.32 |
| 2* | 11.651 | 1.60 | 1.94595 | 17.98 |
| 3* | 120.518 | Variable | | |
| 4(S) | ∞ | −0.40 | | |
| 5* | 5.011 | 2.00 | 1.80610 | 40.73 |
| 6 | 9.861 | 0.90 | 1.84666 | 23.78 |
| 7 | 3.994 | 2.00 | 1.58313 | 59.38 |
| 8* | 7.362 | 0.64 | | |
| 9(FS) | ∞ | Variable | | |
| 10* | 14.000 | 1.40 | 1.49700 | 81.54 |
| 11 | −25.543 | 1.00 | 1.94595 | 17.98 |
| 12 | −24.847 | Variable | | |
| 13 | ∞ | 0.50 | 1.51633 | 64.14 |
| 14 | ∞ | 0.50 | | |
| 15 | ∞ | 0.50 | 1.51633 | 64.14 |
| 16 | ∞ | 0.42 | | |
| Image plane (Light receiving surface) | | | | |

Aspherical coefficients

1st surface k = 0.000, A4 = 8.38894e−05, A6 = 2.14564e−05,
A8 = −7.37668e−07, A10 = 8.01740e−09

-continued unit mm

2nd surface k = 1.549, A4 = 3.21241e−04, A6 = −2.09401e−05,
A8 = 4.65732e−07, A10 = −1.99254e−09

3rd surface k = 0.000, A4 = 3.14284e−05, A6 = 2.28984e−05,
A8 = −8.85930e−07, A10 = 1.09228e−08

5th surface k = −1.745, A4 = 1.62305e−03, A6 = 1.37282e−05,
A8 = −4.14769e−07, A10 = 3.67154e−08

8th surface k = 1.277, A4 = 2.48100e−03, A6 = 1.74672e−04,
A8 = −3.77235e−06, A10 = 1.25351e−06

10th surface k = 0.000, A4 = 1.59776e−04, A6 = 1.39303e−05,
A8 = −1.32488e−06, A10 = 4.37187e−08

Zooming ratio 2.880
Group focal length

| f1 = −14.92 | f2 = 14.70 | f3 = 18.20 |

Zoom data

|  | WE | ST | TE |
| --- | --- | --- | --- |
| IH | 3.84 | 3.84 | 3.84 |
| focal length | 7.51 | 13.50 | 21.62 |
| Fno. | 3.83 | 4.87 | 6.00 |
| 2ω(°) | 62.41 | 34.12 | 20.74 |
| BF | 8.70 | 12.92 | 20.17 |
| Total length | 39.66 | 36.64 | 37.64 |
| d3 | 18.05 | 8.08 | 2.53 |
| d9 | 3.07 | 5.81 | 5.10 |
| d12 | 7.12 | 11.34 | 18.60 |

EXAMPLE 6 unit mm

Surface data

| Surface No | r | d | nd | vd |
| --- | --- | --- | --- | --- |
| 1* | −10.953 | 0.50 | 1.49700 | 81.54 |
| 2 | 15.249 | 1.15 | 1.84666 | 23.78 |
| 3* | 26.475 | Variable | | |
| 4(S) | ∞ | −0.04 | | |
| 5* | 8.978 | 1.60 | 1.72916 | 54.68 |
| 6 | −20.000 | 1.20 | 1.49700 | 81.54 |
| 7* | 74.759 | 0.10 | | |
| 8 | 7.513 | 1.75 | 1.83481 | 42.71 |
| 9 | −9.872 | 1.74 | 1.76182 | 26.52 |
| 10 | 4.335 | Variable | | |
| 11 | 25.000 | 1.90 | 1.80610 | 40.92 |
| 12* | −12.236 | Variable | | |
| 13 | ∞ | 0.40 | 1.54771 | 62.84 |
| 14 | ∞ | 0.50 | | |
| 15 | ∞ | 0.50 | 1.51633 | 64.14 |
| 16 | ∞ | 0.42 | | |
| Image plane (Light receiving surface) | | | | |

Aspherical coefficients

1st surface k = 0.000, A4 = 5.54348e−04, A6 = −8.86833e−06,
A8 = 2.21670e−07, A10 = −2.53096e−09

-continued unit mm

3rd surface k = 0.000, A4 = 1.83539e−04

5th surface k = 0.000, A4 = −1.39402e−04, A6 = 6.29470e−05,
A8 = −1.20011e−05, A10 = 9.09887e−07

7th surface k = 0.000, A4 = 5.75303e−04, A6 = 6.03497e−05,
A8 = −1.13984e−05, A10 = 9.36213e−07

12th surface k = 0.000, A4 = 5.72875e−04, A6 = −2.78681e−05,
A8 = 8.49030e−07, A10 = −1.01158e−08

Zooming ratio 2.882
Group focal length

| f1 = −18.18 | f2 = 10.10 | f3 = 10.43 |

Zoom data

|  | WE | ST | TE |
| --- | --- | --- | --- |
| IH | 3.84 | 3.84 | 3.84 |
| focal length | 6.80 | 13.73 | 19.60 |
| Fno. | 3.02 | 4.68 | 6.00 |
| 2ω(°) | 65.02 | 30.92 | 22.08 |
| BF | 4.05 | 3.26 | 2.91 |
| Total length | 27.80 | 27.39 | 29.69 |
| d3 | 10.74 | 3.88 | 1.59 |
| d10 | 3.12 | 10.34 | 15.30 |
| d12 | 2.54 | 1.76 | 1.39 |

EXAMPLE 7 unit mm

Surface data

| Surface No | r | d | nd | vd |
| --- | --- | --- | --- | --- |
| 1* | −13.115 | 0.50 | 1.49700 | 81.54 |
| 2* | 13.089 | 1.15 | 1.84666 | 23.78 |
| 3* | 19.241 | Variable | | |
| 4(S) | ∞ | −0.04 | | |
| 5 | 8.477 | 1.60 | 1.72916 | 54.68 |
| 6 | −12.993 | 1.20 | 1.49700 | 81.54 |
| 7* | 22.664 | 0.10 | | |
| 8 | 6.856 | 1.75 | 1.83481 | 42.71 |
| 9 | −11.411 | 1.79 | 1.80518 | 25.42 |
| 10 | 4.409 | Variable | | |
| 11 | 25.000 | 1.90 | 1.80610 | 40.92 |
| 12* | −11.147 | Variable | | |
| 13 | ∞ | 0.40 | 1.54771 | 62.84 |
| 14 | ∞ | 0.50 | | |
| 15 | ∞ | 0.50 | 1.51633 | 64.14 |
| 16 | ∞ | 0.42 | | |
| Image plane (Light receiving surface) | | | | |

Aspherical coefficients

1st surface k = 0.000, A4 = 1.92159e−04, A6 = 4.30887e−06,
A8 = −1.22142e−07, A10 = 1.24604e−10

2nd surface k = −0.594, A4 = 5.50339e−05, A6 = −2.06673e−05,
A8 = 5.14911e−07

-continued unit mm

3rd surface k = 0.000, A4 = −1.07581e−05
5th surface k = 0.000, A4 = −5.46476e−06, A6 = 4.75856e−05,
A8 = −8.22022e−06, A10 = 5.24732e−07
7th surface k = 0.000, A4 = 9.79257e−04, A6 = 3.00855e−05,
A8 = −2.56486e−06, A10 = 1.36875e−07
12th surface k = 0.000, A4 = 7.34585e−04, A6 = −2.93842e−05,
A8 = 8.41145e−07, A10 = −9.79956e−09

変倍比 2.882
Group focal length

| f1 = −17.95 | f2 = 9.86 | f3 = 9.79 |

Zoom data

|  | WE | ST | TE |
|---|---|---|---|
| IH | 3.84 | 3.84 | 3.84 |
| focal length | 6.80 | 13.73 | 19.60 |
| Fno. | 3.02 | 4.68 | 6.00 |
| 2ω(°) | 64.01 | 30.35 | 21.67 |
| BF | 3.85 | 3.22 | 3.01 |
| Total length | 27.43 | 27.15 | 29.69 |
| d3 | 10.54 | 3.85 | 1.59 |
| d10 | 3.08 | 10.13 | 15.15 |
| d12 | 2.35 | 1.72 | 1.49 |

EXAMPLE 8 unit mm

Surface data

| Surface No | r | d | nd | vd |
|---|---|---|---|---|
| 1* | −17.195 | 0.70 | 1.90366 | 31.32 |
| 2 | 15.385 | 1.59 | 1.94595 | 17.98 |
| 3* | 100.000 | Variable | | |
| 4(S) | ∞ | −0.40 | | |
| 5* | 4.270 | 2.05 | 1.80610 | 40.73 |
| 6 | 8.640 | 0.70 | 1.84666 | 23.78 |
| 7 | 3.448 | 2.05 | 1.58313 | 59.38 |
| 8* | 10.474 | 0.64 | | |
| 9(FS) | ∞ | Variable | | |
| 10* | −21.866 | 1.40 | 1.49700 | 81.54 |
| 11 | −39.724 | Variable | | |
| 12 | ∞ | 0.50 | 1.51633 | 64.14 |
| 13 | ∞ | 0.50 | | |
| 14 | ∞ | 0.50 | 1.51633 | 64.14 |
| 15 | ∞ | 0.40 | | |
| Image plane (Light receiving surface) | | | | |

Aspherical coefficients

1st surface k = 0.000, A4 = −1.78784e−04, A6 = 2.76422e−05,
A8 = −7.00116e−07, A10 = 3.93777e−09
3rd surface k = 0.000, A4 = −2.24857e−04, A6 = 3.82950e−05,
A8 = −1.19949e−06, A10 = 9.01148e−09

-continued unit mm

5th surface k = −1.167, A4 = 1.65148e−03, A6 = 4.20736e−05,
A8 = 1.26868e−06, A10 = 2.41296e−08
8th surface k = 13.113, A4 = 4.46574e−03, A6 = 1.54812e−04,
A8 = 7.84953e−05, A10 = 6.83402e−06
10th surface k = 0.000, A4 = 8.52136e−04, A6 = 2.46109e−05,
A8 = −1.66769e−06, A10 = 5.32946e−07

Zooming ratio 2.878
Group focal length

| f1 = −16.73 | f2 = 9.23 | f3 = −100.49 |

Zoom data

|  | WE | ST | TE |
|---|---|---|---|
| IH | 3.84 | 3.84 | 3.84 |
| focal length | 7.51 | 13.06 | 21.60 |
| Fno. | 3.51 | 4.47 | 6.00 |
| 2ω(°) | 63.13 | 34.31 | 20.45 |
| BF | 4.56 | 5.81 | 9.90 |
| Total length | 32.76 | 26.53 | 26.45 |
| d3 | 16.39 | 7.20 | 2.45 |
| d9 | 3.07 | 4.78 | 5.36 |
| d11 | 3.00 | 4.25 | 8.34 |

EXAMPLE 9 unit mm

Surface data

| Surface No | r | d | nd | vd |
|---|---|---|---|---|
| 1* | −17.308 | 0.70 | 1.90366 | 31.32 |
| 2* | 16.048 | 1.00 | 1.94595 | 17.98 |
| 3* | 100.000 | Variable | | |
| 4(S) | ∞ | −0.40 | | |
| 5* | 4.271 | 2.05 | 1.80610 | 40.73 |
| 6 | 8.578 | 0.70 | 1.84666 | 23.78 |
| 7 | 3.448 | 2.02 | 1.58313 | 59.38 |
| 8* | 10.473 | 0.64 | | |
| 9(FS) | ∞ | Variable | | |
| 10* | −20.803 | 1.40 | 1.49700 | 81.54 |
| 11 | −36.578 | Variable | | |
| 12 | ∞ | 0.50 | 1.51633 | 64.14 |
| 13 | ∞ | 0.50 | | |
| 14 | ∞ | 0.50 | 1.51633 | 64.14 |
| 15 | ∞ | 0.42 | | |
| Image plane (Light receiving surface) | | | | |

Aspherical coefficients

1st surface k = 0.000, A4 = −1.62082e−04, A6 = 2.91039e−05,
A8 = −6.77478e−07, A10 = 2.77738e−09
2nd surface k = −7.780, A4 = 1.48650e−04, A6 = 3.03155e−05,
A8 = −5.73951e−08, A10 = −2.86094e−08

-continued unit mm

3rd surface k = 0.000, A4 = −2.17097e−04, A6 = 4.05765e−05,
A8 = −1.09478e−06, A10 = 5.48292e−09

5th surface k = −1.161, A4 = 1.65505e−03, A6 = 4.06561e−05,
A8 = 1.08671e−06, A10 = 6.57786e−08

8th surface k = 13.238, A4 = 4.49522e−03, A6 = 1.09698e−04,
A8 = 8.56693e−05, A10 = 6.16944e−06

10th surface k = 0.000, A4 = 8.44619e−04, A6 = 1.12866e−05,
A8 = 3.76746e−07, A10 = 3.88770e−07

Zooming ratio 2.880
Group focal length

| f1 = −16.83 | f2 = 9.25 | f3 = −100.00 |
|---|---|---|

Zoom data

|  | WE | ST | TE |
|---|---|---|---|
| IH | 3.84 | 3.84 | 3.84 |
| focal length | 7.51 | 13.50 | 21.62 |
| Fno. | 3.52 | 4.55 | 6.00 |
| 2ω(°) | 62.65 | 33.08 | 20.40 |
| BF | 4.58 | 5.90 | 9.90 |
| Total length | 32.50 | 26.00 | 26.04 |
| d3 | 16.73 | 7.06 | 2.66 |
| d9 | 3.07 | 4.92 | 5.36 |
| d11 | 3.00 | 4.32 | 8.32 |

EXAMPLE 10 unit mm

Surface data

| Surface No | r | d | nd | vd |
|---|---|---|---|---|
| 1* | −12.658 | 0.50 | 1.49700 | 81.54 |
| 2 | 10.548 | 1.15 | 1.84666 | 23.78 |
| 3* | 11.669 | Variable | | |
| 4(S) | ∞ | −0.04 | | |
| 5* | 16.216 | 1.60 | 1.72916 | 54.68 |
| 6 | −20.000 | 1.20 | 1.49700 | 81.54 |
| 7* | −4.309 | 0.10 | | |
| 8 | −8.799 | 1.75 | 1.83481 | 42.71 |
| 9 | −9.613 | 0.50 | 1.76182 | 26.52 |
| 10 | −24.033 | Variable | | |
| 11 | −63.929 | 1.90 | 1.80610 | 40.92 |
| 12* | 46.967 | Variable | | |
| 13 | ∞ | 0.40 | 1.54771 | 62.84 |
| 14 | ∞ | 0.50 | | |
| 15 | ∞ | 0.50 | 1.51633 | 64.14 |
| 16 | ∞ | 0.40 | | |
| Image plane (Light receiving surface) | | | | |

Aspherical coefficients

1st surface k = 0.000, A4 = 1.23221e−04, A6 = −3.54661e−06,
A8 = 1.03494e−07, A10 = −9.58241e−10

-continued unit mm

3rd surface k = 0.000, A4 = −5.10764e−05

5th surface k = 0.000, A4 = −2.10331e−03, A6 = −1.14105e−04,
A8 = −1.82025e−05, A10 = −2.69682e−06

7th surface k = 0.000, A4 = −6.08013e−04, A6 = −2.86534e−05,
A8 = −2.29854e−05, A10 = 4.90151e−07

12th surface k = 0.000, A4 = 1.20316e−03, A6 = 7.08569e−06,
A8 = −3.62446e−06, A10 = 2.66828e−07

Zooming ratio 2.882
Group focal length

| f1 = −12.59 | f2 = 9.26 | f3 = −33.33 |
|---|---|---|

Zoom data

|  | WE | ST | TE |
|---|---|---|---|
| IH | 3.84 | 3.84 | 3.84 |
| focal length | 6.80 | 13.73 | 19.60 |
| Fno. | 3.99 | 5.14 | 6.00 |
| 2ω(°) | 68.09 | 29.86 | 20.79 |
| BF | 4.32 | 4.15 | 2.67 |
| Total length | 34.69 | 29.21 | 30.08 |
| d3 | 14.68 | 4.75 | 1.59 |
| d10 | 7.03 | 11.66 | 17.17 |
| d12 | 2.83 | 2.66 | 1.18 |

EXAMPLE 11 unit mm

Surface data

| Surface No | r | d | nd | vd |
|---|---|---|---|---|
| 1* | −12.124 | 0.50 | 1.49700 | 81.54 |
| 2* | 11.109 | 1.15 | 1.84666 | 23.78 |
| 3* | 12.230 | Variable | | |
| 4(S) | ∞ | −0.04 | | |
| 5* | 15.848 | 1.60 | 1.72916 | 54.68 |
| 6 | −20.000 | 1.20 | 1.49700 | 81.54 |
| 7* | −4.305 | 0.10 | | |
| 8 | −8.555 | 1.75 | 1.83481 | 42.71 |
| 9 | −9.656 | 0.50 | 1.76182 | 26.52 |
| 10 | −22.922 | Variable | | |
| 11 | −63.929 | 1.90 | 1.80610 | 40.92 |
| 12* | 46.967 | Variable | | |
| 13 | ∞ | 0.40 | 1.54771 | 62.84 |
| 14 | ∞ | 0.50 | | |
| 15 | ∞ | 0.50 | 1.51633 | 64.14 |
| 16 | ∞ | 0.40 | | |
| Image plane (Light receiving surface) | | | | |

Aspherical coefficients

1st surface k = 0.000, A4 = 9.13160e−05, A6 = 2.72628e−07,
A8 = 9.17430e−08, A10 = −1.73728e−09

2nd surface k = 1.207, A4 = 1.95029e−04, A6 = −4.09681e−06,
A8 = −3.66823e−07, A10 = 7.83972e−09

-continued unit mm

3rd surface k = 0.000, A4 = 6.57630e−05
5th surface k = 0.000, A4 = −2.05760e−03, A6 = −1.10415e−04,
A8 = −1.71201e−05, A10 = −2.79258e−06
7th surface k = 0.000, A4 = −5.76651e−04, A6 = −2.39611e−05,
A8 = −2.29215e−05, A10 = 4.40799e−07
12th surface k = 0.000, A4 = 1.21846e−03, A6 = −1.87774e−06,
A8 = −2.39335e−06, A10 = 2.19720e−07

Zooming ratio 2.882
Group focal length

| f1 = −12.55 | f2 = 9.27 | f3 = −33.33 |

Zoom data

|  | WE | ST | TE |
| --- | --- | --- | --- |
| IH | 3.84 | 3.84 | 3.84 |
| focal length | 6.80 | 13.73 | 19.60 |
| Fno. | 3.99 | 5.14 | 6.00 |
| 2ω(°) | 68.03 | 29.87 | 20.78 |
| BF | 4.31 | 4.12 | 2.67 |
| Total length | 34.69 | 29.24 | 30.14 |
| d3 | 14.66 | 4.74 | 1.59 |
| d10 | 7.06 | 11.74 | 17.23 |
| d12 | 2.83 | 2.67 | 1.18 |

EXAMPLE 12 unit mm

Surface data

| Surface No | r | d | nd | vd |
| --- | --- | --- | --- | --- |
| 1* | −23.713 | 0.70 | 1.90366 | 31.32 |
| 2* | 18.969 | 1.54 | 1.63494 | 23.22 |
| 3* | 100.000 | Variable | | |
| 4(S) | ∞ | −0.40 | | |
| 5* | 4.385 | 2.18 | 1.80610 | 40.73 |
| 6 | 5.648 | 0.73 | 1.84666 | 23.78 |
| 7 | 3.450 | 2.13 | 1.58313 | 59.38 |
| 8* | 8.777 | 0.64 | | |
| 9(FS) | ∞ | Variable | | |
| 10* | 9.572 | 1.40 | 1.49700 | 81.54 |
| 11* | 12.809 | Variable | | |
| 12 | ∞ | 0.50 | 1.51633 | 64.14 |
| 13 | ∞ | 0.50 | | |
| 14 | ∞ | 0.50 | 1.51633 | 64.14 |
| 15 | ∞ | 0.41 | | |
| Image plane (Light receiving surface) | | | | |

Aspherical coefficients

1st surface k = 0.000, A4 = 2.22078e−04, A6 = 8.37534e−06,
A8 = −8.16149e−07, A10 = 1.31562e−08
2nd surface k = 1.014, A4 = 2.39436e−03, A6 = 4.09562e−05,
A8 = −2.46113e−06, A10 = −1.60636e−08

-continued unit mm

3rd surface k = 0.000, A4 = −7.89414e−04, A6 = 2.06410e−05,
A8 = −1.32623e−06, A10 = 3.81678e−08
5th surface k = −1.430, A4 = 1.80630e−03, A6 = 4.88714e−05,
A8 = −1.54594e−06, A10 = 1.11460e−07
8th surface k = 6.388, A4 = 3.94460e−03, A6 = 5.66061e−04,
A8 = −4.60055e−05, A10 = 1.75053e−05
10th surface k = 0.000, A4 = −9.15114e−06, A6 = 6.05375e−05,
A8 = 1.79123e−05, A10 = −4.84755e−07
11th surface k = 0.000, A4 = −6.32528e−04, A6 = −9.76173e−06,
A8 = 1.82808e−05, A10 = 2.04038e−07

Zooming ratio 2.880
Group focal length

| f1 = −16.88 | f2 = 9.90 | f3 = 66.64 |

Zoom data

|  | WE | ST | TE |
| --- | --- | --- | --- |
| IH | 3.50 | 3.50 | 3.50 |
| focal length | 7.51 | 13.51 | 21.62 |
| Fno. | 3.53 | 4.60 | 6.00 |
| 2ω(°) | 56.28 | 30.30 | 18.63 |
| BF | 4.57 | 6.91 | 11.71 |
| Total length | 31.70 | 26.11 | 26.12 |
| d3 | 15.14 | 5.98 | 1.49 |
| d9 | 3.07 | 4.30 | 4.00 |
| d11 | 3.00 | 5.35 | 10.14 |

In thirteenth to twenty-fourth embodiments, the zoom lenses according to the first to twelfth embodiments are respectively used in an image pickup apparatus that has a function of correcting distortion electrically, wherein the shape of the effective image pickup area is changed upon zooming. Therefore, in the thirteenth to twenty-fourth embodiments, the image height and the angle of field at a zoom position are different from those in the respective corresponding embodiments.

In the thirteenth to twenty-fourth embodiments, barrel distortion that occurs at wide angle positions is corrected electrically, and a thus-corrected image is recorded or displayed.

In the zoom lenses according to the embodiments, barrel occurs on the rectangular photoelectric conversion surface, at the wide angle end. Whereas, at the telephoto end and near the intermediate focal length state, distortion is suppressed.

To correct distortion electrically, the effective image pickup area is designed to have a barrel shape at the wide angle end and a rectangular shape near the intermediate focal length position and at the telephoto end. In addition, the effective image pickup area, which has been set in advance, is transformed into rectangular image information with reduced distortion by image transformation using image processing.

The maximum image height $IH_w$ at the wide angle end is designed to be smaller than the maximum image height $IH_s$ at the intermediate focal length state and the maximum image height $IH_t$ at the telephoto end.

In the thirteenth to twenty-fourth embodiments, the effective image pickup area is designed in such a way that the effective image pickup area at the wide angle end has a dimension in the shorter side direction equal to the dimension in the shorter side direction of the photoelectric conversion surface, and a distortion of approximately −3% remains after image processing. As a matter of course, a barrel shaped area smaller than that described above may be set as the effective image pickup area, and image resulting from transformation of this area into a rectangular area may be recorded/reproduced.

The zoom lens used in the thirteenth embodiment is the same as the zoom lens according to the first embodiment.

The zoom lens used in the fourteenth embodiment is the same as the zoom lens according to the second embodiment.

The zoom lens used in the fifteenth embodiment is the same as the zoom lens according to the third embodiment.

The zoom lens used in the sixteenth embodiment is the same as the zoom lens according to the fourth embodiment.

The zoom lens used in the seventeenth embodiment is the same as the zoom lens according to the fifth embodiment.

The zoom lens used in the eighteenth embodiment is the same as the zoom lens according to the sixth embodiment.

The zoom lens used in the nineteenth embodiment is the same as the zoom lens according to the seventh embodiment.

The zoom lens used in the twentieth embodiment is the same as the zoom lens according to the eighth embodiment.

The zoom lens used in the twenty-first embodiment is the same as the zoom lens according to the ninth embodiment.

The zoom lens used in the twenty-second embodiment is the same as the zoom lens according to the tenth embodiment.

The zoom lens used in the twenty-third embodiment is the same as the zoom lens according to the eleventh embodiment.

The zoom lens used in the twenty-fourth embodiment is the same as the zoom lens according to the twelfth embodiment.

Data of image height and total image angle in example 13 are as shown below.

EXAMPLE 13

| | Zoom data | | |
|---|---|---|---|
| | WE | ST | TE |
| IH | 3.58 | 3.84 | 3.84 |
| focal length | 7.51 | 13.50 | 21.62 |
| Fno. | 3.80 | 4.82 | 6.00 |
| $2\omega(°)$ | 57.71 | 33.69 | 20.65 |

Data of image height and total image angle in example 14 are as shown below.

EXAMPLE 14

| | Zoom data | | |
|---|---|---|---|
| | WE | ST | TE |
| IH | 3.59 | 3.84 | 3.84 |
| focal length | 7.51 | 13.50 | 21.51 |
| Fno. | 3.84 | 4.87 | 6.00 |
| $2\omega(°)$ | 57.78 | 34.20 | 20.88 |

Data of image height and total image angle in example 15 are as shown below.

EXAMPLE 15

| | Zoom data | | |
|---|---|---|---|
| | WE | ST | TE |
| IH | 3.58 | 3.84 | 3.84 |
| focal length | 7.51 | 13.42 | 21.62 |
| Fno. | 3.82 | 4.83 | 6.00 |
| $2\omega(°)$ | 57.74 | 34.15 | 20.72 |

Data of image height and total image angle in example 16 are as shown below.

EXAMPLE 16

| | Zoom data | | |
|---|---|---|---|
| | WE | ST | TE |
| IH | 3.59 | 3.84 | 3.84 |
| focal length | 7.51 | 13.44 | 21.62 |
| Fno. | 3.82 | 4.88 | 6.00 |
| $2\omega(°)$ | 57.79 | 34.47 | 20.79 |

Data of image height and total image angle in example 17 are as shown below.

EXAMPLE 17

| | Zoom data | | |
|---|---|---|---|
| | WE | ST | TE |
| IH | 3.59 | 3.84 | 3.84 |
| focal length | 7.51 | 13.50 | 21.62 |
| Fno. | 3.83 | 4.87 | 6.00 |
| $2\omega(°)$ | 57.81 | 34.12 | 20.74 |

Data of image height and total image angle in example 18 are as shown below.

EXAMPLE 18

| | Zoom data | | |
|---|---|---|---|
| | WE | ST | TE |
| IH | 3.64 | 3.84 | 3.84 |
| focal length | 6.80 | 13.73 | 19.60 |
| Fno. | 3.02 | 4.68 | 6.00 |
| $2\omega(°)$ | 61.61 | 30.92 | 22.08 |

Data of image height and total image angle in example 19 are as shown below.

EXAMPLE 19

Zoom data

|  | WE | ST | TE |
|---|---|---|---|
| IH | 3.68 | 3.84 | 3.84 |
| focal length | 6.80 | 13.73 | 19.60 |
| Fno. | 3.02 | 4.68 | 6.00 |
| 2ω(°) | 61.28 | 30.35 | 21.67 |

Data of image height and total image angle in example 20 are as shown below.

EXAMPLE 20

Zoom data

|  | WE | ST | TE |
|---|---|---|---|
| IH | 3.57 | 3.84 | 3.84 |
| focal length | 7.51 | 13.06 | 21.60 |
| Fno. | 3.51 | 4.47 | 6.00 |
| 2ω(°) | 57.97 | 34.31 | 20.45 |

Data of image height and total image angle in example 21 are as shown below.

EXAMPLE 21

Zoom data

|  | WE | ST | TE |
|---|---|---|---|
| IH | 3.58 | 3.84 | 3.84 |
| focal length | 7.51 | 13.50 | 21.62 |
| Fno. | 3.52 | 4.55 | 6.00 |
| 2ω(°) | 57.86 | 33.08 | 20.40 |

Data of image height and total image angle in example 22 are as shown below.

EXAMPLE 22

Zoom data

|  | WE | ST | TE |
|---|---|---|---|
| IH | 3.55 | 3.84 | 3.84 |
| focal length | 6.80 | 13.73 | 19.60 |
| Fno. | 3.99 | 5.14 | 6.00 |
| 2ω(°) | 62.23 | 29.86 | 20.79 |

Data of image height and total image angle in example 23 are as shown below.

EXAMPLE 23

Zoom data

|  | WE | ST | TE |
|---|---|---|---|
| IH | 3.55 | 3.84 | 3.84 |
| focal length | 6.80 | 13.73 | 19.60 |
| Fno. | 3.99 | 5.14 | 6.00 |
| 2ω(°) | 62.25 | 29.87 | 20.78 |

Data of image height and total image angle in example 23 are as shown below.

EXAMPLE 24

Zoom data

|  | WE | ST | TE |
|---|---|---|---|
| IH | 3.31 | 3.50 | 3.50 |
| focal length | 7.51 | 13.51 | 21.62 |
| Fno. | 3.53 | 4.60 | 6.00 |
| 2ω(°) | 52.97 | 30.30 | 18.63 |

Aberration diagrams of the zoom lenses according to the first to twelfth embodiments in the state in which the zoom lenses are focused on an object point at infinity are shown in FIGS. 13A to 31C.

FIGS. 13A, 15A, 17A, 19A, 21A, 23A, 25A, 27A, 28A, 29A, 30A and 31A show spherical aberration (SA), astigmatism (AS), distortion (DT) and chromatic aberration of magnification (CC) at the wide angle end.

FIGS. 13B, 15B, 17B, 19B, 21B, 23B, 25B, 27B, 28B, 29B, 30B and 31B show spherical aberration (SA), astigmatism (AS), distortion (DT) and chromatic aberration of magnification (CC) in an intermediate state.

FIGS. 13C, 15C, 17C, 19C, 21C, 23C, 25C, 27C, 28C, 29C, 30C and 31C show spherical aberration (SA), astigmatism (AS), distortion (DT) and chromatic aberration of magnification (CC) at the telephoto end.

In the aberrations diagrams, the sign "ω" represents half the angle of field.

In these aberration diagrams, FIGS. 14A to 14C, 16A to 16C, 18A to 18C, 20A to 20C, 22A to 22C, 24A to 24C and 26A to 26C show transverse aberrations of the zoom lenses according to the first to eleventh embodiments in the state in which the zoom lenses are focused on an object point at infinity.

FIGS. 14A, 16A, 18A, 20A, 22A, 24A and 26A show transverse aberrations (DYY) at the wide angle end.

FIGS. 14B, 16B, 18B, 20B, 22B, 24B and 26B show transverse aberrations (DYY) in an intermediate state.

FIGS. 14C, 16C, 18C, 20C, 22C, 24C and 26C show transverse aberrations (DYY) at the telephoto end.

In each focal length position, transverse aberrations at positions of 0.6 times the maximum image height, 0.8 times the maximum image height and 1.0 times the maximum image height are shown in order from the left in the transverse aberration diagrams. In the transverse aberration diagrams, vertical axis represents the aperture ratio in the Y direction and the horizontal axis represents the amount of transverse aberration in the Y direction.

Values of conditional expressions (1) to (8) in the embodiments are given below.

|  | Example 1 | Example 2 | Example 3 | Example 4 |
|---|---|---|---|---|
| (1) $D_{G1}/f_w$ | 0.28 | 0.39 | 0.37 | 0.42 |
| (2) $f_{G2C1}/f_w$ | 1.19 | 1.17 | 1.18 | 1.16 |
| (3) $nd_{G1L1}$ | 1.90366 | 1.90366 | 1.90366 | 1.90366 |
| (4) $vd_{G1L1}$ | — | — | — | — |
| (5) $(r_{L11f}+r_{L11r})/(r_{L11f}-r_{L11r})$ | 0.110 | 0.111 | 0.101 | 0.111 |
| (6) $(r_{L12f}+r_{L12r})/(r_{L12f}-r_{L12r})$ | −1.19 | −1.25 | −1.26 | −1.21 |
| (7) N | 7 | 6 | 6 | 7 |
| (8) $\Delta G2/f_w$ | 1.94 | 1.93 | 1.94 | 1.89 |

|  | Example 5 | Example 6 | Example 7 |
|---|---|---|---|
| (1) $D_{G1}/f_w$ | 0.31 | 0.24 | 0.24 |
| (2) $f_{G2C1}/f_w$ | 1.16 | 1.60 | 1.44 |
| (3) $nd_{G1L1}$ | 1.90366 | — | — |
| (4) $vd_{G1L1}$ | — | 81.54 | 81.54 |
| (5) $(r_{L11f}+r_{L11r})/(r_{L11f}-r_{L11r})$ | 0.109 | −0.164 | 0.001 |
| (6) $(r_{L12f}+r_{L12r})/(r_{L12f}-r_{L12r})$ | −1.21 | −3.72 | −5.26 |
| (7) N | 7 | 7 | 7 |
| (8) $\Delta G2/f_w$ | 1.80 | 1.62 | 1.65 |

|  | Example 8 | Example 9 | Example 10 |
|---|---|---|---|
| (1) $D_{G1}/f_w$ | 0.31 | 0.23 | 0.24 |
| (2) $f_{G2C1}/f_w$ | 0.97 | 0.97 | 2.62 |
| (3) $nd_{G1L1}$ | 1.90366 | 1.90366 | — |
| (4) $vd_{G1L1}$ | — | — | 81.54 |
| (5) $(r_{L11f}+r_{L11r})/(r_{L11f}-r_{L11r})$ | 0.06 | 0.04 | 0.09 |
| (6) $(r_{L12f}+r_{L12r})/(r_{L12f}-r_{L12r})$ | −1.36 | −1.38 | −19.82 |
| (7) N | 6 | 6 | 7 |
| (8) $\Delta G2/f_w$ | 1.02 | 1.01 | 1.25 |

|  | Example 11 | Example 12 |
|---|---|---|
| (1) $D_{G1}/f_w$ | 0.24 | 0.30 |
| (2) $f_{G2C1}/f_w$ | 2.57 | 0.98 |
| (3) $nd_{G1L1}$ | — | 1.90366 |
| (4) $vd_{G1L1}$ | 81.54 | — |
| (5) $(r_{L11f}+r_{L11r})/(r_{L11f}-r_{L11r})$ | 0.04 | 0.11 |
| (6) $(r_{L12f}+r_{L12r})/(r_{L12f}-r_{L12r})$ | −20.81 | −1.47 |
| (7) N | 7 | 6 |
| (8) $\Delta G2/f_w$ | 1.25 | 1.07 |

|  | Example 13 | Example 14 | Example 15 | Example 16 |
|---|---|---|---|---|
| (1) $D_{G1}/f_w$ | 0.28 | 0.39 | 0.37 | 0.42 |
| (2) $f_{G2C1}/f_w$ | 1.19 | 1.17 | 1.18 | 1.16 |
| (3) $nd_{G1L1}$ | 1.90366 | 1.90366 | 1.90366 | 1.90366 |
| (4) $vd_{G1L1}$ | — | — | — | — |
| (5) $(r_{L11f}+r_{L11r})/(r_{L11f}-r_{L11r})$ | 0.110 | 0.111 | 0.101 | 0.111 |
| (6) $(r_{L12f}+r_{L12r})/(r_{L12f}-r_{L12r})$ | −1.19 | −1.25 | −1.26 | −1.21 |
| (7) N | 7 | 6 | 6 | 7 |
| (8) $\Delta G2/f_w$ | 1.94 | 1.93 | 1.94 | 1.89 |

|  | Example 17 | Example 18 | Example 19 |
|---|---|---|---|
| (1) $D_{G1}/f_w$ | 0.31 | 0.24 | 0.24 |
| (2) $f_{G2C1}/f_w$ | 1.16 | 1.60 | 1.44 |
| (3) $nd_{G1L1}$ | 1.90366 | — | — |
| (4) $vd_{G1L1}$ | — | 81.54 | 81.54 |
| (5) $(r_{L11f}+r_{L11r})/(r_{L11f}-r_{L11r})$ | 0.109 | −0.164 | 0.001 |
| (6) $(r_{L12f}+r_{L12r})/(r_{L12f}-r_{L12r})$ | −1.21 | −3.72 | −5.26 |
| (7) N | 7 | 7 | 7 |
| (8) $\Delta G2/f_w$ | 1.80 | 1.62 | 1.65 |

|  | Example 20 | Example 21 | Example 22 |
|---|---|---|---|
| (1) $D_{G1}/f_w$ | 0.31 | 0.23 | 0.24 |
| (2) $f_{G2C1}/f_w$ | 0.97 | 0.97 | 2.62 |
| (3) $nd_{G1L1}$ | 1.90366 | 1.90366 | — |
| (4) $vd_{G1L1}$ | — | — | 81.54 |
| (5) $(r_{L11f}+r_{L11r})/(r_{L11f}-r_{L11r})$ | 0.06 | 0.04 | 0.09 |
| (6) $(r_{L12f}+r_{L12r})/(r_{L12f}-r_{L12r})$ | −1.36 | −1.38 | −19.82 |
| (7) N | 6 | 6 | 7 |
| (8) $\Delta G2/f_w$ | 1.02 | 1.01 | 1.25 |

-continued

|  | Example 23 | Example 24 |
|---|---|---|
| (1) $D_{G1}/f_w$ | 0.24 | 0.30 |
| (2) $f_{G2C1}/f_w$ | 2.57 | 0.98 |
| (3) $nd_{G1L1}$ | — | 1.90366 |
| (4) $vd_{G1L1}$ | 81.54 | — |
| (5) $(r_{L11f} + r_{L11r})/(r_{L11f} - r_{L11r})$ | 0.04 | 0.11 |
| (6) $(r_{L12f} + r_{L12r})/(r_{L12f} - r_{L12r})$ | -20.81 | -1.47 |
| (7) N | 7 | 6 |
| (8) $\Delta G2/f_w$ | 1.25 | 1.07 |

Further, values of conditional expressions in the embodiments are given below.

|  | Example 1, 13 | Example 2, 14 | Example 3, 15 | Example 4, 16 |
|---|---|---|---|---|
| (9) $nd_{3low}$ | 1.618 | 1.497 | 1.497 | 1.497 |
| (10) $(r_{3a} + r_{3b})/(r_{3a} - r_{3b})$ | 0.291 | -0.188 | -0.021 | -0.250 |
| (11) $D_{g3}/r_{3b}$ | -0.139 | -0.068 | -0.083 | -0.103 |
| (12) $\Delta D_{g3}/Ih$ | 3.272 | 3.166 | 3.209 | 3.102 |
| (13) $D_{12}/D_{23}$ | 4.556 | 4.634 | 4.639 | 4.505 |
| (14) $D_{g1}/f1$ | -0.154 | -0.201 | -0.193 | -0.218 |
| (15) $(r_{1na} + r_{1nb})/(r_{1na} - r_{1nb})$ | 0.110 | 0.111 | 0.101 | 0.111 |

|  | Example 5, 17 | Example 6, 18 | Example 7, 19 |
|---|---|---|---|
| (9) $nd_{3low}$ | 1.497 | 1.8061 | 1.8061 |
| (10) $(r_{3a} + r_{3b})/(r_{3a} - r_{3b})$ | -0.279 | 0.343 | 0.383 |
| (11) $D_{g3}/r_{3b}$ | 0.097 | -0.155 | -0.170 |
| (12) $\Delta D_{g3}/Ih$ | 2.988 | -0.299 | -0.221 |
| (13) $D_{12}/D_{23}$ | 4.759 | 3.433 | 3.405 |
| (14) $D_{g1}/f1$ | -0.154 | -0.091 | 0.092 |
| (15) $(r_{1na} + r_{1nb})/(r_{1na} - r_{1nb})$ | 0.109 | -0.164 | 0.001 |

Incidentally, for preventing the occurrence of the ghost and the flare, generally, the antireflection coating is applied to a surface of a lens in contact with air.

On the other hand, at a cemented surface of a cemented lens, a refractive index of an adhesive is sufficiently higher than a refractive index of air. Therefore, in many cases, a reflectance is originally of the level of a single-layer coating, or lower, and the coating is applied in few cases. However, when the antireflection coating is applied positively even to the cemented surface, it is possible to reduce further the ghost and the flare, and to achieve a more favorable image.

Particularly, recently, a glass material having a high refractive index has been widely used in an optical system of cameras, for having a high effect on the aberration correction. However, when the glass material having a high refractive index is used as a cemented lens, a reflection at the cemented surface becomes unignorable. In such a case, applying the antireflection coating on the cemented surface is particularly effective.

An effective usage of the cemented surface coating has been disclosed in Japanese Patent Application Laid-open Publication No. Hei 2-27301, No. 2001-324676, No. 2005-92115, and U.S. Pat. No. 7,116,482. In these patent literatures, a cemented lens surface coating in a first lens unit of a positive preceding zoom lens system has been described, and the same as disclosed in these patent literatures may be implemented for the cemented lens surface in the first lens unit having a positive power, of the present invention.

As a coating material to be used, according to a refractive index of the adhesive material and a refractive index of the lens which is a base, coating materials such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$ having a comparatively higher refractive index, and coating materials such as $MgF_2$, $SiO_2$, and $Al_2O_3$ having a comparatively lower refractive index may be selected appropriately, and set to a film thickness which satisfies phase conditions.

Naturally, similar to the coating on the surface of the lens in contact with air, the coating on the cemented surface may also be let to be a multi layer coating. By combining appropriately a film thickness and a coating material of number of films not less than in two layers, it is possible to reduce further the reflectance, and to control spectral characteristics and angular characteristics.

Moreover, it is needless to mention that for the cemented surface of lenses other than the lenses in the first lens unit., it is effective to apply the coating on the cemented surface based on a similar idea.

(Correction of Distortion)

Incidentally, when the zoom lens system of the present invention is used, a digital correction of distortion of an image is carried out electrically. A basic concept for the digital correction of the distortion of an image will be described below.

Figure 32:
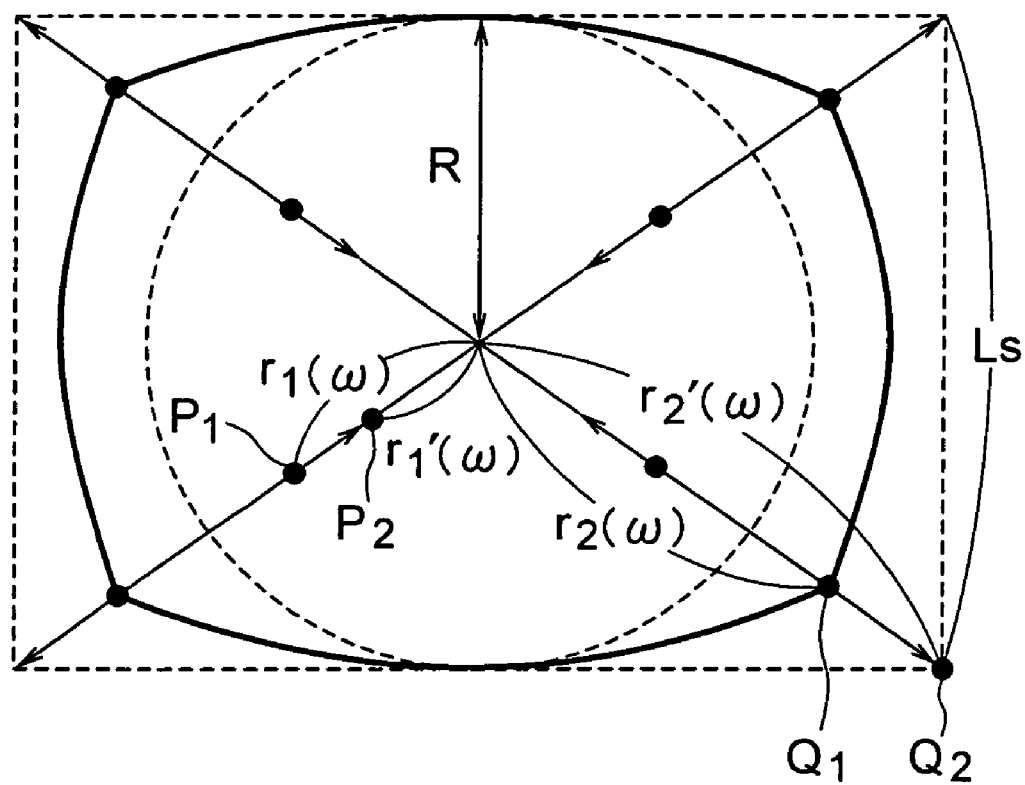
FIG. 32 is a diagram illustrating correction of distortion.

For example, as shown in FIG. 32, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius r(ω) other than the radius R is moved in a substantial direction of radiation, and the correction is carried out by moving on a concentric circle such that the radius becomes $r'(\omega)$.

For example, in FIG. 32, a point $P_1$ on a circumference of an arbitrary radius $r_1(\omega)$ positioned at an inner side of a circle of radius R is moved to a point $P_2$ on a circumference of a radius $r_1'(\omega)$ which is to be corrected, directed toward a center of the circle. Moreover, a point $Q_1$ on a circumference of an arbitrary radius $r_2(\omega)$ positioned at an outer side of the circle of radius R is moved to a point $Q_2$ on a circumference of a radius $r_2'(\omega)$ which is to be corrected, directed toward a direction away from the center of the circle.

Here, $r'(\omega)$ can be expressed as follows.

$$r'(\omega) = \alpha \cdot f \tan \omega \, (0 \leq \alpha \leq 1)$$

where, $\omega$ is a half image angle of an object and f is a focal length of an imaging optical system (the zoom lens system in the present invention).

Here, when an ideal image height corresponding to a circle. (image height) of radius R is let to be Y, then $$\alpha = R/Y = R/(f \tan \omega).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius $r(\omega)$ other than the radius R in a substantial direction of radiation, and moving on a concentric circle such that the radius becomes $r'(\omega)$, it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount $r'(\omega) - r(\omega)$, an arrangement may be made such that a relationship between $r(\omega)$, in other words, half image angle and the image height, or a relationship between a real image height r and an ideal image height $r'/\alpha$ is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0 \leq R \leq 0.6 \, Ls$$

where, Ls is a length of a short side of the effective image pickup surface.

It is preferable that the radius R satisfies the following conditional expression.

$$0.3 \, Ls \leq R \leq 0.6 \, Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(\omega) = \alpha \cdot f \tan \omega$$

near a telephoto end in the focal point zones which are divided.

However, in this case, at a wide angle end in the focal point zones which are divided, a barrel-shape distortion at the wide angel end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(\omega) = \alpha \cdot f \tan \omega$$

near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $$f = y/\tan \omega$$

holds.

Here, y denotes a height (image height) of an image point from the optical axis, f denotes a focal length of an imaging system (zoom lens system in the present invention), and $\omega$ denotes an angle (object half image angle) with respect to the optical axis in an object point direction corresponding to image points connecting from a center on an image pickup plane up to a position of y.

When there is a barrel-shape distortion in the imaging system, the relationship becomes $f > y/\tan \omega$.

In other words, when the focal length f of the imaging system, and the image height y are let to be fixed, a value of ω becomes large.

(Digital Camera)

Figure 33:
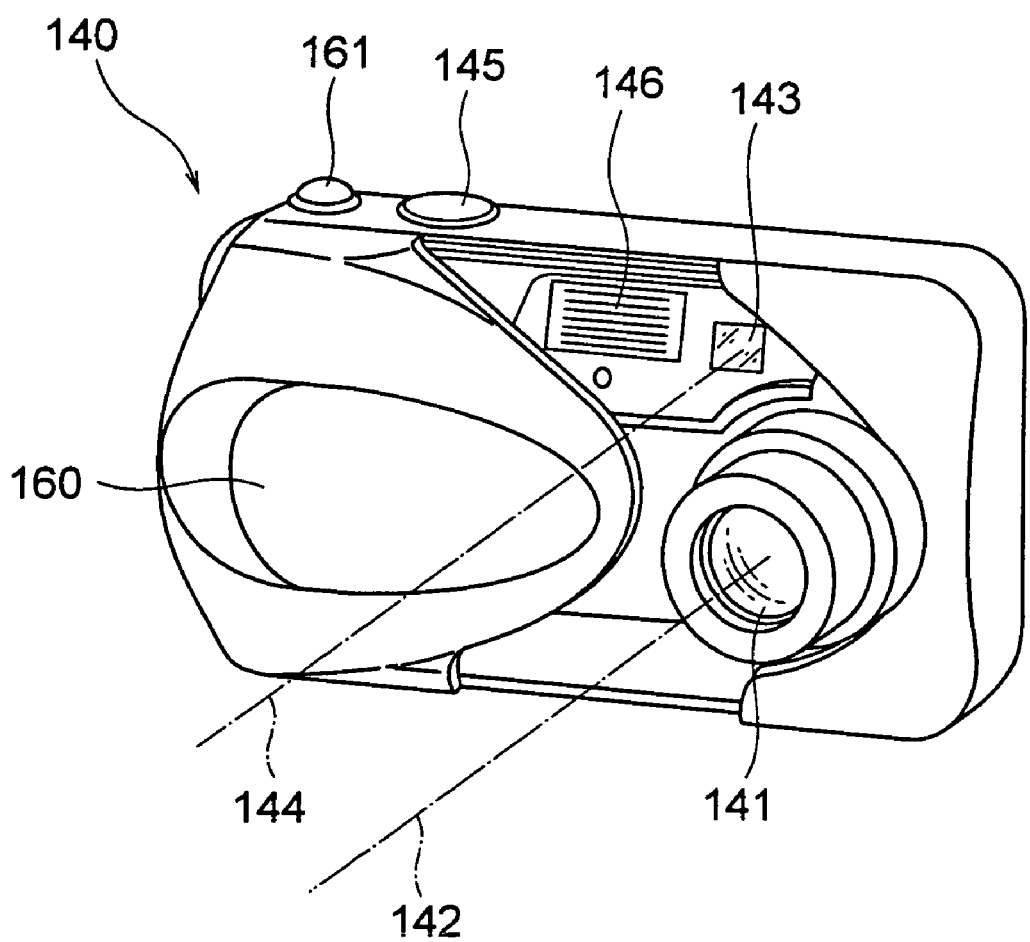
FIG. 33 is a front perspective view showing an outer appearance of a digital camera equipped with a zoom lens according to the present invention.
Figure 34:
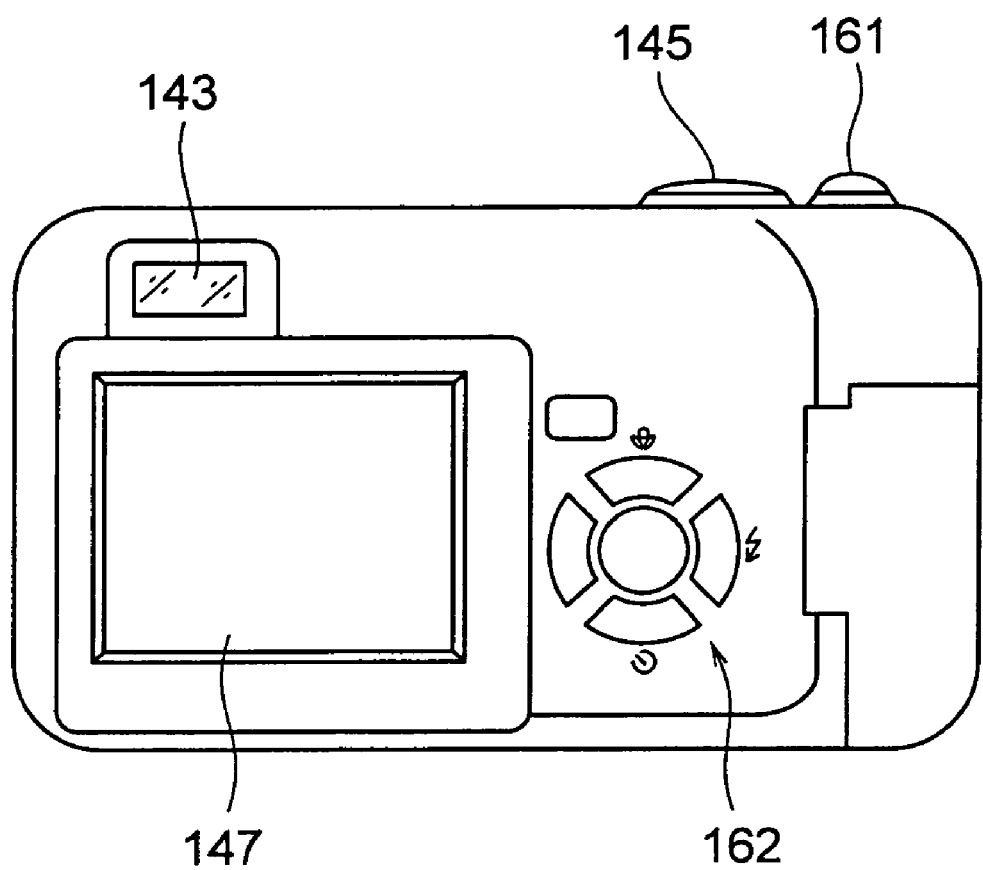
FIG. 34 is a rear perspective view of the digital camera.
Figure 35:
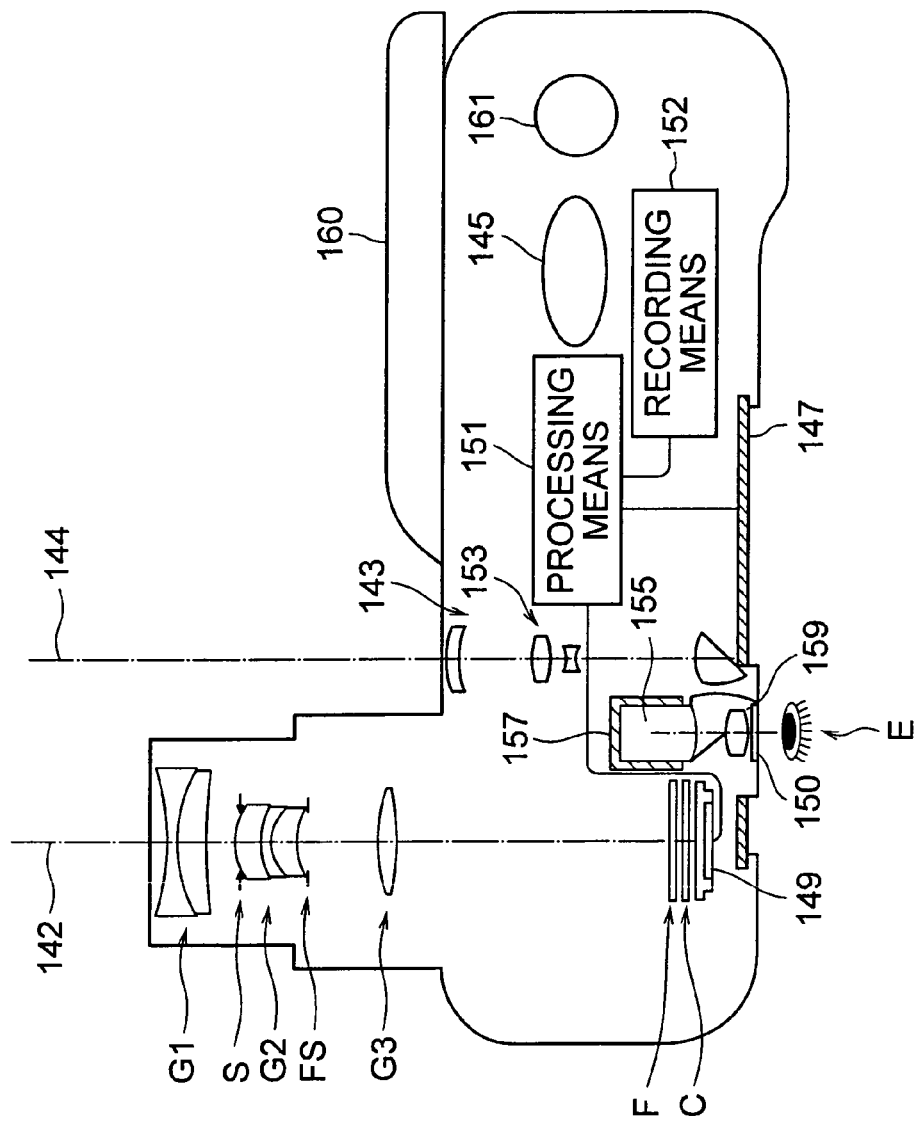
FIG. 35 is a cross sectional view of the digital camera.

FIG. 33 to FIG. 35 are conceptual diagrams of a structure of a digital camera according to the present invention in which a zoom lens system described above is incorporated in a taking optical system 141. FIG. 33 is a front perspective view showing an appearance of a digital camera 140, FIG. 34 is a rear perspective view of the same, and FIG. 35 is a schematic cross-sectional view showing a structure of the digital camera 140. In FIG. 33 and FIG. 35, show an uncollapsed state of the taking optical system 141. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., and in the uncollapsed state of the taking optical system 141, by sliding a cover 160, the taking optical system 141, the finder optical system 143, and the flash 146 are covered by the cover 160. Further, when the cover 160 is opened and the digital camera is set in a photo taking state, the taking optical system 141 assumes the uncollapsed state as shown in FIG. 33, when the shutter button 145 disposed on an upper portion of the digital camera 140 is pressed, in synchronization with the pressing of the shutter button 145, a photograph is taken by the taking optical system 141 such as the zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver-salt film is disposed instead of the CCD 149.

Furthermore, a finder objective optical system 153 is disposed on the finder optical path 144. The finder objective optical system 153 consists of a plurality of lens units (three units in the diagram), and two prisms, and is made of a zoom optical system in which a focal length changes in synchronization with a zoom lens system of the taking optical system 141. An object image formed by the finder objective optical system 153 is formed on a field frame 157 of an erecting prism 155 which is an image erecting member. On a rear side of the erecting prism 155, an eyepiece optical system 159 which guides an erected image to a viewer's eyeball, is disposed. A cover member 150 is disposed on an emergence side of the eyepiece optical system 159.

Since the digital camera 140 structured in such manner has the taking optical system 141 according to the present invention, has an extremely small thickness in collapsed state, and an extremely stable imaging performance in the entire zooming region at high magnification, it is possible to realize a high-performance, a small size, and a widening of angle.

(Internal Circuit Structure)

Figure 36:
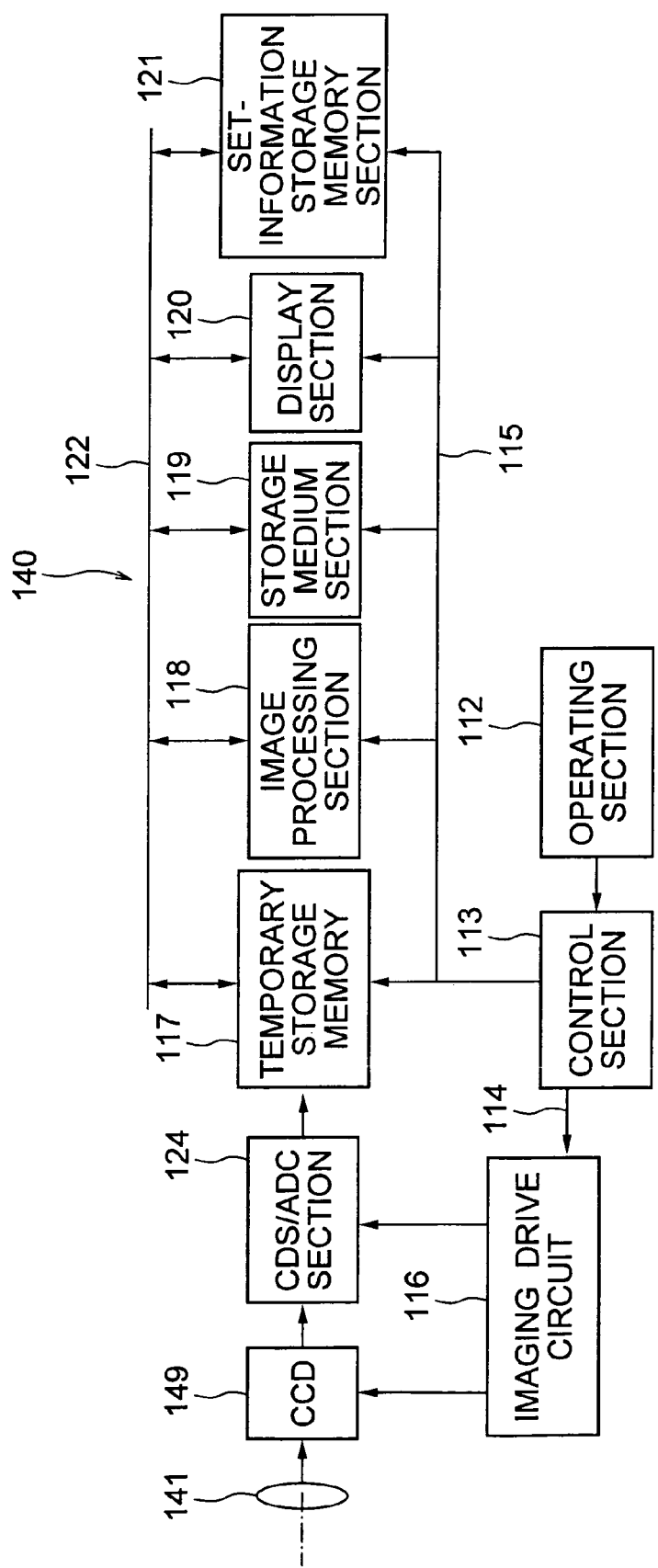
FIG. 36 is a block diagram of an internal circuit of a principal portion of the digital camera.

FIG. 36 is a structural block diagram of an internal circuit of main components of the digital camera 140. In the following description, the processing means 151 described above includes for instance, a CDS/ADC section 124, a temporary storage memory 117, and an image processing section 118, and a storage means 152 consists of a storage medium section 119 for example.

As shown in FIG. 36, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (bare data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 140 structured in such manner has the taking optical system 141, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side and the telephoto side is possible.

As per the above, the three-unit zoom lens according to the present invention is advantageous in reducing the size and in achieving good performance. The three-unit zoom lens according to the present invention can be suitably applied to zoom lenses in which influence of decentering of lenses from one another can be easily suppressed.

According to the present invention, it becomes easy to suppress variations in aberrations even though the second lens unit is configured to provide magnification changes during zooming, and a three-unit zoom lens that is advantageous in reducing the size and in reducing relative decentering of lenses from one another can be provided.

What is claimed is:

1. A three unit zoom lens comprising, in order from an object side thereof:
   a first lens unit having a negative refracting power;
   a second lens unit having a positive refracting power; and
   a third lens unit having a refracting power, wherein
   during zooming from a wide angle end to a telephoto end, a distance between the first lens unit and the second lens unit decreases, and a distance between the second lens unit and the third lens unit changes,
   the first lens unit comprises a negative lens component having a negative refracting power and including, in order from the object side, a negative lens having a concave surface directed toward an image side and a positive lens having a convex surface directed toward the object side,
   the total number of lens components included in the first lens unit is one,
   the second lens unit comprises at least one negative lens and a plurality of positive lenses,
   at least three lenses among the lenses in the second lens unit are cemented to adjacent lenses,
   the total number of lens components included in the second lens unit is two or less,
   the third lens unit comprises a lens component composed of two or fewer lenses, and
   the total number of lens components included in the third lens unit is one,
   where the term "lens component" refers to a lens member whose surfaces that are in contact with air on an optical axis include only two surfaces, one being an object side surface and the other being an image side surface.

2. The three-unit zoom lens according to claim 1, wherein the negative lens component in the first lens unit has an aspheric cemented surface.

3. The three-unit zoom lens according to claim 1, wherein the negative lens component in the first lens unit has a spherical cemented surface.

4. The three-unit zoom lens according to claim 1, wherein the first lens unit satisfies the following condition:

$$0.05 < D_{G1}/f_w < 0.8 \quad (1)$$

where $D_{G1}$ is a thickness of the first lens unit on the optical axis, and $f_w$ is a focal length of the three-unit zoom lens at the wide angle end.

5. The three-unit zoom lens according to claim 1, wherein a lens component located closest to the object side in the second lens unit is a cemented lens component that satisfies the following condition:

$$0.5 < f_{G2C1}/f_w < 5.0 \quad (2)$$

where $f_{G2C1}$ is a focal length of the lens component located closest to the object side in the second lens unit, and $f_w$ is a focal length of the three-unit zoom lens at the wide angle end.

6. The three-unit zoom lens according to claim 1, wherein the negative lens in the first lens unit satisfies the following condition:

$$nd_{G1L1} > 1.75 \quad (3)$$

where $nd_{G1L1}$ is a refractive index of the negative lens in the first lens unit.

7. The three-unit zoom lens according to claim 1, wherein the negative lens in the first lens unit satisfies the following condition:

$$vd_{G1L1} > 60 \quad (4)$$

where $vd_{G1L1}$ is an Abbe number of the negative lens in the first lens unit.

8. The three-unit zoom lens according to claim 1, wherein the negative lens in the first lens unit has a biconcave shape that satisfies the following condition:

$$-0.95 < (r_{L11f} + r_{L11r})/(r_{L11f} - r_{L11r}) < 0.95 \quad (5)$$

where, $r_{L11f}$ is a paraxial radius of curvature of the object side surface of the negative lens in the first lens unit, and $r_{L11r}$ is a paraxial radius of curvature of the image side surface of the negative lens in the first lens unit.

9. The three-unit zoom lens according to claim 1, wherein the positive lens in the first lens unit has a shape that satisfies the following condition:

$$-40.0 < (r_{L12f} + r_{L12r})/(r_{L12f} - r_{L12r}) < -0.95 \quad (6)$$

where, $r_{L12f}$ is a paraxial radius of curvature of the object side surface of the positive lens in the first lens unit, and $r_{L12r}$ is a paraxial radius of curvature of the image side surface of the positive lens in the first lens unit.

10. The three-unit zoom lens according to claim 1, wherein the following condition is satisfied:

$$6 \leq N \leq 7 \quad (7)$$

where N is the total number of lenses in the three-unit zoom lens.

11. The three-unit zoom lens according to claim 1, wherein a lens surface located closest to the object side in the second lens unit is an aspheric surface.

12. The three-unit zoom lens according to claim 1, wherein the second lens unit comprises a lens component including, in order from the object side, a positive lens, a negative lens and a positive lens.

13. The three-unit zoom lens according to claim 12, wherein the total number of lens components in the second lens unit is one.

14. The three-unit zoom lens according to claim 1, wherein the second lens unit comprises two lens components each of which has a cemented surface, and the total number of lens components included in the second lens unit is two.

15. The three-unit zoom lens according to claim 14, wherein each of the lens components in the second lens unit is a doublet.

16. The three-unit zoom lens according to claim 1, wherein during zooming from the wide angle end to the telephoto end, the second lens unit moves while satisfying the following condition:

$$0.5 < \Delta G2/f_w < 3.0 \quad (8)$$

where $\Delta G2$ is the amount of displacement of the position of the second lens unit at the telephoto end from the position thereof at the wide angle end, and displacements toward the object side are represented by positive values.

17. The three-unit zoom lens according to claim 1, wherein the third lens unit has a positive refracting power.

18. The three-unit zoom lens according to claim 17, wherein the third lens unit has a biconvex shape.

19. The three-unit zoom lens according to claim 17, wherein the third lens unit consists of a biconvex positive lens.

20. The three-unit zoom lens according to claim 1, wherein the third lens unit has a negative refracting power.

21. The three-unit zoom lens according to claim 1, wherein focusing is performed by moving the third lens unit along the optical axis direction.

22. The three-unit zoom lens according to claim 1, wherein the position of the third lens unit at the telephoto end is displaced toward the object side with respect to the position of the third lens unit at the wide angle end.

23. The three-unit zoom lens according to claim 1, wherein during zooming from the wide angle end to the telephoto end, the third lens unit moves only toward the object side.

24. The three-unit zoom lens according to claim 1, further comprising an iris stop disposed between the first lens unit and the second lens unit.

25. The three-unit zoom lens according to claim 1, further comprising:
an iris stop disposed between the first lens unit and the second lens unit; and
a flare stop disposed between the second lens unit and the third lens unit.

26. An image pickup apparatus comprising:
a three-unit zoom, and
an image pickup element disposed on an image side of the three-unit zoom lens that converts an optical image formed by the three-unit zoom lens into an electrical signal, wherein the three-unit zoom lens comprises a three-unit zoom lens according to claim 1.

27. The image pickup apparatus according to claim 26, wherein the third lens unit moves while satisfying the following conditional expression (12):

$$-0.80 < \Delta D_{g3}/Ih(t) < 8.00 \quad (12)$$

where $\Delta D_{g3}$ is displacement of the position of the third lens unit at the telephoto end from its position at the wide angle end, displacements toward the object side being represented by positive values, and Ih(t) is a maximum image height at the telephoto end.

28. The image pickup apparatus according to claim 26, further comprising an image transformation section that transforms, by image processing, the electrical signal, which contains a distortion due to the three-unit zoom lens, into an image signal in which the distortion is corrected.

29. A three-unit zoom lens comprising, in order from an object side thereof,
a first lens unit having a negative refracting power;
a second lens unit having a positive refracting power;
a third lens unit having a positive refracting power, wherein
during zooming from a wide angle end to a telephoto end, a distance between the first lens unit and the second lens unit decreases, and a distance between the second lens unit and the third lens unit changes,
an iris stop that moves integrally with the second lens unit is further provided,
the first lens unit consists of one negative lens component having a negative refracting power and including, in order from the object side, a negative lens having a concave surface directed toward the image side and a positive lens having a convex surface directed toward the object side,
the total number of lens components included in the first lens unit is one,
the second lens unit comprises at least one negative lens and a plurality of positive lenses,
at least three lenses among the lenses in the second lens unit are cemented to adjacent lenses,
the total number of lens components included in the second lens unit is two or less,
the third lens unit consists of one positive lens component, and
the positive lens component in the third lens unit includes a lens that satisfies the following conditional expression (9) and the positive lens component in the third lens unit satisfies the following conditional expression (10):

$$1.49 < nd_{3low} < 2.4 \quad (9)$$

$$-1.0 < (r_{3a}+r_{3b})/(r_{3a}-r_{3b}) < 1.0 \quad (10)$$

where, $nd_{3low}$ is a refractive index of a lens having the lowest refractive index for the d line in the positive lens component in the third lens component, $r_{3a}$ is a paraxial radius of curvature of an object side surface of the positive lens component in the third lens unit, and $r_{3b}$ is a paraxial radius of curvature of an image side surface of the positive lens component in the third lens unit,
where the term "lens component" refers to a lens member whose surfaces that are in contact with air on the optical axis include only two surfaces, one being an object side surface and the other being an image side surface.

30. The three-unit zoom lens according to claim 29, wherein the third lens unit satisfies the following conditional expression (11):

$$-0.40 < D_{g3}/r_{3b} < 0.0 \quad (11)$$

where $D_{g3}$ is a thickness of the third lens unit on the optical axis.

31. The three-unit zoom lens according to claim 29, wherein the negative lens component in the first lens unit has a biconcave shape.

32. The three-unit zoom lens according to claim 29, wherein the negative lens included in the negative lens component in the first lens unit has a shape that satisfies the following conditional expression (15):

$$-1.0<(r_{1na}+r_{1nb})/(r_{1na}-r_{1nb})<1.0 \quad (15)$$

where, $r_{1na}$ is a paraxial radius of curvature of an object side surface of the negative lens included in the negative lens component in the first lens unit, and $r_{1nb}$ is a paraxial radius of curvature of an image side surface of the negative lens included in the negative lens component in the first lens unit.

33. The three-unit zoom lens according to claim 29, wherein focusing operation from a long distance to a short distance at the wide angle end is performed by moving the third lens unit toward the object side, and the first lens unit, the second lens unit and the third lens unit satisfy the following conditional expression (13) in a state in which the zoom lens is focused on a longest distance at the wide angle end:

$$2.0<D_{12}/D_{23}<8.0 \quad (13)$$

where $D_{12}$ is the distance, on the optical axis, between the first lens unit and the second lens unit at the wide angle end, and $D_{23}$ is the distance, on the optical axis, between the second lens unit and the third lens unit at the wide angle end.

34. The three-unit zoom lens according to claim 29, wherein the negative lens component in the first lens unit has an aspheric cemented surface.

35. The three-unit zoom lens according to claim 29, wherein the negative lens component in the first lens unit has a spherical cemented surface.

36. The three-unit zoom lens according to claim 29, wherein the first lens unit satisfies the following conditional expression (14):

$$-0.70<D_{g1}/f_1<-0.075 \quad (14)$$

where $D_{g1}$ is a thickness of the first lens unit on the optical axis, and $f_1$ is a focal length of the first lens unit.

37. The three-unit zoom lens according to claim 29, wherein the second lens unit consists of one cemented lens component.

38. The three-unit zoom lens according to claim 37, wherein the one lens component in the second lens unit is a lens component including, in order from the object side, a positive lens, a negative lens and a positive lens.

39. The three-unit zoom lens according to claim 29, wherein the second lens unit consists of two cemented lens components.

40. The three-unit zoom lens according to claim 39, wherein the second lens unit consists of two cemented doublet lens components.

41. The three-unit zoom lens according to claim 29, wherein the positive lens component in the third lens unit is a single lens.

42. The three-unit zoom lens according to claim 29, wherein the positive lens component in the third lens unit is a cemented lens component.

43. The three-unit zoom lens according to claim 29, wherein the total number of aspheric surfaces in the third lens unit is at most one.

* * * * *